US010234564B2

(12) United States Patent
Whitehead

(10) Patent No.: US 10,234,564 B2
(45) Date of Patent: Mar. 19, 2019

(54) SYSTEM AND METHOD FOR DETERMINING THE DIRECTION OF A FALSE GNSS SATELLITE SIGNAL TRANSMITTER

(71) Applicant: Hemisphere GNSS Inc., Scottsdale, AZ (US)

(72) Inventor: Michael Whitehead, Scottsdale, AZ (US)

(73) Assignee: Hemisphere GNSS Inc., Scottsdale, AZ (US)

( * ) Notice: Subject to any disclaimer, the term of this patent is extended or adjusted under 35 U.S.C. 154(b) by 692 days.

(21) Appl. No.: 14/645,971

(22) Filed: Mar. 12, 2015

(65) Prior Publication Data
US 2015/0268350 A1 Sep. 24, 2015

Related U.S. Application Data

(60) Provisional application No. 61/955,610, filed on Mar. 19, 2014.

(51) Int. Cl.
*G01S 3/46* (2006.01)
*G01S 19/21* (2010.01)

(52) U.S. Cl.
CPC .............. *G01S 19/215* (2013.01); *G01S 3/46* (2013.01)

(58) Field of Classification Search
CPC ........ G01S 19/215; G01S 3/46; G01S 5/0215; G01S 19/44; G01S 19/53; G01S 3/36;
(Continued)

(56) References Cited

U.S. PATENT DOCUMENTS 5,157,315 A * 10/1992 Miyake .............. G05B 19/4086
318/568.11
5,557,284 A * 9/1996 Hartman ................ G01S 19/215
342/352

(Continued)

FOREIGN PATENT DOCUMENTS

EP 0904551 B1 * 5/2000 ............ G01S 19/215
EP 0904551 B1 * 5/2000 ............ G01S 19/215
(Continued)

OTHER PUBLICATIONS

John Lister, "Bogus GPS Signal Sends Ship Off Course", Infopackets. com, Aug. 1, 2013, pp. 1-2, http://www.infopackets.com/news/security/2013/20130801_bogus_gps_signal_sends_ship_off_course.htm.

(Continued)

*Primary Examiner* — Bernarr E Gregory
*Assistant Examiner* — Nuzhat Pervin
(74) *Attorney, Agent, or Firm* — Schmeiser, Olsen & Watts, LLP

(57) ABSTRACT

Disclosed is a device and method for determining the direction of a false Global Navigation Satellite System (GNSS) satellite signal transmitter. False GNSS satellite signals can be used malevolently to take control of a rigid body such as a vehicle or ship that is using GNSS satellite signals for navigation. The GNSS device according to the invention computes a plurality of range differences, where each range difference is the difference between a range from a first GNSS satellite to a first GNSS antenna, and the range from the first GNSs satellite to a second GNSS antenna. Each of the plurality of range differences is correlated to a rotation angle of a baseline vector extending from the first GNSS antenna to the second GNSS antenna. The rotation angles and their corresponding range differences can be used to indicate the direction of the false GNSS satellite signal transmitter.

14 Claims, 26 Drawing Sheets

(58) Field of Classification Search
CPC .......... G01S 19/54; G01S 19/04; G01S 19/33; G01S 19/11; G01S 19/20; G01S 5/0263; G01S 19/43; G01S 19/21; G05B 19/4086; G01C 15/00; A01B 69/007; A01B 69/008; A01B 79/005
USPC .................................................. 342/357.59
See application file for complete search history.

(56) References Cited

U.S. PATENT DOCUMENTS

| | | | | |
|---|---|---|---|---|
| 6,469,663 | B1* | 10/2002 | Whitehead | G01S 19/44 342/357.31 |
| 7,233,284 | B2* | 6/2007 | Velicer | G01S 3/36 342/357.22 |
| 7,292,185 | B2* | 11/2007 | Whitehead | G01S 19/53 342/357.36 |
| 8,140,223 | B2* | 3/2012 | Whitehead | A01B 79/005 701/41 |
| 8,174,437 | B2* | 5/2012 | Whitehead | G01S 19/41 342/357.24 |
| 8,265,826 | B2* | 9/2012 | Feller | A01B 69/007 701/41 |
| 8,531,332 | B2* | 9/2013 | Gum | G01S 19/215 342/357.73 |
| 8,583,315 | B2* | 11/2013 | Whitehead | A01B 69/007 701/31.4 |
| 8,624,779 | B2* | 1/2014 | Ferguson | G01S 19/04 342/357.58 |
| 8,638,257 | B2* | 1/2014 | Fenton | G01S 19/54 342/357.36 |
| 9,612,342 | B2* | 4/2017 | Petersen | G01S 19/43 |
| 2007/0075896 | A1* | 4/2007 | Whitehead | G01S 19/53 342/357.36 |
| 2008/0269988 | A1* | 10/2008 | Feller | A01B 69/007 701/41 |
| 2009/0121932 | A1* | 5/2009 | Whitehead | A01B 69/008 342/357.36 |
| 2009/0164067 | A1* | 6/2009 | Whitehead | A01B 79/005 701/41 |
| 2009/0167597 | A1* | 7/2009 | Strachan | G01S 19/215 342/357.29 |
| 2009/0322600 | A1* | 12/2009 | Whitehead | G01C 15/00 342/357.27 |
| 2010/0109944 | A1* | 5/2010 | Whitehead | G01C 15/00 342/357.25 |
| 2011/0090114 | A1* | 4/2011 | Fenton | G01S 19/54 342/357.37 |
| 2011/0285586 | A1* | 11/2011 | Ferguson | G01S 19/04 342/357.45 |
| 2012/0242540 | A1* | 9/2012 | Feller | G01S 13/86 342/357.3 |
| 2013/0002484 | A1* | 1/2013 | Katz | G01S 19/11 342/357.48 |
| 2014/0232595 | A1* | 8/2014 | Rife | G01S 19/20 342/357.58 |
| 2016/0124070 | A1* | 5/2016 | Afzal | G01S 5/0263 342/357.25 |

FOREIGN PATENT DOCUMENTS

| | | | | |
|---|---|---|---|---|
| EP | 2455781 | A1 * | 5/2012 | ............ G01S 19/21 |
| EP | 2455781 | A1 * | 5/2012 | ............ G01S 19/21 |
| EP | 2650699 | A1 | 4/2013 | |
| EP | 2650699 | A1 * | 10/2013 | .......... G01S 19/215 |
| EP | 2650699 | A1 * | 10/2013 | .......... G01S 19/215 |
| WO | WO 97/47987 | A1 | 12/1997 | |
| WO | WO 2006/085976 | A2 | 8/2006 | |

OTHER PUBLICATIONS

Dee Ann Davis, "GPS Spoofing Experiment Knocks Ship off Course", Inside GNSS (Engineering Solutions from the Global Navigation Satellite System Community), Jul. 31, 2013, pp. 1-4, http://www.insidegnss.com/node/3659.
Logan Scott, "Location Assurance", GPS World, Jul. 2007, pp. 12-17, www.gpsworld.com.
Timothy J. Seppala, "University of Texas students send yacht off-course with GPS exploit", engadget, Jul. 30, 2013, pp. 1-2, http://www.engadget.com/2013/07/30/university-og-texas-yacht-hack-experiment.
Dave Doolittle et al., "UT students use fake GPS signals to take over superyacht", HispanicBusiness.com, Jul. 30, 2013, p. 1, http:www.hispanicbusiness.com/2013/7/29/ut_students_use_fake_gps_signals.htm.
European Patent Office, European Search Report for Appl. No. EP 14 177 313.5, dated Feb. 4, 2015, pp. 1-9, Munich Germany.
International Searching Authority, Search Report and Written Opinion for PCT/US15/21154, dated Jul. 2, 2015, pp. 1-9, ISA/US.

* cited by examiner

US 10,234,564 B2

SYSTEM AND METHOD FOR DETERMINING THE DIRECTION OF A FALSE GNSS SATELLITE SIGNAL TRANSMITTER

CROSS REFERENCE TO RELATED APPLICATIONS

This application claims priority to U.S. Provisional patent application to Michael L. Whitehead entitled "System and Method for Determining the Direction of a False GNSS Satellite Signal Transmitter", Ser. No. 61/955,610, Filed Mar. 19, 2014. This application is related to U.S. Provisional patent application to Michael L. Whitehead entitled "False GNSS Satellite Signal Detection System" Ser. No. 61/865,935 filed Aug. 14, 2013, to U.S. patent application Ser. No. 14/061,459 to Michael L. Whitehead filed Oct. 23, 2013, and to U.S. Pat. No. 7,292,186 entitled Method and System for Synchronizing Multiple Tracking Devices For A Geo-location System, filed Jan. 5, 2005, the disclosures of which are hereby incorporated entirely herein by reference.

BACKGROUND OF THE INVENTION

Technical Field

This invention relates generally to a Global Navigation Satellite System (GNSS), and more specifically to a system and method for detecting false GNSS satellite signals, and for determining the direction of the transmitter of the false GNSS satellite signals.

State of the Art

Global Navigation Satellite Systems are in widespread use to determine the location and/or attitude of a body. A GNSS includes a network of satellites that broadcast GNSS radio signals. GNSS satellite signals allow a user to determine, with a high degree of accuracy, the location of a receiving antenna, the time of signal reception, and/or the attitude of a body that has a pair of receiving antennas fixed to it. Location is determined by receiving GNSS satellite signals from multiple satellites in known positions, determining the transition time for each of the signals, and solving for the position of the receiving antenna based on the known data. The location of two or more receiving antennas that have known placements relative to an object can be used to determine the attitude of the object. Examples of GNSS systems include Navstar Global Positioning System (GPS), established by the United States; Globalnaya Navigatsionnay Sputnikovaya Sistema, or Global Orbiting Navigation Satellite System (GLONASS), established by the Russian Federation and similar in concept to GPS; the BeiDou Navigation Satellite System (BDS) created by the Chinese; and Galileo, also similar to GPS but created by the European Community and slated for full operational capacity in the near future.

The GNSS is used extensively to navigate vehicles such as cars, boats, farm machinery, airplanes, and space vehicles. A problem is that 'false' GNSS signals can be used to 'spoof', or trick, a GNSS navigational system into straying off course or to provide an inaccurate time. Sophisticated GNSS spoofing systems can be used to take control of a navigational system and reroute a vehicle to an unintended location. Spoofing systems can be used for malevolent purposes—to steal, harm, reroute, or destroy important vehicles and machinery, or to allow false transactions to occur. Thus, what is needed is a system to detect the presence of false GNSS satellite signals. Once the presence of false GNSS satellite signals is detected, the navigational system can be prevented from being influenced by the false GNSS satellite signals. Also needed is a system and method for determining the direction of the false GNSS satellite signal transmitter. Knowing the direction of the false GNSS signal transmitter will aid in disabling the device.

DETAILED DESCRIPTION OF EMBODIMENTS OF THE INVENTION

Figure 1:
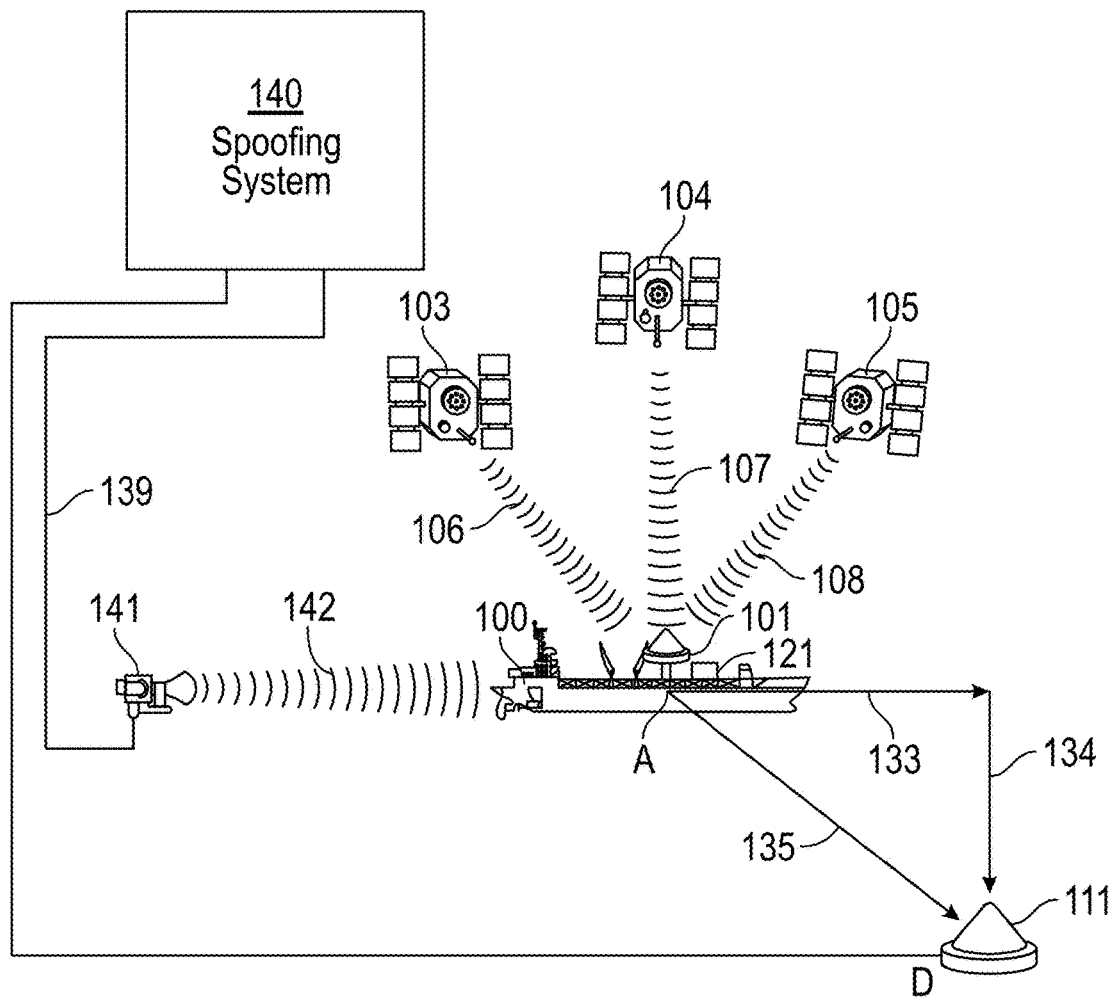
FIG. 1 is a depiction of a vessel that is the target of a spoofing system.

As discussed above, embodiments of the invention relate to a Global Navigation Satellite System (GNSS) and more specifically to a system and method for detecting false GNSS satellite signals, and for determining the direction of the false GNSS satellite signal transmitter. Some disclosed embodiments use a GNSS-based navigational system to measure the phase of a GNSS satellite signal at two or more antennas. The phase is used in some embodiments to determine if the antennas are receiving a false GNSS satellite signal. The phase of the GNSS satellite signal can be the code phase or the carrier phase of the GNSS satellite signal. In some embodiments a GNSS attitude determining system computes the carrier phase differences of a GNSS satellite signal at two or more antennas. The carrier phase difference is used in some embodiments to determine if the antennas are receiving a false GNSS satellite signal. In some embodiments the code phase difference is used to detect false GNSS satellite signals instead of the carrier phase. In some embodiments a first measured carrier phase difference is used to compute a second geometrical carrier phase difference of the GNSS satellite signal at the same antennas. The amount of agreement or error between the first measured and the second geometric computation of the carrier phase difference of the GNSS satellite signal at the two antennas is used to determine whether the system is receiving false GNSS satellite signals.

Disclosed are embodiments of the invention which compute range differences between satellite signals received at two or more antennas, and use the range differences to determine the direction of a false GNSS satellite signal transmitter.

False GNSS satellite signals are GNSS satellite signals which contain incorrect data. Incorrect data means the data in the signal does not correctly identify the satellite it came from, or the transit time from the satellite to the antenna, or it has other false or misleading data included in the false GNSS satellite signal. This incorrect data will result in incorrect range, location, timing or attitude calculations. A false GNSS satellite signal with incorrect data can be used to mislead, or "spoof" a GNSS navigational system and/or a GNSS timing system.

False GNSS satellite signals need not originate from any GNSS, and need not originate from any earth-orbiting satellite. False GNSS satellite signals include signals that are simulated—in other words they do not ever originate from a GNSS satellite, although they are formed to simulate a GNSS satellite signal and, ultimately, be accepted by a receiving antenna as a real GNSS satellite signal. False GNSS satellite signals also include those signals that originate from a GNSS satellite, but they are ignorantly or maliciously received and re-broadcast such that they can no longer be used to measure an antenna location or provide an accurate timing signal. In a general sense, false GNSS signals include any signal which contains invalid satellite data, but is of a form that will be accepted by a GNSS antenna and receiver and, without intervention, will be used by the GNSS receiver to perform a (false) location or attitude computation. Once the system and method for detecting false GNSS satellite signals disclosed herein detects a false GNSS satellite signal, intervention can occur, preventing the navigational system being spoofed from providing false location or navigational data. Also disclosed is an apparatus and method of determining the direction of a false GNSS satellite signal transmitter.

A GNSS includes a network of satellites that broadcast GNSS radio signals, enabling a user to determine the location of a receiving antenna with a high degree of accuracy. A GNSS can also be used to determine the attitude of an object, by determining the position of two or more receiving antennas that have known placements relative to the object.

The United States' GPS system, which is currently the longest running of the available GNSS, was developed by the United States government and has a constellation of 24 satellites in 6 orbital planes at an altitude of approximately 26,500 km. The first satellite was launched in February 1978. Initial Operational Capability (IOC) for the GPS was declared in December 1993. Each satellite continuously transmits microwave L-band radio signals in two frequency bands, L1 (1575.42 MHz) and L2 (1227.6 MHz). The L1 and L2 signals are phase shifted, or modulated, by one or more binary codes. These binary codes provide timing patterns relative to the satellite's onboard precision clock (synchronized to other satellites and to a ground reference through a ground-based control segment), in addition to a navigation message giving the precise orbital position of each satellite, clock correction information, and other system parameters. It is to be understood that this system is constantly being upgraded and modified, thus the specific details and frequencies provided herein may change over time.

GNSS navigation or attitude systems use measurements of a GNSS satellite signal phase—either code phase or carrier phase—in order to perform their computations. The binary codes providing the timing information are called the C/A Code, or coarse acquisition code, and the P-code, or precise code. The C/A Code is a 1 MHz Pseudo Random Noise (PRN) code modulating the phase of the L1 signal, and repeating every 1023 bits (one millisecond). The P-Code is also a PRN code, but modulates the phase of both the L1 and L2 signals, and is a 10 MHz code repeating every seven days. These PRN codes are known patterns that can be compared to internal versions in the receiver. The GNSS receiver is able to compute an unambiguous range to each satellite by determining the time-shift necessary to align the internal code phase to the broadcast code phase. Since both the C/A Code and the P-Code have a relatively long "wavelength"—approximately 300 meters (or 1 microsecond) for the C/A Code, and 30 meters (or ¹⁄₁₀ microsecond) for the P-Code—positions computed using them have a relatively coarse level of resolution. Code phase measurements are used in some embodiments of the inventions described herein to detect false GNSS satellite signals.

To improve the positional accuracy provided by use of the C/A Code and the P-Code, a receiver may take advantage of the carrier component of the L1 or L2 signal. The term "carrier", as used herein, refers to the dominant spectral component remaining in the radio signal after the spectral content resulting from the modulating PRN digital codes has been removed (e.g., from the C/A Code and the P-Code). The L1 and L2 carrier signals have wavelengths of about 19 centimeters and 24 centimeters, respectively. The GPS receiver is able to track these carrier signals and measure the carrier phase φ to a small fraction of a complete wavelength, permitting range measurement to an accuracy of less than a centimeter. These carrier phase φ measurements are used by embodiments of the invention described herein to detect false GNSS satellite signals.

FIG. 1 depicts a situation where a vessel 100 using GNSS navigation is subjected to spoofing—or in other words is receiving false GNSS satellite signals. Vessel 100 receives real GNSS satellite signals 106, 107, and 108 from a plurality of GNSS satellites 103, 104 and 105, respectively. GNSS satellite signals 106, 107 and 108 are received by an antenna 101 located at physical location A. A GNSS receiver 121, which is electrically connected to antenna 101, receives signals 106, 107, and 108, and computes the GNSS location coordinates of location A based on measurements of ranging information contained within GNSS signals 106, 107 and 108. Vessel 100 in this embodiment has an autopilot system that steers vessel 100 over a prescribed course using the computed GNSS coordinates of location A. It is to be understood that while antenna 101 is shown receiving GNSS satellite signals 106, 107, and 108 from three GNSS satellites 103, 104, and 105, antenna 101 can be receiving GNSS satellite signals from any number of GNSS satellites. Antenna 101 receives GNSS satellite signals from a plurality of GNSS satellites, where a plurality is any number greater than one.

Figure 2:
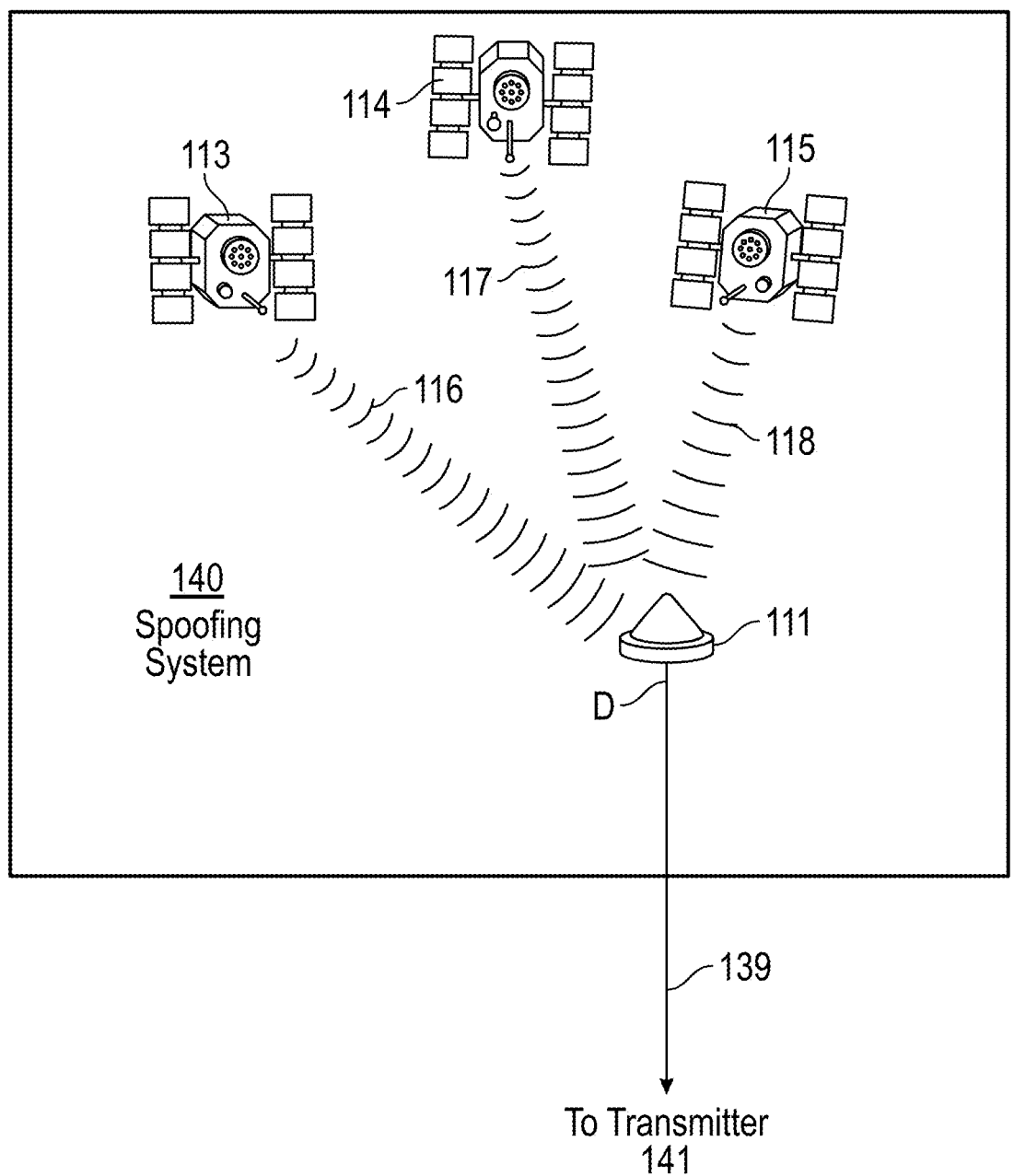
FIG. 2 is an example embodiment of a spoofing system for creating false GNSS satellite signals.

Antenna 101 in the embodiment shown in FIG. 1 is also receiving a spoofing signal 142 from a spoofing system 140 (also shown in FIG. 2). Spoofing signal 142 is a composite signal which contains a plurality of false GNSS satellite signals. Spoofing signal 142 is generated so as to mimic real GNSS satellite signals. Spoofing system 140 transmits spoofing signal 142 through a cable 139 to a transmitter 141. Transmitter 141 broadcasts spoofing signal 142 to antenna 101.

GNSS signal spoofing system 140 can be designed to create false GNSS satellite signals in many ways. In some embodiments, spoofing system 140 creates spoofing signal 142 by simulating real GNSS satellite signals programmed with the desired false satellite data. FIG. 2 is an example embodiment of spoofing system 140 of FIG. 1, which in this embodiment captures real GNSS signals 116, 117, and 118 at an antenna 111, and then rebroadcasts these signals with transmitter 141. In the embodiment shown in FIG. 1 and FIG. 2, spoofing system 140 creates spoofing signal 142 by re-broadcasting live GNSS signals received at a location different from the GNSS navigational system that is to be spoofed. It is to be understood that spoofing system 140 can create and broadcast spoofing signal 142 using any method that creates a spoofing signal 142 that includes data meant to be accepted as real GNSS satellite signals.

In the embodiment shown in FIG. 1 through FIG. 2 spoofing system 140 includes spoof antenna 111, and transmitter 141. Spoofing system 140 generates spoofing signal 142 by re-broadcasting GNSS satellite signals 116, 117 and 118 received at spoof antenna 111 from live GNSS satellites 113, 114 and 115 (FIG. 2). Satellites 113, 114, and 115, can be the same or different GNSS satellites as satellites 103, 104, and 105. Spoof antenna 111 is located at a spoof location D (FIG. 1). In this embodiment, spoof location D is offset from vessel location A by vectors 133 and 134, creating a total locational offset shown by vector 135. Real GNSS satellite signals 116, 117, and 118 are combined into composite spoofing signal 142 and rebroadcast by transmitter 141. Note that spoofing signal 142 is a composite of a plurality of GNSS satellite signals 116, 117, and 118, as received by antenna 111. When GNSS satellite signals 116, 117, and 118 are rebroadcast from transmitter 141, they become false GNSS satellite signals because they contain data as received by antenna 111 at location D. Spoofing signal 142 in this embodiment contains three false GNSS satellite signals, but it is to be understood that spoofing signal 142 can contain any number of false GNSS satellite signals.

The power level of spoofing signal 142 is set such that when spoofing signal 142 is received by antenna 101, spoofing signal 142 overpowers real GNSS satellite signals 106, 107 and 108. Consequently receiver 121 uses spoofing signal 142 to compute a GNSS location based on false GNSS satellite signals 116, 117, and 118. Specifically, receiver 121 will measure the GNSS satellite signal phase (code phase and/or carrier phase) φ values of false GNSS satellite signals 116, 117, and 118, will use the code phase and/or the carrier phase φ values to compute GNSS location coordinates for location D, and will report that vessel 100 is at location D instead of its true location A. This false location D will be offset from true location A by vectors 133 and 134, for a total positional error given by vector 135. The navigational system of vessel 100 will believe it is at location D and plot its course accordingly. This is the intent of spoofing system 140 in some embodiments, to make receiver 121 believe, and report, that vessel 100 is at false location D that is offset relative to the known or assumed location A of the GNSS system to be spoofed. Spoofing of a navigational system can also be performed in order to make a navigational device provide false timing data. GNSS devices are often used in critical timing applications. Thus, in some embodiments, detection of false GNSS satellite signals is performed to prevent a spoofing system from causing false timing data to be provided by a GNSS device.

Note that any transmission delay of spoofing signal 142 along cable 139, or due to being rebroadcast, is seen as a common clock delay on all GNSS spoofing signals, and this delay is solved for as part of the receiver 121 computations. The delay causes a small, often undetectable receiver clock offset, but computation of the false GNSS location still takes place.

Described herein and shown in FIG. 3 through FIG. 16 is a system and method for detecting the presence of false GNSS satellite signals such as spoofing signal 142, where spoofing signal 142 comprises false data that represents itself as one or more than one GNSS satellite signal from one or more than one GNSS satellite. The system and method for detecting false GNSS satellite signals, described herein in example embodiments, uses a plurality of GNSS antennas for determining that at least one of the GNSS satellite signals received is a false GNSS satellite signal, in other words it contains false data. The system disclosed herein for detecting false GNSS satellite signals is in some embodiments a GNSS attitude system. GNSS attitude systems use two or more GNSS antennas attached to a rigid body for determining the attitude of the body.

Described herein and shown in FIG. 17 through FIG. 31 are systems and methods for determining the direction of a false GNSS satellite signal transmitter such as transmitter 141. The systems and methods for determining the direction of the false GNSS satellite signal transmitter, as described herein in example embodiments, uses at least two GNSS antennas to compute a plurality of range differences, where each range difference corresponds to a rotation angle of a baseline vector extending between the two GNSS antennas. The range differences are compared to determine the angle that corresponds to a direction of the false GNSS satellite signal transmitter such as transmitter 141. The system disclosed herein for determining the direction of the false GNSS satellite signal transmitter 141 is in some embodiments a GNSS attitude system. GNSS attitude systems use two or more GNSS antennas attached to a rigid body for determining the attitude of a body.

Figure 3:
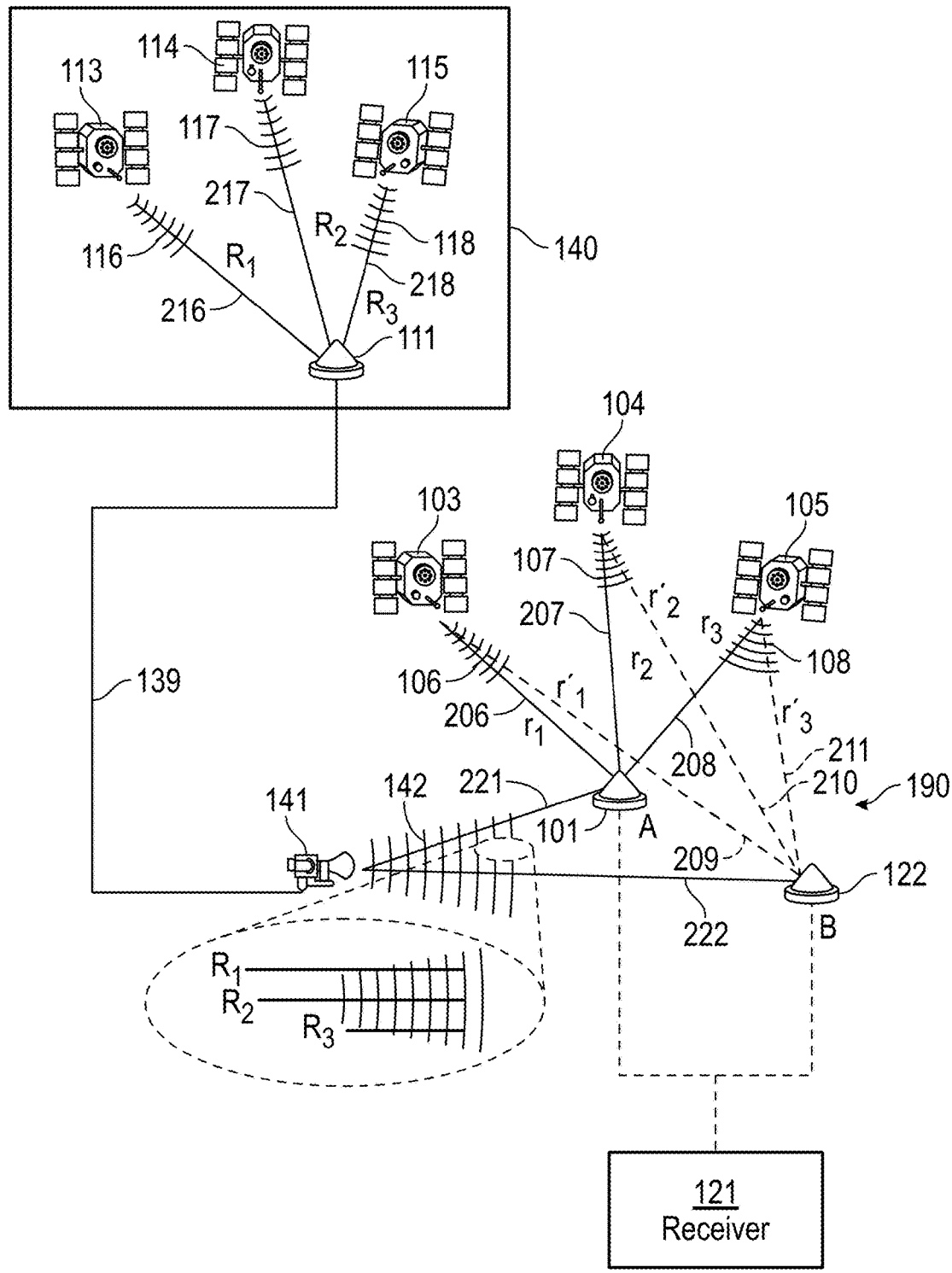
FIG. 3 shows an illustration of one embodiment of a system for detecting the presence of false GNSS satellite signals.

FIG. 3 shows an embodiment of a system 190 for detecting false GNSS satellite signals. In the embodiment shown in FIG. 3, vessel 100 of FIG. 1 includes system 190 for detecting false GNSS satellite signals. In the embodiment of the invention shown in FIG. 3, system 190 has two GNSS antennas, a first antenna 101 and a second antenna 122. Both first antenna 101 and second antenna 122 are receiving a plurality of GNSS satellite signals, which in this embodiment includes GNSS satellite signals 106, 107, and 108. System 190 for detecting false GNSS satellite signals also includes a receiver 121 connected to both first antenna 101 and second antenna 122. Receiver 121 receives GNSS satellite signals 106, 107, and 108 from first antenna 101 and second antenna 122, measures GNSS satellite signal phase $\varphi$ values (either code or carrier phase) of the GNSS satellite signals, and performs the range, location and attitude computations as required.

As shown in FIG. 3, GNSS spoofing is taking place to system 190 on vessel 100 of FIG. 1. Spoofing signal 142 is being received by first antenna 101 of vessel 100, just as shown and described in FIG. 1 and FIG. 2, except in the embodiment shown in FIG. 3, vessel 100 includes system 190 for detecting false GNSS satellite systems. Antennas 101 and 122 are both fixed to vessel 100 of FIG. 1, at locations A and B respectively. Vessel 100 is not shown in FIG. 3 for simplicity. Antennas 101 and 122 receive both the intended GNSS satellite signals 106, 107, and 108, and spoofing signal 142. Spoofing system 140 sends spoofing signal 142 along cable 139 and broadcasts spoofing signal 142 over transmitter 141. Spoofing system 140 generates spoofing signal 142 by rebroadcasting GNSS satellite signals 116, 117, and 118 from GNSS satellites 113, 114, and 115 as received by antenna 111 at GNSS location D, as shown in FIG. 2. GNSS satellite signals 116, 117, and 118 contain timing information that enable the computation of ranges $R_1$, $R_2$, and $R_3$ representing the distance between satellites 113, 114, and 115, respectively, and antenna 111, as shown in FIG. 3. Ranges $R_1$, $R_2$, and $R_3$ are denoted 216, 217, and 218 in FIG. 3. Range computations of $R_1$, $R_2$, and $R_3$ are made by receiver 121 of attitude system 190 from measurements of GNSS satellite signal phase $\varphi$ of GNSS satellite signals 116, 117, and 118 as received by antenna 111. Note that range measurements $R_1$, $R_2$, and $R_3$ will be computed by any GNSS receiver that is receiving and processing spoofing signal 142.

The intended, real GNSS satellite signals 106, 107, and 108, are broadcast by satellites 103, 104 and 105 as shown in FIG. 1 and FIG. 3. GNSS satellite signals 106, 107, and 108 travel from satellites 103, 104, and 106, respectively, to antenna 101 that is located at A. Under normal (non-spoofed) operation, GNSS receiver 121 connected to antenna 101 would measure GNSS satellite signal code or carrier phase $\varphi$ values for GNSS satellite signals 106, 107, and 108 as received by antenna 101, and compute ranges $r_1$, $r_2$, and $r_3$ (denoted 206, 207, and 208 in FIG. 3) representing the distance between satellites 103, 104, and 105 and antenna 101.

Additionally, GNSS satellite signals 106, 107, and 108 from GNSS satellites 103, 104 and 105, travel to antenna 122 at a location B. Under normal operation, GNSS receiver 121 connected to antenna 122 would measure GNSS satellite signal code or carrier phase $\varphi$ values for GNSS satellite signals 106, 107, and 108 as received by antenna 122, and compute ranges $r'_1$, $r'_2$, and $r'_3$ (denoted 209, 210, and 211 in FIG. 3) as the distance between GNSS satellites 103, 104, and 105 and antenna 122.

Again under normal operation, GNSS receiver 121 uses the range $r_1$, $r_2$, and $r_3$ computations to compute GNSS location A for the location of antenna 101, where GNSS location A approximately coincides with the location of antenna 101 to the accuracy of receiver 121. As well, under normal operation, GNSS receiver 121 connected to antenna 122 uses the $r'_1$, $r'_2$, and $r'_3$ range values and computes a GNSS location B that approximately coincides with the location of antenna 122. Computed ranges $r'_1$, $r'_2$, and $r'_3$ are different from $r_1$, $r_2$, and $r_3$. And the two GNSS locations A and B computed by receiver 121 connected to antennas 101 and 122 are different GNSS locations under normal operation, because locations A and B are not physically co-located. In some embodiments, the measured range differences $r_1-r'_1$, $r_2\_r'_2$, and $r_3\_r'_3$, rather than the computed ranges are used to compute GNSS locations.

During spoofing, signal 142 overpowers real GNSS satellite signals 106, 107, and 108. Signal 142 is received by both antenna 101 and antenna 122. GNSS receiver 121 connected to first antenna 101 and second antenna 122 measures GNSS satellite signal carrier phase $\varphi$ values and computes ranges of $R_1$, $R_2$, and $R_3$ as if received by antenna 111 instead of the intended ranges ($r_1$, $r_2$, $r_3$ and $r'_1$, $r'_2$, $r'_3$). GNSS receiver 121 measures identical ranges of $R_1$, $R_2$, and $R_3$ for what receiver 121 believes to be the path length to satellites 103, 104, and 105 from both antenna 101 and antenna 122. Therefore, one method for system 190 to use to detect false GNSS satellite signals is to compute one or more range differences, where a range difference is the difference between the range to a specific GNSS satellite from a first antenna, and the range to the same specific GNSS satellite from a second antenna. Because the range is calculated to two different antennas, the two ranges should be different and the range difference should be larger than a predetermined threshold range difference value. If the ranges are the same or close to the same value, the range difference will be small or zero. If the range difference is small or zero—smaller than the predetermined threshold range difference value, for example—then this can be used as an indication that one or more of the GNSS satellite signals is a false GNSS satellite signal. Or, if all pseudo range differences have roughly the same value—due to receiver clock differences or transmission delay, then the system is being spoofed. Transmission delay between antennas is the same for all false GNSS satellite signals (spoofing signals) since they follow the same path. Pseudo ranges are ranges that still have clock or delay components present.

Figure 4:
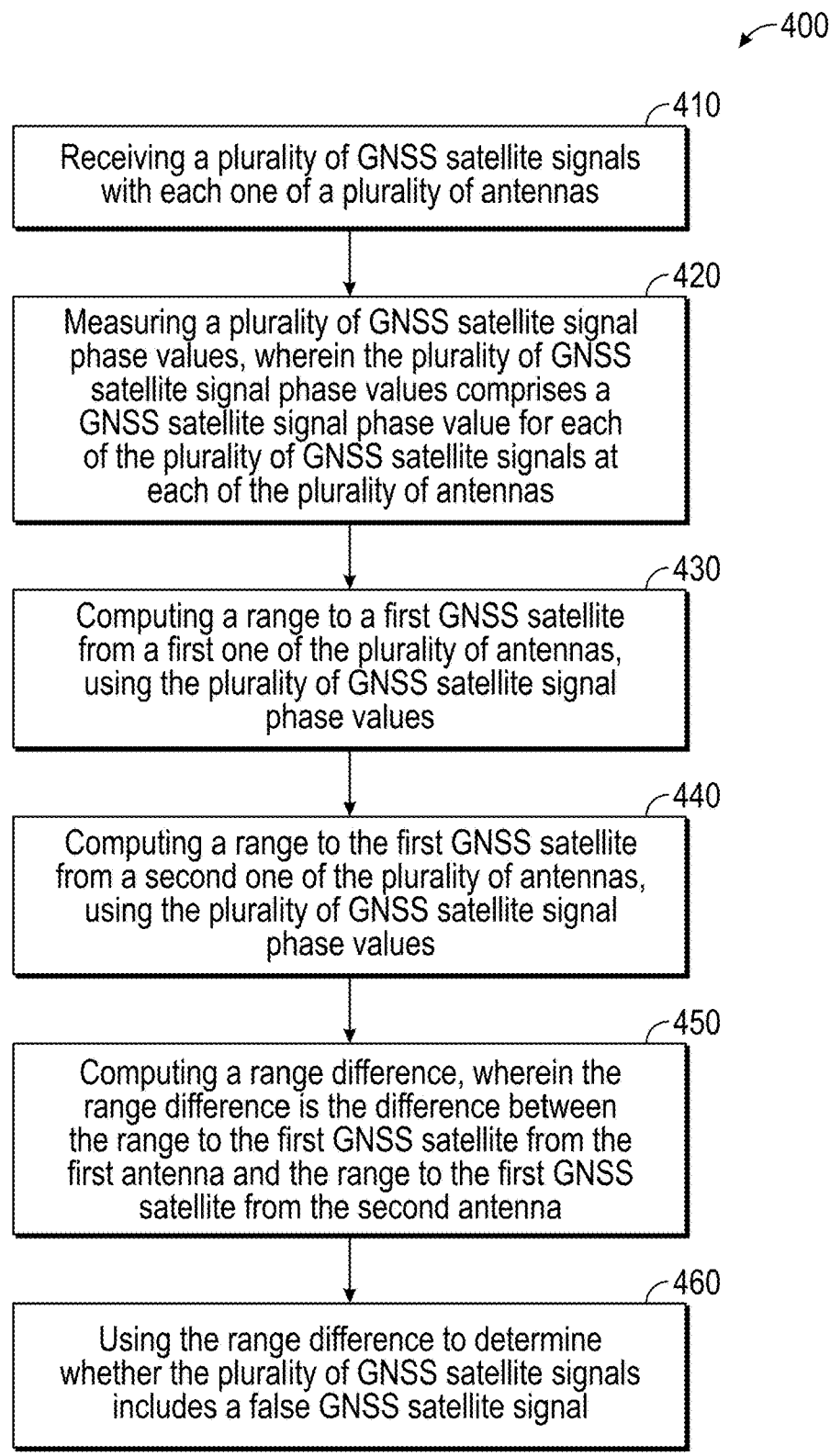
FIG. 4 illustrates method 400 of detecting false GNSS satellite signals.

FIG. 4 illustrates a method 400 of detecting false GNSS satellite signals according to embodiments of the invention, using measured range differences as described above. Method 400 includes an element 410 of receiving a plurality of GNSS satellite signals with each one of a plurality of antennas. FIG. 3 shows two antennas 101 and 122, but the plurality of antennas can include any number of antennas greater than one. FIG. 3 shows three GNSS satellite signals 106, 107, and 108 in the normal non-spoofing environment, or GNSS satellite signals 116, 117, and 118 in the spoofed environment, but the plurality of GNSS satellite signals can include any number of satellite signals greater than one.

Method 400 includes an element 420 of measuring a plurality of GNSS satellite signal phase φ values. The plurality of GNSS satellite signal phase φ values includes a GNSS satellite signal phase φ value for each of the plurality of GNSS satellite signals at each of the plurality of antennas. Method 400 also includes an element 430 of computing a range to a first GNSS satellite from a first one of the plurality of antennas, using the plurality of GNSS satellite signal phase φ values. Each range is the distance between one of the plurality of antennas and one of a plurality of GNSS satellites. The plurality of GNSS satellites are the GNSS satellites broadcasting the plurality of GNSS satellite signals. In FIG. 3 in the non-spoofing situation, the plurality of GNSS satellites is shown as three GNSS satellites 103, 104, and 105, broadcasting the plurality of real GNSS satellite signals 106, 107, and 108. In the spoofing situation the plurality of GNSS satellites is shown as three GNSS satellites 113, 114, and 115 broadcasting the plurality of GNSS satellite signals 116, 117, and 118, which are combined into spoofing signal 142. Each of the above pluralities can be any number greater than one. For example, in a normal situation with no false GNSS satellite signals, element 430 will include receiver 121 of system 190 of FIG. 3 computing range $r_1$ from first antenna 101 to GNSS satellite 103. In a spoofing environment where first antenna 101 is receiving spoofing signal 142, element 430 will include receiver 121 computing range $R_1$ from first antenna 101 to GNSS satellite 103.

Method 400 also includes an element 440 of computing a range to the first GNSS satellite from a second one of the plurality of antennas, using the plurality of GNSS satellite signal phase φ values. Continuing with the example above, in a normal situation with no false GNSS satellite signals, element 440 will include receiver 121 computing range $r'_1$ from second antenna 122 to GNSS satellite 103. In a spoofing environment where second antenna 122 is receiving spoofing signal 142, element 440 will include receiver 121 computing range $R_1$ from second antenna 122 to GNSS satellite 103. Note that in the non-spoofing environment the ranges $r_1$ and $r'_1$ are different because the antennas 101 and 122 are in different locations and thus the path lengths $r_1$ and $r'_1$ are different. But in the spoofing environment where first and second antennas 101 and 122 are receiving false GNSS satellite signals 116, 117, and 118 in spoofing signal 142, receiver 121 will compute range $R_1$—the same range value—for the range between both first antenna 101 and second antenna 122, and GNSS satellite 103, because the data received by both first antenna 101 and second antenna 122 reflects a range $R_1$ from spoofing antenna 111 and GNSS satellite signal 113.

Method 400 according to embodiments of the invention also includes an element 450 of computing a range difference, where the range difference is the difference between the range to the first GNSS satellite from the first antenna, and the range to the first GNSS satellite from the second antenna. Continuing the example, element 440 in the normal, non-spoofing environment will include computing the difference between $r_1$ and $r'_1$. This difference should reflect the fact that the antennas 101 and 122 are in different locations. In the spoofing environment element 440 will include computing the difference between $R_1$ and $R_1$. Since the range measurements in the spoofing environment are the same within computational accuracy, the range difference in the spoofing environment should be zero or some small number that results from a small amount of computational error in each range calculation.

Method 400 also includes an element 460 of using the range differences to determine whether the plurality of GNSS satellite signals includes a false GNSS satellite signal. In some embodiments the range difference is compared to a predetermined threshold range difference. If the range difference is smaller than the predetermined threshold range difference, then it is determined that the plurality of GNSS satellite signals includes a false GNSS satellite signal. If the range difference is larger than the predetermined threshold range difference, then it is determined that the plurality of GNSS satellite signals does not include a false GNSS satellite signal. In some embodiments, a plurality of range differences is computed, using the plurality of GNSS satellite signals as received by the plurality of antennas to measure and difference a plurality of ranges. Element 460 can include many different ways and methods of comparing the range difference or differences. Method 400 can include many other elements. In some embodiments method 400 includes the element of preventing the system from outputting a locational output in response to determining that the plurality of GNSS satellite signals includes at least one false GNSS satellite signal. Preventing the locational data from being output is one way to keep false GNSS satellite signals from being successful in taking over control of a navigational system or other system that is using the antennas for a purpose.

In the spoofed environment, where first antenna 101 and second antenna 122 are receiving spoofing signal 142 containing GNSS satellite signals 116, 117, and 118 as in the embodiment shown in FIG. 3, GNSS receiver 121 measures the same or similar ranges $R_1$, $R_2$, and $R_3$ for the path length to satellites 103, 104, and 105 (because the data is really from GNSS satellites 113, 114, and 115) from both antenna 101 and antenna 122. Receiver 121 will use these values to compute substantially the same GNSS location, within a locational margin of error, for both GNSS location A of antenna 101 and GNSS location B of antenna 122. Receiver 121 of system 190 does not know the GNSS location of point A and point B beforehand, but it may know the relative distance between point A and point B. Therefore a second method for system 190 to use to detect false GNSS satellite signals is to compare the computed GNSS locations A and B. System 190 will determine that it is receiving a false GNSS satellite signal in response to the computed GNSS locations of antennas 101 and 122 being the same GNSS locational value within a locational margin of error. In some embodiments this method includes computing a GNSS location for each of the plurality of antennas using the plurality of ranges, and determining that the plurality of GNSS satellite signals includes a false GNSS satellite signal in response to the computed GNSS locations for each of the plurality of antennas being the same GNSS locational value within a locational margin of error.

Thus, two-antenna GNSS system 190 according to an embodiment of the invention as shown in FIG. 3 is able to detect spoofing in many cases. Note that spoofing signal 142 may transverse different paths, 221 and 222 to travel to antennas 101 and 122. The difference in path length and thus signal travel time of spoofing signal 142 along paths 221 and 222 will result in receiver 121 connected to antennas 101 and 122 computing different receiver clock offsets. However, this will not affect the range or location calculations.

When receiving spoofing signal 142, system 190 will compute ranges and GNSS locations A and B that are the same values to within the accuracy of receiver 121. It is to be understood that while first antenna 101 and second antenna 122 are shown connected to one common receiver 121, each antenna could have its own GNSS receiver, with a common processor comparing the data to determine that the computed GNSS locations A and B are the same locational value within a locational margin of error.

Figure 5:
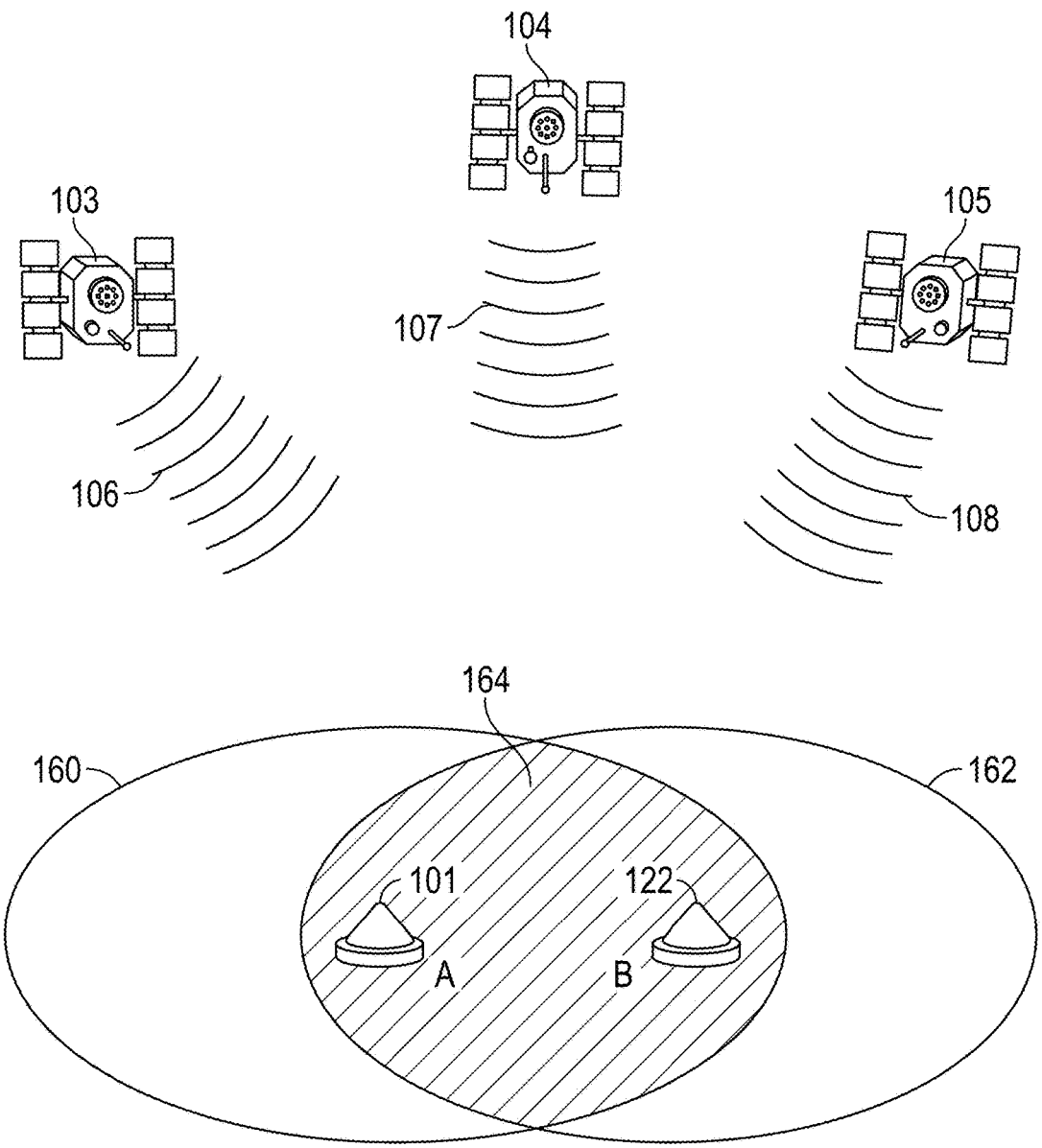
FIG. 5 illustrates two antennas and their overlapping locational margin of error.

This method of detecting false GNSS satellite signals by comparing the computed GNSS locations of two or more antennas can have issues in some cases. In particular, if the distance between the first and the second antennas 101 and 122 is smaller than the locational margin of error as computed by each receiver, then it may not be possible to determine whether the locations are the same within the locational margin of error. This is illustrated in FIG. 5. FIG. 5 shows antenna 101 of FIG. 3 at location A, and antenna 122 of FIG. 3 at location B. Each antenna is receiving GNSS satellite signals 106, 107, and 108 from GNSS satellites 103, 104, and 105 respectively. Receiver 121 (FIG. 3) calculates the GNSS location of receiver 101, which is accurate to within a location margin of error 160 as shown in FIG. 5. Receiver 121 also calculates the GNSS location of receiver 122 which is accurate to within a location margin of error 162 as shown in FIG. 5. A locational margin of error is the area of uncertainty which surrounds the GNSS location calculation due to error and imprecision in the measurements of range. Locational margin of errors 160 and 162 are shown as two-dimensional ovals in FIG. 5, but it is to be understood that they are three-dimensional areas such as spheres, ovoids, or other three-dimensional areas. Cross-hatched area 164 as shown in FIG. 5 represents area of overlap 164 of the two locational margins of error 160 and 162. When antenna 101 and antenna 122 are close enough to each other that they both reside within area of overlap 164 as shown in FIG. 5, it is not possible to determine accurately whether the computed GNSS locations of location A and location B are the same GNSS location or not, because their locational margins of error overlap.

One way to alleviate the potential for false detection using the two antenna method is to ensure that the distance from antenna 101 to antenna 122 is sufficiently large that their respective locational margins of error 160 and 162 do not intersect. A disadvantage of doing this, however, is that it requires more installation space and possibly longer cables, and thus a less compact system. Minimizing the size of the locational margins of error 160 and 162 is a viable solution, which can be done with a GNSS attitude system, as will be discussed shortly.

It is to be understood that while sets of three satellites are shown and described in FIG. 1 through FIG. 5, resulting in a set of three GNSS satellite signals being sent, the set of three is an example only. In general a plurality of GNSS satellites is used for GNSS satellite signal code or carrier phase $\varphi$, range, location, and attitude measurements and computations, where a plurality is any number larger than one. A plurality of GNSS satellites are used by system 190, which results in each antenna receiving a plurality of GNSS satellite signals. And while first and second antennas 101 and 122 are shown and described, in general a plurality of antennas are used by system 190, where a plurality is any number greater than one. Throughout this document, sets of two or three GNSS satellites, GNSS satellite signals, and antennas are shown and described to simplify the drawings and the explanation, but it is to be understood that often the numbers of satellites, satellite signals, and/or antennas is a number greater than two or three, and in fact can be any number greater than one.

A GNSS attitude system (also referred to as a GNSS attitude determining system) has the capability of executing a variety of measurements and computations which allow it to determine with high accuracy whether GNSS satellite signals are false GNSS satellite signals, while minimizing the limitations of using the measured ranges or computed GNSS locations as described above. A GNSS attitude system has a minimum of two antennas and computes ranging differences by differencing the GNSS satellite signal code or carrier phase $\varphi$ values measured at the two or more antennas. A basic GNSS attitude system and method of using the GNSS attitude system to detect false GNSS satellite signals is described below. More details on GNSS attitude systems and the computation of carrier phase differences can be found in related U.S. Pat. No. 7,292,185 to Whitehead.

Figure 6:
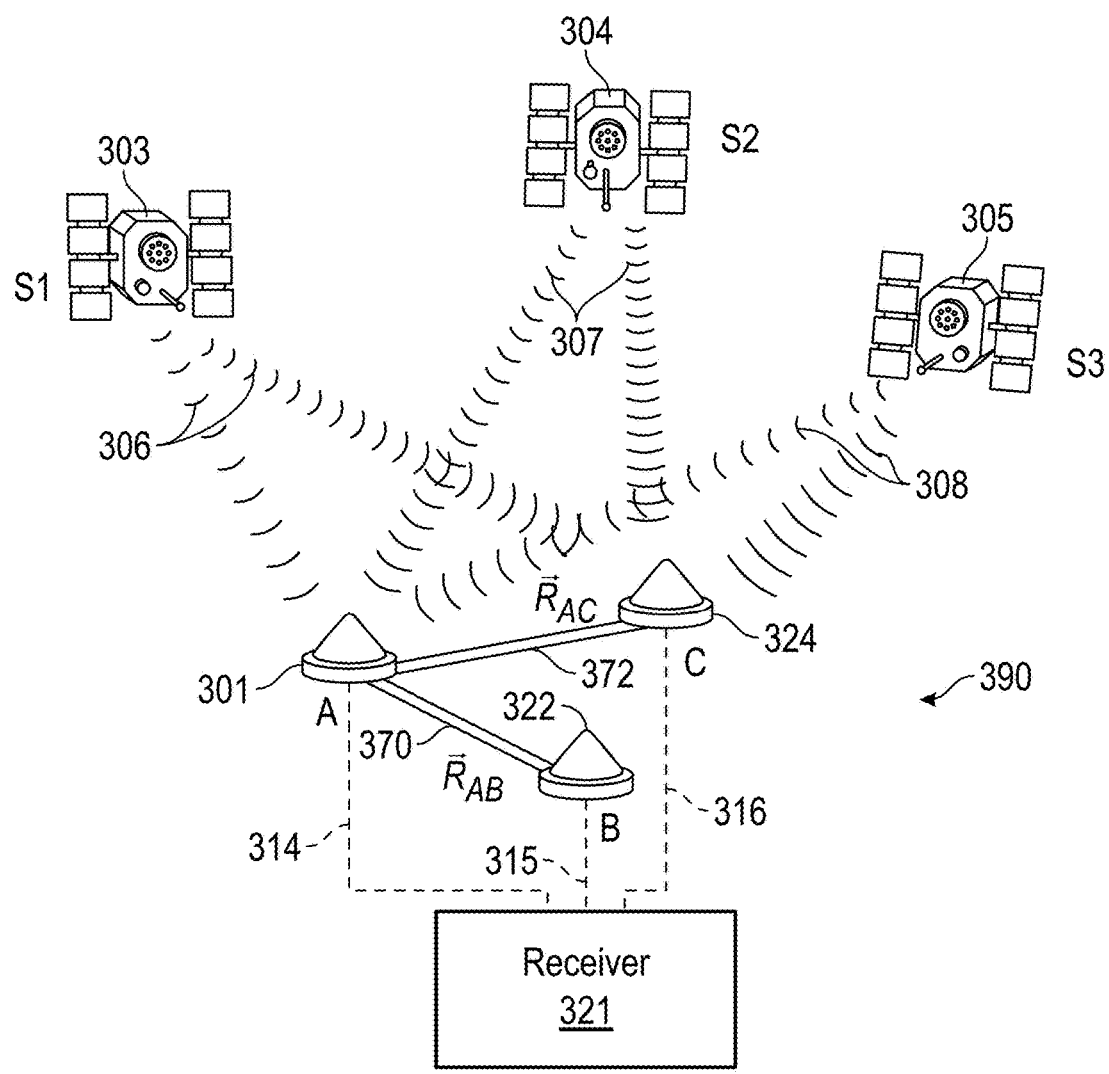
FIG. 6 illustrates an attitude determining system for detecting the presence of false GNSS satellite signals.

FIG. 6 depicts an attitude determining system 390 (also called attitude system 390 or system 390) for determining the presence of false GNSS satellite signals. System 390 is shown tracking a plurality of GNSS satellites 303, 304, and 305, also referred to as S1, S2, and S3, respectively. System 390 includes a plurality of antennas 301, 322, and 324 at locations A, B, and C to receive GNSS satellite signals. Satellites 303, 304, and 305 broadcast radio frequency GNSS satellite signals 306, 307 and 308, respectively. GNSS satellite signals 306, 307 and 308 are received by the plurality of antennas 301, 322 and 324. Each GNSS satellite signal 306, 307, and 308 travels from each antenna 301, 322 or 324 to a receiver unit 321 via connections 314, 315, or 316 respectively, where it is down-converted and digitally sampled so that it may be tracked by digital tracking loops of receiver 321. Various timing and navigation information is readily extracted while tracking each of the plurality of GNSS satellite signals 306, 307, and 308, including the phase of a Pseudo Random Noise (PRN) code timing pattern (often called code phase) that is modulated on each of the plurality of GNSS satellite signals 306, 307, and 308, the carrier phase $\varphi$ of each GNSS satellite signal's carrier, and navigation data from which the location of each GNSS satellite may be computed. It will be appreciated that while three antennas 301, 322, and 324, three GNSS satellites 303, 304, and 305 and three GNSS satellite signals 306, 307 and 308 are used to depict the plurality of antennas, the plurality of GNSS satellites and the plurality of GNSS satellite signals in FIG. 6, a greater or lesser number of antennas, satellites and satellite signals can be used if desired.

In order to perform the prescribed functions and desired processing, as well as the computations therefor (e.g., the attitude determination processes, and the like), receiver 321 may include, but not be limited to, a processor(s), computer(s), memory, storage, register(s), timing, interrupt(s), communication interface(s), and input/output signal interfaces, and the like, as well as combinations comprising at least one of the foregoing. For example, receiver 321 may include signal interfaces to enable accurate down-conversion and digital sampling and tracking of GNSS satellite signals as needed, and to facilitate extracting the various timing and navigation information, including, but not limited to, the phase of the PRN code timing pattern.

Figure 7:
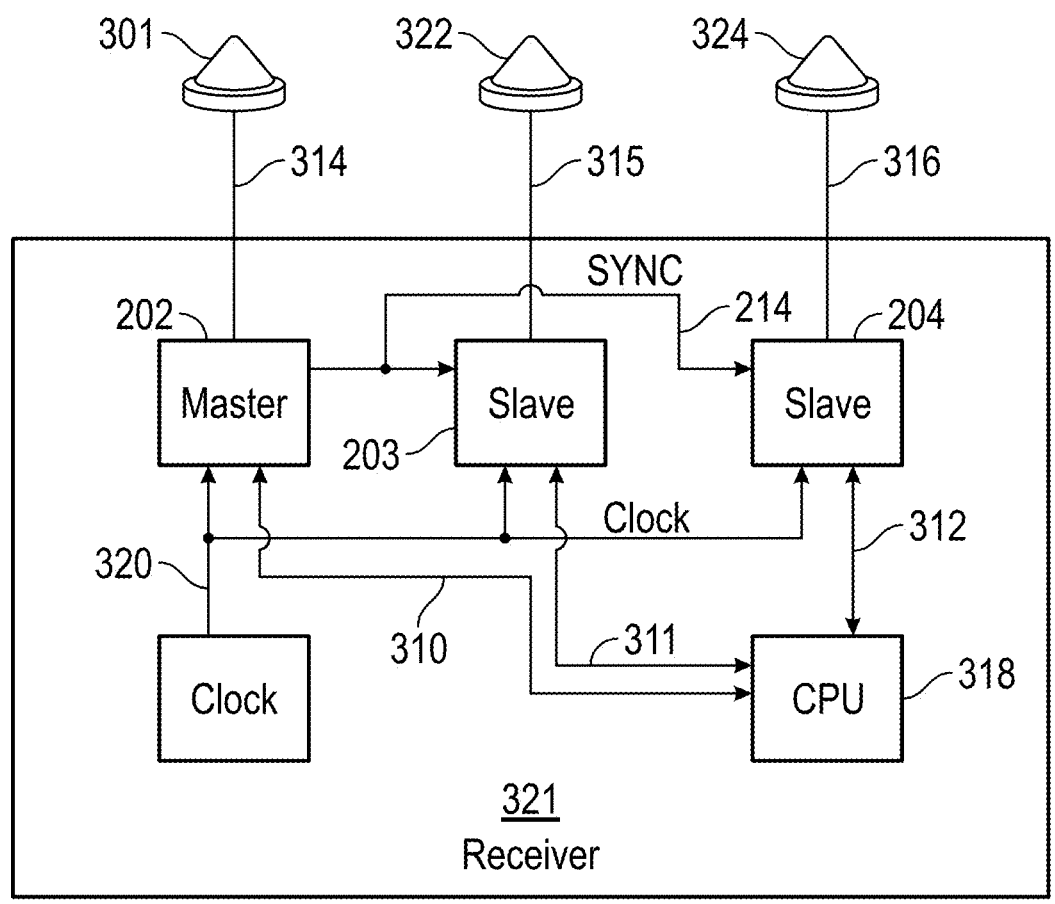
FIG. 7 shows a block diagram of an embodiment of a receiver of an attitude determining system.

FIG. 7 shows an example embodiment of receiver 321 of attitude determining system 390 of FIG. 6 that can be used for detecting the presence of false GNSS satellite signals. System 390 of FIG. 6 and FIG. 7 uses single receiver unit 321 containing multiple synchronized tracking devices 202, 203 and 204. Each tracking device 202, 203 and 204 is associated with exactly one antenna 301, 322 or 324, respectively. Each tracking device 202, 203 and 204 is capable of tracking a plurality of GNSS satellites. In this embodiment each tracking device 202, 203 and 204 is tracking each satellite 303, 304 and 305, respectively. Tracking devices 202, 203, and 204 serve the function of down converting the received Radio Frequency (RF) GNSS satellite signals 306, 307 and 308 arriving from the plurality of satellites 303, 304 and 305, sampling the composite signal, and performing high-speed digital processing on the composite signal (such as correlations with a PRN reference signal) that allow the code and carrier phase φ of each satellite to be tracked. Examples and further description of synchronized tracking devices such as tracking devices 202, 203 and 204 are described in commonly assigned U.S. Pat. No. 7,292,186 entitled Method and System for Synchronizing Multiple Tracking Devices For A Geo-location System, filed Jan. 5, 2005, the contents of which are incorporated by reference herein in their entirety. Each tracking device 202, 203 and 204 is connected to a single shared computer processing unit (CPU) 318 in this embodiment. CPU 318, or processor 318, sends control commands 310, 311 and 312 to the plurality of tracking devices 202, 203 and 204, respectively. Control commands 310, 311 and 312 enable tracking devices 202, 203 and 204 to track the plurality of GNSS satellites 303, 304 and 305. CPU 318 receives back from each tracking device 202, 203 and 204 code and carrier phase φ measurements of the plurality of GNSS satellite signals 306, 307 and 308.

The terms "central processing unit", "CPU", "processor", "microprocessor", are using in this document interchangeably and are meant to mean a computing device that can perform hardware and or software processing steps, calculations and/or processes. The items referred to by these terms can include any one or all of a processor(s), computer(s), memory, storage, register(s), timing, interrupt(s), communication interface(s), software and/or processing code loaded onto a memory, or any other combination of hardware and/or software that is used for computations and/or executing steps.

A synchronization signal 214 is sent from master tracking device 202 to slave tracking devices 203 and 204. Sync signal 214 allows master tracking device 202 and slave tracking devices 203 and 204 to measure the code and carrier phase φ of each of the plurality of GNSS satellite signals 306, 307 and 308 simultaneously. Furthermore, the RF down conversion within each tracking device 202, 203 and 204 and the sampling of data by each tracking device 202, 203 and 204 is done using a common clock signal 320. When a single-difference phase observation is formed by subtracting the carrier (or code) phase φ measured by one tracking device with that measured by another tracking device for the same GNSS satellite, the portion of the phase due to receiver 321's clock error is essentially eliminated in the difference. Thereafter, all that remains of the single-difference clock error is a small, nearly constant bias that is due to different effective RF path lengths (possibly resulting from different cable lengths, slightly different filter group-delays, and the like). Consequently, the clock error may be estimated infrequently compared to other more important quantities such as heading, pitch, or roll. During the times that the clock error is not estimated, attitude determining system 390 can produce an output using one fewer GNSS satellites than a system that must continually estimate clock error. Or, if a Kalman filter is utilized, the process noise for the clock state may be lowered substantially, allowing the Kalman filter to strengthen its estimate of the other states such as the angles of attitude. Finally, cycle slips are easier to detect since clock jumps can be ruled out.

Referring again to FIG. 6, selected pairs of antennas are grouped together so that GNSS satellite signal code or carrier phase differences Δ of GNSS satellite signals received by each of the two antennas of the pair may be computed. A GNSS satellite signal code or carrier phase difference Δ (also called phase difference or differential phase) is the difference between the GNSS satellite signal code or carrier phase φ value of a specific GNSS satellite signal measured at a first antenna, and the GNSS satellite signal code or carrier phase φ value of the same GNSS satellite signal measured at a second antenna. For example, in FIG. 6, the pairs AB, AC and BC are possible combinations of antenna pairs from which to compute phase differences Δ.

Figure 8:
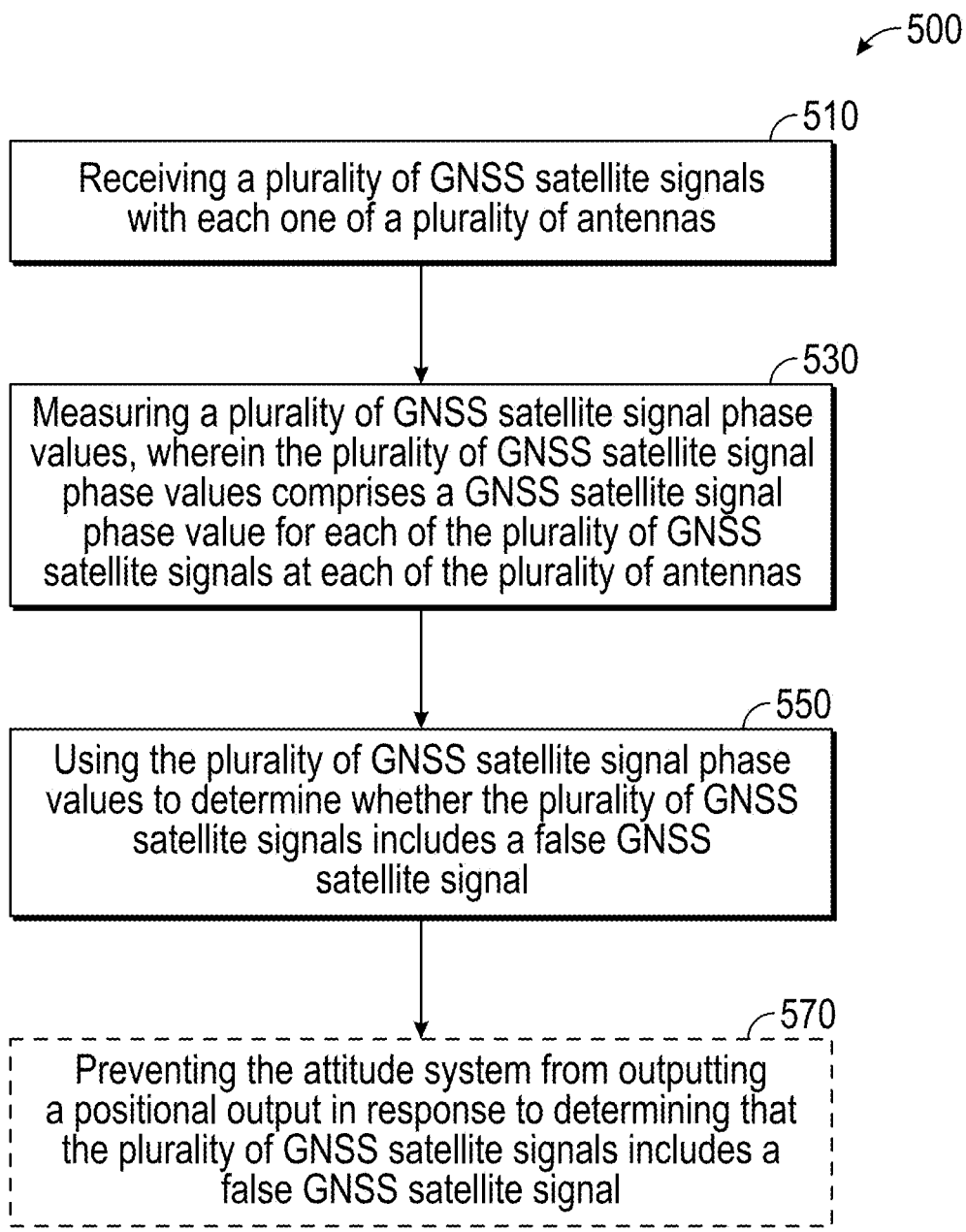
FIG. 8 shows a flow chart of method 500 of detecting false GNSS satellite signals.
Figure 9:
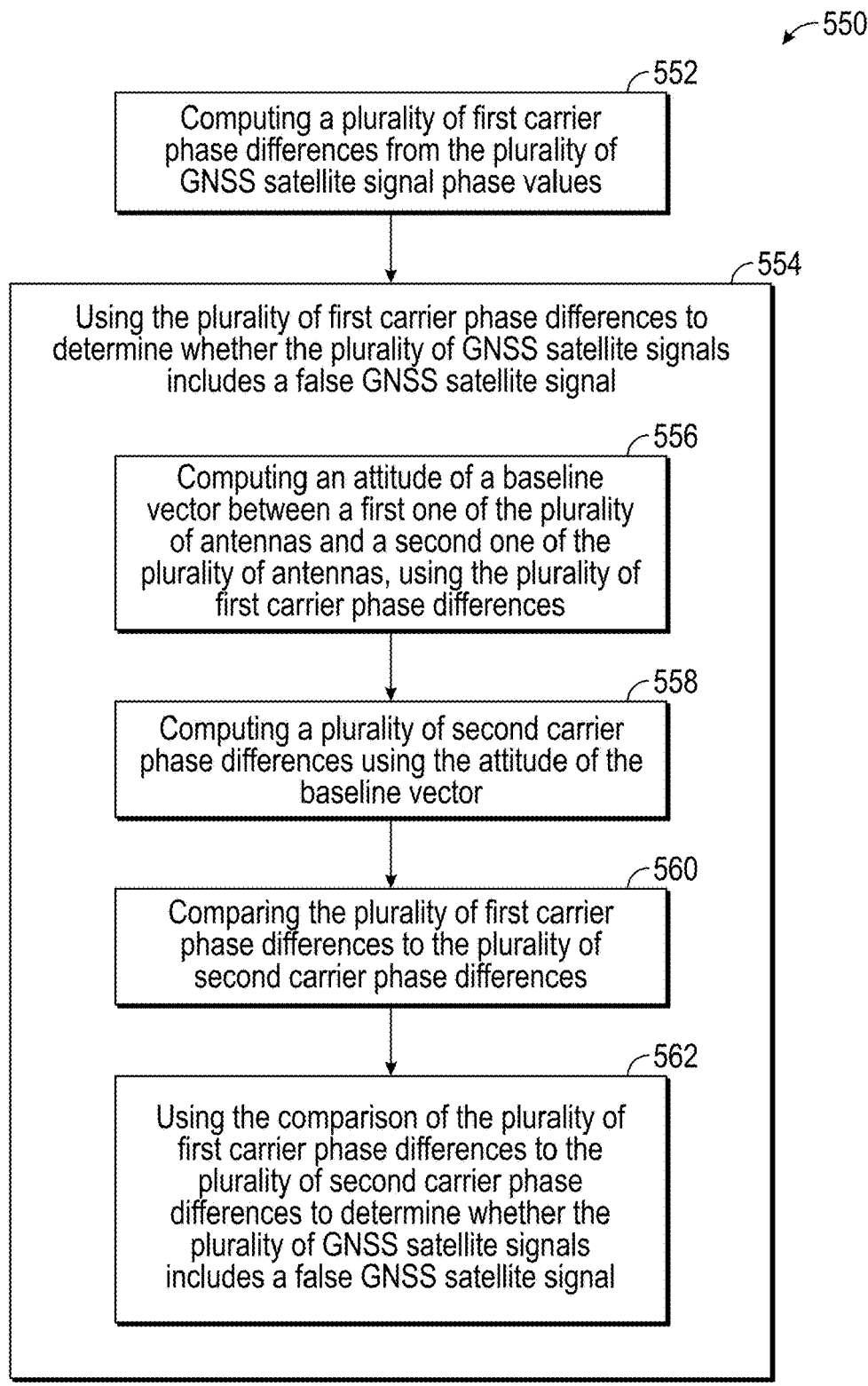
FIG. 9 shows a flow chart of one embodiment of element 550 of method 500.
Figure 10:
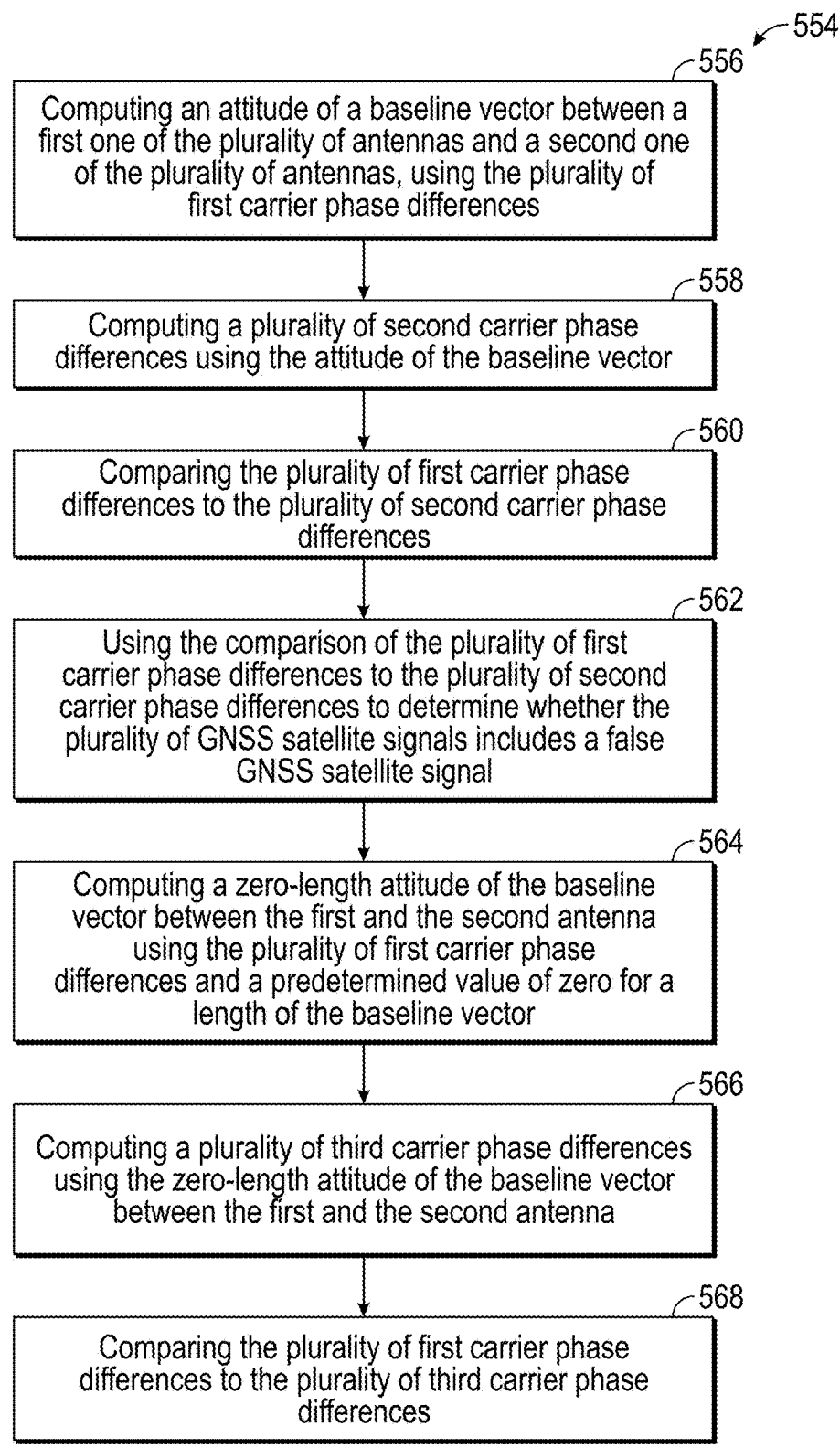
FIG. 10 shows a flow chart of one embodiment of element 554 of element 550.

Attitude determining system 390 as shown in FIG. 6 and FIG. 7 uses measurements of carrier phase φ values and computations of carrier phase differences Δ to detect false GNSS satellite signals. It is to be understood that code phase values and differences can be used in place of carrier phase values and differences in the computations described for attitude determining system 390. Carrier phase measurements are used in these embodiments because the carrier signal component has a higher precision than the code signal components, and therefore results in more precise location and attitude computations. FIG. 8 through FIG. 10 illustrate embodiments of a method 500 of detecting false GNSS satellite signals. FIG. 11 through FIG. 16 and the corresponding discussion show and describe the various elements included in the embodiments of method 500 shown in FIG. 8 through FIG. 10. In some embodiments of the invention, a GNSS attitude system such as system 390 is used to perform method 500. In some embodiments, a two-antenna system such as system 190 shown in FIG. 3 is used to perform method 500 of detecting false GNSS satellite signals. In some embodiments, the system for using method 500 of detecting false GNSS satellite systems includes at least a first antenna, a second antenna, and a receiver. The first and the second antenna receive a plurality of GNSS satellite signals. The receiver is electrically connected to the first and the second antenna, and receives the plurality of GNSS satellite signals received by each of the first and the second antenna. The receiver executes the elements included in the various embodiments of method 500 as illustrated in FIG. 8 through FIG. 10 and described below. The description below illustrates and describes how GNSS attitude determining system 390 of FIG. 6 through FIG. 7 and FIG. 11 through FIG. 16 is used to perform embodiments of method 500 to detect false GNSS satellite signals.

FIG. 8 illustrates one embodiment of method 500 of using a GNSS attitude system to detect false GNSS satellite signals. Method 500 includes an element 510 of receiving a plurality of GNSS satellite signals with each one of a plurality of antennas. In some embodiments each of the plurality of antennas belongs to the GNSS attitude system. In the embodiment shown in FIG. 6 and FIG. 7, GNSS attitude determining system 390 is performing method 500. In this embodiment the plurality of GNSS satellite signals includes GNSS satellite signals 306, 307, and 308 from GNSS satellites 303, 304, and 305 respectively. The plurality of antennas includes first antenna 301, second antenna 322, and third antenna 324. Each one of the plurality of antennas 301, 322, and 324 receives each one of the plurality of GNSS satellite signals 306, 307, and 308.

Method 500 includes an element 530 of measuring a plurality of GNSS satellite signal code or carrier phase φ values. Receiver 321 of attitude determining system 390 executes element 530 of measuring a plurality of GNSS satellite signal code or carrier phase φ values in the embodiment shown in FIG. 6 and FIG. 7. Each GNSS satellite signal code or carrier phase φ value is a GNSS satellite signal code or carrier phase φ value for each one of the plurality of GNSS satellite signals 306, 307, and 308 at each one of the plurality of antennas 301, 322, and 324. In the embodiment of system 390 shown in the figures and in the description below, system 390 is measuring GNSS satellite signal carrier phase φ values. Carrier phase φ values are used by attitude system 390 because the carrier signal component has a wavelength that is small as compared to the code length and therefore provides greater accuracy in range, location, and attitude calculations. It is to be understood that code phase measurements can be used in place of carrier phase measurements in the calculations.

Figure 11:
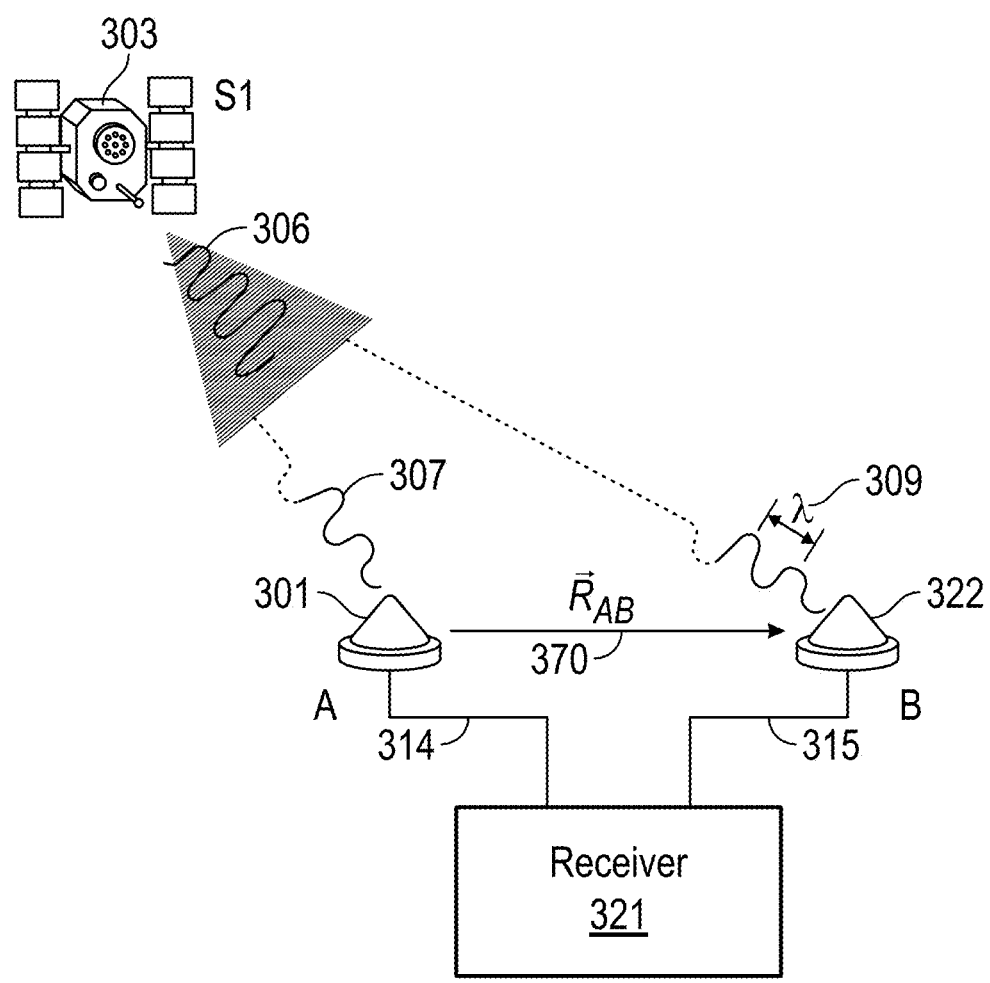
FIG. 11 depicts the reception of a GNSS satellite signal by a first and a second antenna.

FIG. 11 illustrates elements of the measurement of carrier phase φ values for a GNSS satellite signal. FIG. 11 shows a portion of system 390 of FIG. 6 and FIG. 7, including GNSS satellite 303, also referred to as satellite S1, first antenna 301, second antenna 322 and receiver 321. The remaining items included in the plurality of GNSS satellites and the plurality of antennas of FIG. 6 and FIG. 7 have been left out of FIG. 11 for simplicity. FIG. 11 depicts the reception of GNSS satellite signal 306 containing a carrier 307 component by antennas 301 and 322 of attitude determining system 390 of FIG. 6 and FIG. 7, where GNSS satellite signal 306 is then routed from each antenna to receiver unit 321. First antenna 301 and second antenna 322 receive GNSS satellite signal 306 from GNSS satellite 303 S1. GNSS satellite signal 306 received at each antenna 301 and 322 is routed via cables 314 and 315 to receiver unit 321. Receiver unit 321 tracks GNSS satellite signal 306 using tracking devices 202 and 203 associated with antennas 301 and 322 (FIG. 7). Code and carrier phase φ measurements of GNSS satellite signal 306 are made at regular intervals. Of particular importance to some embodiments of this invention is the phase φ of the carrier 307 of GNSS satellite signal 306, which is related to the range to the satellite by the carrier's wavelength λ 309. The carrier phase φ is the measure of the particular point in the wavelength cycle that the GNSS satellite signal is at when it reaches an antenna. The range to GNSS satellite 303 may be expressed in terms of the number of carrier wavelengths λ 309 that will divide it. For GPS satellites, carrier wavelength A 309 is approximately 19 cm for the L1 carrier and 24 cm for the L2 carrier. The tracking loops within receiver 321 typically track the carrier phase φ to an accuracy of less than three percent of the carrier's wavelength λ. This equates to 5 mm or less when tracking the L1 carrier signal in the GPS form of GNSS. The carrier phase value of GNSS satellite signal 306 as measured at first antenna 301 is designated $\varphi_A^{S1}$, and the carrier phase value of GNSS satellite signal 306 as measured at second antenna 322 is designated $\varphi_B^{S1}$. The naming convention used herein for carrier phase φ is such that the S1 superscript designates the satellite that originated the GNSS satellite signal that is having its phase measured, and the subscript designates the location of the antenna at which the carrier phase φ is measured.

Element 530 of measuring a plurality of GNSS satellite signal code or carrier phase φ values according to embodiments of the invention can include many other elements. Element 530 of measuring a plurality of GNSS satellite signal code or carrier phase φ values can be performed by any method known in the art now or discovered in the future for measuring GNSS satellite signal code or carrier phase φ values of GNSS satellite signals.

The embodiment of method 500 shown in FIG. 8 also includes an element 550 of using the plurality of GNSS satellite signal code or carrier phase φ values to determine whether the plurality of GNSS satellite signals 306, 307, and 308 includes a false GNSS satellite signal. Element 550 is executed by receiver 321 in the embodiment shown in FIG. 6 and FIG. 7. The measured GNSS satellite signal code or carrier phase φ values can be used in any number of ways to determine whether the plurality of GNSS satellite signals 306, 307, and 308 comprises one or more than one false GNSS satellite signal. Several of these ways are described below. In some embodiments the GNSS satellite signal code or carrier phase φ values are used to measure ranges and GNSS locations of the plurality of antennas as explained earlier with respect to FIG. 3 and FIG. 4. FIG. 9 and FIG. 10, which are to be discussed shortly, show and describe a number of further embodiments of element 550 of method 500 as shown in FIG. 8.

Method 500 of using a GNSS attitude system to detect false GNSS satellite signals can include many other elements. In some embodiments method 500 includes an element 570 of preventing the attitude system from outputting a positional output in response to determining that the plurality of GNSS satellite signals includes a false GNSS satellite signal. This element is shown in dotted lines in FIG. 8 because it is optional in method 500 of FIG. 8. In some embodiments, the system for detecting false GNSS satellite signals such as attitude determining system 190 or 390 described in this document provides a warning once false GNSS satellite signals are detected. In other embodiments, the system for detecting false GNSS satellite signals such as attitude determining system 190 or 390 described in this document excludes the detected false GNSS satellite signals from the location calculation. Element 570 includes any elements or steps performed, or executed, to provide a warning or to prevent the attitude system from outputting false navigational data. The false navigational data could allow the false GNSS satellite signals to take over navigation of a vehicle, for example. In some embodiments, element 570 includes preventing locational data from being output from attitude determining system 390. In some embodiments, element 570 includes preventing attitude data from being output from attitude determining system 390. In some embodiments, element 570 includes preventing range data from being output from attitude determining system 390. In some embodiments, element 570 includes preventing a National Marine Electronics Association (NMEA) output message such as the NMEA GPGGA output message from being delivered from attitude determining system 390. Preventing the attitude system from providing navigational data such as range, location, and attitude will prevent the false GNSS satellite signals from taking control of the equipment that is using the attitude system. In some embodiments, method 500 includes outputting a warning signal in response to detecting false GNSS satellite signals. In some embodiments, method 500 includes excluding false GNSS satellite signals from computations such as location, attitude, or time. In some embodiments, method 500 includes excluding a particular type of GNSS satellite signals (GPS, GLONASS, BDS) from computations in response to detecting a false GNSS satellite signal of the particular type. For example, if a GPS satellite signal is detected to be false, the attitude system can use GLONASS satellite signals for computations, excluding the GPS signals.

Several embodiments of element 550 of using the plurality of GNSS satellite code or carrier phase φ values to determine whether the plurality of GNSS satellite signals comprise a false GNSS satellite signal are shown in FIG. 9 and FIG. 10 and described below. FIG. 9 shows embodiments of element 550, including two embodiments of element 554 of element 550. FIG. 10 shows a further embodiment of element 554 of element 550.

Element 550 of FIG. 9 includes an element 552 of computing a plurality of first carrier phase differences $\Delta_1$ from the plurality of carrier phase φ values. In some embodiments code phase values are measured instead of carrier phase φ values, and code phase differences computed instead of carrier phase φ differences. It is to be understood that code phase values and differences can be used in place of carrier phase values and differences by attitude system 390. In this document the first carrier phase difference is designated as $\Delta_1$, and is defined as the difference between the measured carrier phase φ of a specific one of the plurality of GNSS satellite signals at a first antenna (A) and the measured carrier phase φ of that same specific one of the plurality of GNSS satellite signals at a second antenna (B), and is given by:

$$\Delta_1 = \varphi_B^S - \varphi_A^S, \quad (1)$$

where $\varphi_B^S$ is the measured carrier phase of the GNSS satellite signal originating at satellite S and having its carrier phase measured at antenna B, and $\varphi_A^S$ is the measured carrier phase of the same GNSS satellite signal originating at satellite S but having is carrier phase measured at antenna A. First carrier phase difference $\Delta_1$ in this embodiment is a measured carrier phase difference because it is determined from the measured carrier phase φ values. This is in contrast with the second estimated carrier phase difference $\Delta_2$ to be discussed shortly, which is an estimated carrier phase difference value computed based on geometric considerations.

Equation 1 provides one method of executing element 552 of FIG. 9 of computing a plurality of first carrier phase differences $\Delta_1$ from the plurality of carrier phase φ values. Once a plurality of carrier phase φ values are measured by receiver 321 of system 390 for a plurality of GNSS satellite signals at a plurality of antennas (element 530), the first carrier phase differences $\Delta_1$ are computed according to Equation 1 and element 552 of method 500. First carrier phase differences $\Delta_1$ are determined for each antenna pair and for each GNSS satellite signal. These first carrier phase differences $\Delta_1$ are then used to determine whether the plurality of GNSS satellite signals includes false GNSS satellite signals, as detailed as element 554 in FIG. 9 and FIG. 10. Thus, in some embodiments, computing a plurality of first carrier phase differences includes subtracting a measured carrier phase φ value of each individual one of the plurality of satellite signals as received at a first one of the plurality of antennas from a corresponding measured carrier phase φ value of each individual one of the plurality of satellite signals as received at a second one of the plurality of antennas.

Element 550 of method 500 in the embodiment shown in FIG. 9 includes an element 554 of using the plurality of first carrier phase differences $\Delta_1$ to determine whether the plurality of GNSS satellite signals includes a false GNSS satellite signal. The first carrier phase differences $\Delta_1$ can be used in many ways to determine whether the plurality of GNSS satellite signals includes a false GNSS satellite signal. Described below are the details of a number of example steps, elements, methods, and computations for executing element 554 of using the plurality of first carrier phase differences $\Delta_1$ to determine whether the plurality of GNSS satellite signals includes a false GNSS satellite signal using attitude determining system 390 of FIG. 6, and FIG. 7. These embodiments of element 554 include computations of the attitude of a baseline vector connecting two of the antennas (element 556 and element 564 to be described shortly), and the computation of second estimated carrier phase differences $\Delta_2$ (element 558 and 566 to be described shortly). The results of these computations using the plurality of carrier phase φ values and the plurality of first carrier phase differences $\Delta_1$ are used to determine whether the plurality of GNSS satellite signals include a false GNSS satellite signal.

Embodiments of element 554 of method 500 of detecting false GNSS satellite signals as shown in FIG. 9 and FIG. 10, and as used by system 390 rely on determining both a measured and an estimated carrier phase difference $\Delta$ value, and then comparing the measured and the estimated carrier phase difference $\Delta$ values to determine whether system 390 is receiving false GNSS satellite signals. System 390 according to embodiments of the invention computes a first measured carrier phase difference $\Delta_1$, and a second estimated carrier phase difference $\Delta_2$. Computation of the first carrier phase difference $\Delta_1$ comprise element 552 as described above according to Equation 1. Computation of the second carrier phase difference $\Delta_2$ comprise element 558 shown in FIG. 9 and FIG. 10 and will be discussed in further detail shortly. As mentioned earlier, first carrier phase difference $\Delta_1$ is in this embodiment a measured carrier phase difference, computed from measured carrier phase φ values using Equation 1. Second carrier phase difference $\Delta_2$ is an estimated value based on the assumed geometry of the GNSS satellites and the antennas. In a normal—non-spoofed GNSS system it is expected that the estimated second carrier phase difference $\Delta_2$ will match the measured first carrier phase difference $\Delta_1$. The residual error is the difference between first measured carrier phase difference $\Delta_1$ and second estimated carrier phase difference $\Delta_2$, in other words the residual error is the difference between the measured and the estimated calculations of carrier phase difference $\Delta$. When false GNSS satellite signals are present, the two values $\Delta_1$ and $\Delta_2$ will not agree. Thus false GNSS satellite signals can be detected by comparing the two carrier phase differences $\Delta_1$ and $\Delta_2$, because the residual error or amount of difference between the two carrier phase difference values $\Delta_1$ and $\Delta_2$ will often be large when false GNSS satellite signals are received. When false GNSS satellite signals are not present, the two values $\Delta_1$ and $\Delta_2$ will often match with little residual error. The mismatch of first measured carrier phase difference $\Delta_1$ values and second estimated carrier phase difference $\Delta_2$ values is the basis of some embodiments of element 554 of method 500 of detecting false GNSS satellite signals according to the invention. In some embodiments a third carrier phase difference $\Delta_3$—another estimated value—is computed and compared to the first and second carrier phase differences $\Delta_1$ and $\Delta_1$ Computation and use of third carrier phase difference $\Delta_3$ comprises elements 566 and 568 of element 554 of FIG. 10 and will be discussed shortly.

Figure 12:
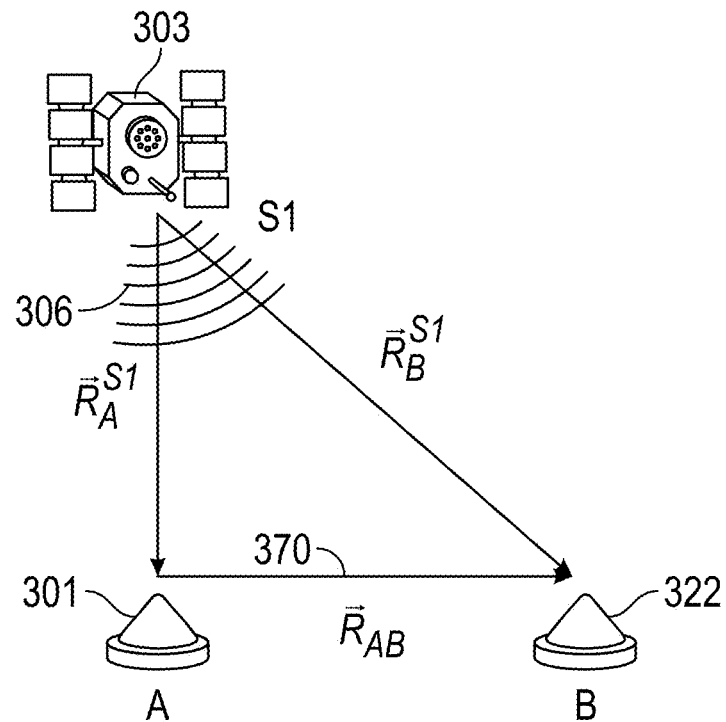
FIG. 12 illustrates range vectors extending from a satellite to a first and a second antenna, and a baseline vector extending between the first and the second antenna.
Figure 13:
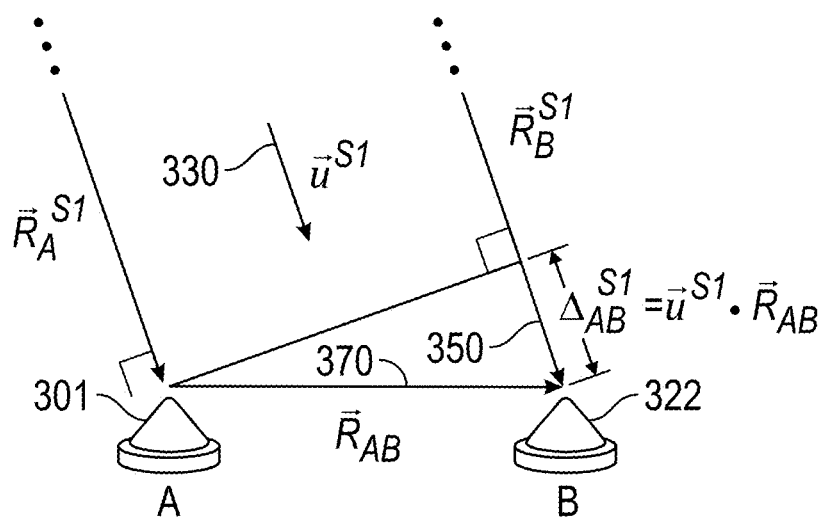
FIG. 13 shows the system of FIG. 12 with a geometry consistent with its use in a GNSS.

Element 554 of FIG. 9 includes element 556 of computing an attitude of a baseline vector between a first one of the plurality of antennas and a second one of the plurality of antennas using the plurality of first carrier phase differences $\Delta_1$. The attitude of the baseline vector is used to compute the second carrier phase difference $\Delta_2$. FIG. 12 through FIG. 15 illustrate elements important to the computation of the attitude of a baseline vector and the computation of the second carrier phase difference $\Delta_2$. FIG. 12 and FIG. 13 show components of attitude determining system 390 for detecting false GNSS satellite systems of FIG. 6, FIG. 7, and FIG. 11, with some of the components not shown for simplicity. FIG. 12 and FIG. 13 show first and second antennas 301 and 322 of FIG. 6, FIG. 7, and FIG. 11 located at points A and B. Antennas 301 and 322 each receive GNSS satellite signal 306 from GNSS satellite 303 S1. Range vector $\vec{R}_A^{S1}$ extends from satellite 303 (S1) to antenna 301 at point A. The range vector naming convention used herein is such that the superscript designates the satellite that the vector extends from, and the subscript designates the antenna that the vector extends to. Therefore range vector $\vec{R}_A^{S1}$ extends from satellite S1 (303) to antenna 301 at point A. Range vector $\vec{R}_B^{S1}$ extends from satellite S1 (303) to antenna 322 at point B. Vector $\vec{R}_{AB}$ extends between first antenna 301 and second antenna 322, joining points A and B. Any vector, such as vector $\vec{R}_{AB}$, that joins two antennas will be termed a baseline vector. For the purpose of illustration, in FIG. 12, baseline vector $\vec{R}_{AB}$, also denoted as 370 in the figures, is shown significantly large relative to the distance to satellite 303. FIG. 13 depicts the scenario that is more diagrammatically and geometrically accurate, where satellite 303 S1 (not shown in FIG. 13) is significantly far away relative to the length of $\vec{R}_{AB}$, so that range vectors $\vec{R}_A^{S1}$ and $\vec{R}_B^{S1}$ are essentially parallel.

The difference in the length of range vector $\vec{R}_A^{S1}$ and the length of range vector $\vec{R}_B^{S1}$ is a value that is equivalent to the carrier phase difference $\Delta_1$ of a GNSS satellite signal that is being received by both antenna 301 A and antenna 322 B. Thus, in the system shown in FIG. 12 and FIG. 13, the difference in the length of range vector $\vec{R}_A^{S1}$ and the length of range vector $\vec{R}_B^{S1}$ can be used to estimate the carrier phase difference $\Delta_1$ between the carrier phase $\varphi$ value of GNSS satellite signal 306 from GNSS satellite 303 (S1) as received at second antenna 322 ($\varphi_B^{S1}$) and the carrier phase $\varphi$ of signal 306 as received at first antenna 301 ($\varphi_A^{S1}$), and is defined as the geometric or estimated carrier phase difference $\Delta_{AB}^{S1}$, as shown in FIG. 13 denoted as 350. The naming convention used herein for geometric or estimated carrier phase difference is such that the S1 superscript designates the satellite that originated the GNSS satellite signal that is having its phase difference $\Delta$ estimated, and the AB subscript designates the antennas that are receiving the GNSS satellite signal.

Figure 14:
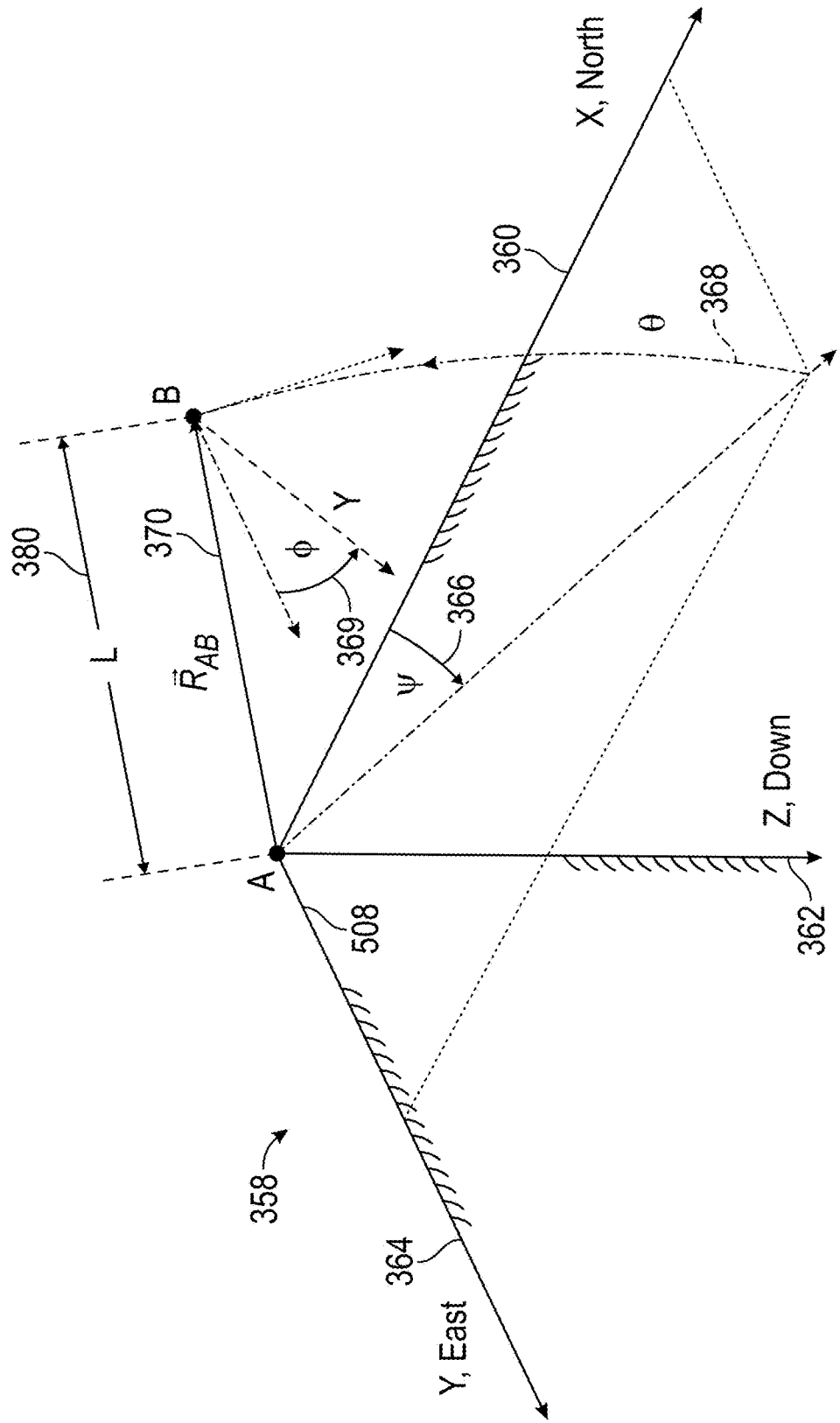
FIG. 14 illustrates three angles yaw, pitch and roll that can be used in attitude determination of an object.

Attitude systems such as attitude determining system 390 routinely compute the attitude, or orientation of an object's axes relative to a reference system, based on the computed GNSS location of two or more receiving antennas such as antenna 310 at location A and antenna 322 at location B shown in FIG. 13. FIG. 14 illustrates baseline vector 370 $\vec{R}_{AB}$ relative to earth base reference system 358. It is to be understood that often the attitude of objects is computed relative to a body-fixed reference system that is different than the earth-base reference system 358 shown, but the transformation from one reference system to another is a standard computation. Earth-base reference system 358 shown in FIG. 14 includes X axis 360 which points North, Y axis 364 which points East, and Z axis 362 which points down, towards the center of the earth. The attitude of baseline vector 370 $\vec{R}_{AB}$ can be defined using yaw angle $\psi$ 366, also known as heading, or azimuth angle, pitch angle $\theta$ 368, roll angle $\varphi$ 369, and length L 380. With a two-dimensional object only two angles are needed, pitch angle $\theta$ 368 and roll angle $\varphi$ 369. In many attitude determining systems length L 380 of baseline vector 370 $\vec{R}_{AB}$ is known because it is the distance between the two antennas 301 and 322, which is known or can be determined. Thus in some embodiments the computation of the attitude of the baseline vector includes computing the attitude of the baseline vector using a predetermined length of the baseline vector, where the predetermined length is the distance between the two antennas defining the baseline vector. The fewer the elements to be determined computationally, the fewer the number of equations that are needed to solve, and the more robust the computation. The computation of attitude of baseline vectors is routinely performed by GNSS attitude systems such as system 390. Method 500 takes advantage of this capability of attitude determining systems, and applies it to the problem of detecting false GNSS satellite signals. Details of the computation of the attitude of a baseline vector is described in more detail in U.S. Pat. No. 7,292,185 to Whitehead, et al, which the contents thereof are incorporated entirely herein by reference. It is to be understood that other angles and variables can be used to specify the attitude of a vector.

The estimated, or geometrically defined, carrier phase difference $\Delta_{AB}^{S1}$ 350 as described earlier is defined based on geometric considerations as shown in FIG. 13. This geometric carrier phase difference $\Delta_{AB}^{S1}$ 350 is in general the dot product of a unit vector from a GNSS satellite and the baseline vector $\vec{R}_{AB}$ between the two antennas at location A and B that are receiving the GNSS satellite signal, given by:

$$\Delta_{AB}^{S1} = \vec{\mu}^{S1} \cdot \vec{R}_{AB} \qquad (2)$$

where $\vec{\mu}^{S1}$ is the unit vector from satellite 303 S1 (denoted 330 in FIG. 13) and $\vec{R}_{AB}$ is the baseline vector 370 from antenna 301 at location A and antenna 322 at location B. The geometric carrier phase difference $\Delta_{AB}^{S1}$ is an estimated value for the measured carrier phase difference $\Delta_1$ as determine by equation 1. Substituting equation 2 into Equation 1 gives Equation 3:

$$\Delta_1 \approx \Delta_{AB}^{S1} = \vec{\mu}^{S1} \cdot \vec{R}_{AB}. \qquad (3)$$

Figure 15:
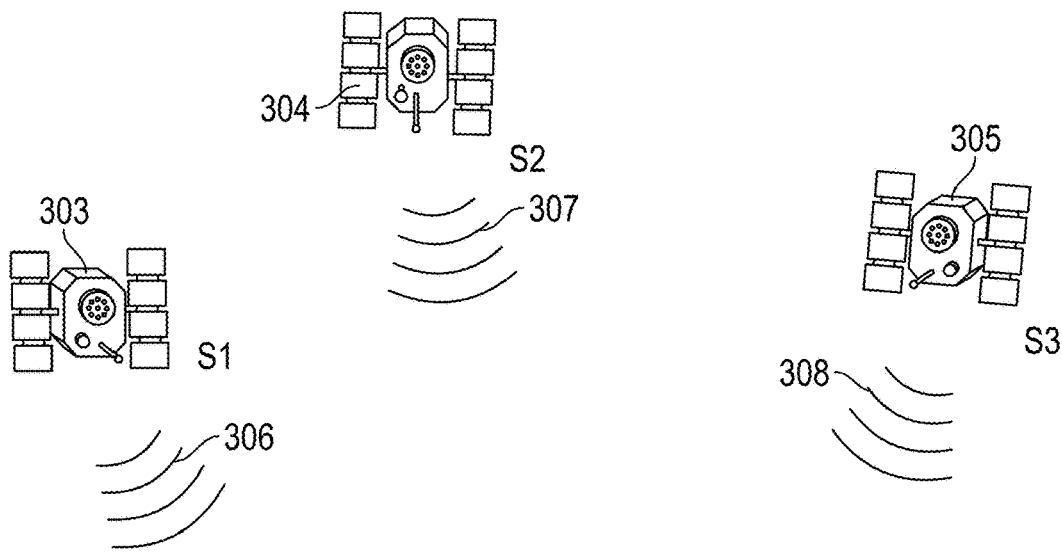
FIG. 15 illustrates geometrically the range vectors and phase differences of three GNSS satellite signals being received by a first and a second antenna.
Figure 15:
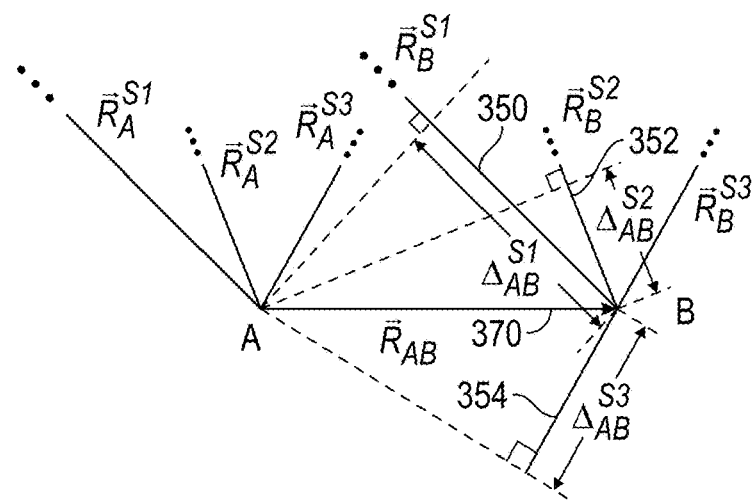

Equation 3 is used by attitude determining system 390 to execute element 556, solving for baseline vector $\vec{R}_{AB}$ using multiple measurements of first carrier phase differences $\Delta_1$ from multiple satellites. This is illustrated in FIG. 15. Unit vector $\vec{\mu}^{S1}$ 330 is determined by attitude determining system 390 using the known location of the originating satellite and the receiving antenna, as is known in the art of attitude determination. FIG. 15 shows the locations A and B of first and second antenna 301 and 322 of attitude system 390 of FIG. 6 and FIG. 7 and FIG. 11 through FIG. 13. Antennas 301 and 322 are not shown for simplicity of FIG. 13. Shown also are the three GNSS satellites 303 (S1), 304 (S2), and 305 (S3) of FIG. 6 and FIG. 7 and FIG. 11 through FIG. 13, the range vectors extending from each of GNSS satellites 303, 304, and 305 and locations A of first antenna 301 and location B of second antenna 322. GNSS satellites 303, 304, and 305 are broadcasting GNSS satellite signals 306, 307, and 308 respectively as shown previously in FIG. 6. Range vectors $\vec{R}_A^{S1}$ and $\vec{R}_B^{S1}$ are the range vectors from satellite 303 (S1) to locations A and B respectively. Range vectors $\vec{R}_A^{S2}$ and $\vec{R}_B^{S2}$ are the range vectors from satellite 304 (S2) to locations A and B respectively. Range vectors $\vec{R}_A^{S3}$ and $\vec{R}_B^{S3}$ are the range vectors from satellite 305 (S3) to locations A and B respectively. The estimated geometric carrier phase differences for each of the GNSS satellite signals 303, 304, and 305 as received by each of the first and the second antenna 301 and 302 are shown as $\Delta_{AB}^{S1}$ 350, $\Delta_{AB}^{S2}$ 352 and $\Delta_{AB}^{S3}$ 354 respectively.

Attitude determining system 390 executes element 556 in some embodiments by creating an Equation 3 for each GNSS satellite signal and each baseline vector, then using the multiple equations to solve for the attitude of the baseline vector. Algebraic least-squares method or Kalman filter methods may be used to solve for the attitude of the baseline vector using the measured first carrier phase differences $\Delta_1$. Attitude determining systems such as attitude determining system 390 of embodiments of the invention routinely perform calculations of the attitude of unit vectors and baseline vectors, as mentioned earlier. Further details about the calculation of unit vectors and baseline vectors can be found in U.S. Pat. No. 7,292,185 to Whitehead.

For the system shown in FIG. 13, the set of equations to be solved would be given by:

$$\Delta_{AB}{}^{S1}{}_1 = \vec{\mu}^{S1} \cdot \vec{R}_{AB}, \tag{4}$$

$$\Delta_{AB}{}^{S2}{}_1 = \vec{\mu}^{S2} \cdot \vec{R}_{AB}, \tag{5}$$

and $$\Delta_{AB}{}^{S3}{}_1 = \vec{\mu}^{S3} \cdot \vec{R}_{AB}, \tag{6}$$

where $\Delta_{AB}{}^{S1}{}_1$, $\Delta_{AB}{}^{S2}{}_1$, and $\Delta_{AB}{}^{S3}{}_1$ are the measured first carrier phase differences $\Delta_1$ computed using equation 1 and the measured carrier phase $\varphi$ values of GNSS satellite signals 306 (from satellite 303 S1), 307 (from satellite 304 S2), and 308 (from satellite 305 S3) measured at antenna 301 A and 322 B. These three equations are simultaneously solved to determine the attitude of the baseline vector $\vec{R}_{AB}$ 370. It is to be understood that in some embodiments more GNSS satellite signals are used, which provide a greater number of measured first carrier phase difference $\Delta_1$ values. Often, the greater the number of equations that are solved simultaneously, the greater the resulting accuracy of the calculation of the attitude of baseline vector $\vec{R}_{AB}$. In some embodiments the attitude of a second baseline vector is computed, where the second baseline vector extends between a first one of the plurality of antennas and a third one of the plurality of antennas. For attitude system 390 of FIG. 6, the second baseline vector extending between a first one of the plurality of antennas and a third one of the plurality of antennas is baseline vector $\vec{R}_{AC}$ 372 between antenna A 301 and antenna 324 at location C, for example.

In this way the plurality of first carrier phase differences $\Delta_1$ are used to perform element 556 of computing an attitude of a baseline vector between a first one of the plurality of antennas and a second one of the plurality of antennas. Element 556 is one of the elements that comprise element 554 in the embodiment of element 550 as shown in FIG. 9 and FIG. 10, and element 550 is one of the elements of method 500 according to embodiments of the invention of FIG. 8.

The next step in element 554 of using the plurality of first carrier phase differences $\Delta_1$ to determine whether the plurality of GNSS satellite signals comprises a false GNSS satellite signal of element 550 as detailed in FIG. 9, is element 558 of computing a plurality of second carrier phase differences $\Delta_2$ using the attitude of the baseline vector. For each of the first measured carrier phase difference $\Delta_1$ values, a corresponding second, or estimated, carrier phase difference $\Delta_2$ is computed using Equation 2 and the known attitude of the baseline vector and the unit vector from the solution to Equation 3. For the system shown in FIG. 15 the equations would be:

$$\Delta_{AB}{}^{S1}{}_1 = \vec{\mu}^{S1} \cdot \vec{R}_{AB}, \tag{7}$$

$$\Delta_{AB}{}^{S2}{}_1 = \vec{\mu}^{S2} \cdot \vec{R}_{AB}, \tag{8}$$

and $$\Delta_{AB}{}^{S3}{}_1 = \vec{\mu}^{S3} \cdot \vec{R}_{AB}, \tag{9}$$

where $\Delta_{AB}{}^{S1}{}_1$, $\Delta_{AB}{}^{S2}{}_2$ and $\Delta_{AB}{}^{S3}{}_2$ are the second or estimated carrier phase differences $\Delta_2$ values. It is to be understood that in some embodiments there will be more sets of baseline vectors, GNSS satellite signals, and corresponding measurements of carrier phase differences $\Delta_1$ and $\Delta_2$. In general computing a plurality of second carrier phase differences $\Delta_2$ using the attitude of the baseline vector extending between a first and a second antenna includes computing the dot product of the baseline vector extending between the first and the second antenna and each one of a plurality of unit vectors, wherein each of the plurality of unit vectors corresponds to each of a corresponding one of the plurality of GNSS satellites and GNSS satellite signals. The result is a set of second, or geometric, carrier phase differences $\Delta_2$ The second carrier phase differences $\Delta_2$ are computed based on the assumed geometry of the system, the GNSS satellite locations and the attitude of the baseline vector $\vec{R}_{AB}$. One of skill in the art will recognize that the calculation of first and second carrier phase differences is an iterative process which can be repeated to minimize error in the calculations, which will increase the reliability of the detection of false GNSS satellite signals.

Step 560 of element 554 as shown in FIG. 9 includes comparing the plurality of second estimated geometric carrier phase differences $\Delta_2$ to the first measured carrier phase differences $\Delta_1$. There are many ways that the first carrier phase differences $\Delta_1$ and the second carrier phase differences $\Delta_2$ can be compared to each other. In some embodiments the corresponding first and second carrier phase differences $\Delta_1$ and $\Delta_2$ are differenced and the differences squared and averaged or summed. In some embodiments this element involves subtracting the first carrier phase difference $\Delta_1$ for each one of the plurality of GNSS satellite signals from the second carrier phase difference $\Delta_2$ for the corresponding same one of the plurality of GNSS satellite signals. In some embodiments a residual error value is computed using the differences between the first and second carrier phase differences $\Delta_1$ and $\Delta_2$. In some embodiments the first carrier phase differences $\Delta_1$ and the second carrier phase differences $\Delta_2$ are compared in a way that results in a computation of a number or set of numbers that provides a measure of the size of the difference between the first and second carrier phase differences $\Delta_1$ and $\Delta_2$.

Step 562 of element 554 in the embodiment of element 550 shown in FIG. 8 includes using the comparison of the pluralities of first carrier phase differences $\Delta_1$ and second carrier phase difference $\Delta_2$ to determine whether the plurality of GNSS satellite signals includes a false GNSS satellite signal. Under normal operation of a GNSS navigational system, the second estimated or geometric carrier phase differences $\Delta_2$ should match the first or measured carrier phase differences $\Delta_1$ to within some threshold residual error value or margin of error. In some embodiments the computed residual error between the first carrier phase differences $\Delta_1$ and second carrier phase differences $\Delta_2$ can be compared to a threshold residual error value to determine if the difference between the first and second carrier phase differences $\Delta_1$ and $\Delta_2$ are large enough to indicate that the plurality of GNSS satellite signals comprises at least one false GNSS satellite signal. The first and second carrier phase difference $\Delta_1$ and $\Delta_2$ can be compared in any way which allows a determination of whether the differences between the two sets of values is large enough to indicate the presence of false GNSS satellite signals.

Figure 16:
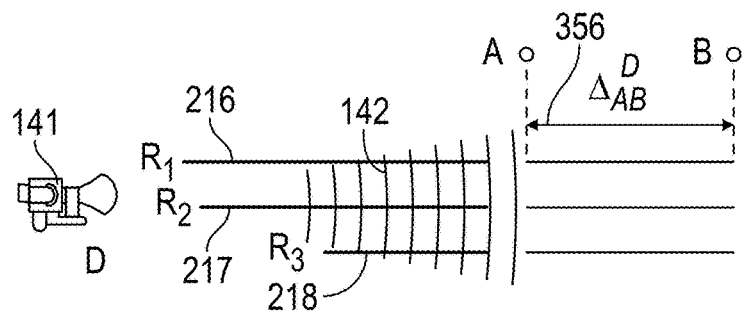
FIG. 16 illustrates the phase differences of a spoofing signal that includes three GNSS satellite signals as received by a first and a second antenna.

The difference between the first carrier phase differences $\Delta_1$ and the second carrier phase differences $\Delta_2$ will be large when there are false GNSS satellite signals present—the attitude system is being spoofed—because each of the false GNSS satellite signals will result in approximately the same first carrier phase difference $\Delta_1$ value for each satellite signal. This will not be the case when the attitude system is receiving real GNSS satellite signals. This is illustrated in FIG. 16. FIG. 16 shows the situation of FIG. 15 except first antenna 301 at location A and second antenna 322 at location B are receiving spoofing signal 142 of FIG. 1 through FIG. 3. Spoofing signal 142 in this embodiment contains three false GNSS satellite signals 116, 117, and 118 which result in range values of R1 (216), R2 (217), and R3 (218) being computed by receiver 321, as shown in the figures. When the carrier phase $\varphi$ of these signals 116, 117, and 118 is measured and differenced, the first measured carrier phase difference values $\Delta_1$ for each different false GNSS satellite signal will be the same value or nearly the same value within the accuracy of the computation, and will not match well with the corresponding second estimated or geometric carrier phase difference value $\Delta_2$, which assumes the satellite signals are originating from the sky where they would be originating from under normal non-spoofing circumstances.

For example and as shown in FIG. 13 through FIG. 16, the signal path length differences between first antenna 301 at location A and second antenna 322 at location B, depend on the angle that the GNSS satellite signal's path makes with respect to the baseline vector L as can be seen in FIG. 15. Satellites are typically at different points in the sky, and thus make different angles with respect to each baseline vector. In a normal system without false GNSS satellite signals such as shown in FIG. 15, both the first measured carrier phase differences $\Delta_1$ and the second geometric carrier phase differences $\Delta_2$ will be approximately the same value for each GNSS satellite signal, and each GNSS satellite signal will all have different phase difference values, as seen in FIG. 15 by the differing length of $\Delta_{AB}^{S1}$ (350), $\Delta_{AB}^{S2}$ (352) and $\Delta_{AB}^{S3}$ (354). In other words, in a normal non-spoofed system, the second estimated or geometrically computed carrier phase differences $\Delta_2$ will match the first or measured carrier phase differences $\Delta_1$ with little residual error.

When the attitude system is receiving false GNSS satellite signals, however, the first carrier phase differences $\Delta_1$ and the second carrier phase differences $\Delta_2$ will not match each other. The second carrier phase differences $\Delta_2$ will be different values for each GNSS satellite signal, as shown in FIG. 13 as $\Delta_{AB}^{S1}$ (350), $\Delta_{AB}^{S2}$ (352) and $\Delta_{AB}^{S3}$ (354), because attitude determining system 390 assumes the GNSS satellite signals are originating from different satellites in the sky, and will compute different second or geometric carrier phase differences $\Delta_2$ for each GNSS satellite signal. However, the first carrier phase differences $\Delta_1$ will be the same values for each GNSS satellite signal as shown in FIG. 16, and will be equal to the common path length difference $\Delta_{AB}^{D}$ (356) as shown in FIG. 16. The false GNSS satellite signals have the same path length difference, and hence the same first measured carrier phase difference $\Delta_1$ values as measured at each of the antennas at location A and B, because the false GNSS satellite signals are originating from the same transmitter 141. Thus, the residual errors between the first and second carrier phase differences $\Delta_1$ and $\Delta_2$ will be large in this situation. Thus, there will be no solution for the attitude of the baseline vector $\vec{R}_{AB}$ that will result in both small residual error between the first measured and second geometric carrier phase differences $\Delta_1$ and $\Delta_2$ and yield the correct, known baseline distance under spoofing conditions—when false GNSS satellite signals are being received.

This large difference between the first measured and second estimated carrier phase differences $\Delta_1$ and $\Delta_2$ is used in element 562 to determine that attitude determining system 390 is receiving at least one false GNSS satellite signal. When an attitude system such as system 390 is being spoofed with false GNSS satellite signals, the residual error between the first and second carrier phase differences $\Delta_1$ and $\Delta_2$ will be large. The residual error being larger than a threshold residual error value is an indication that false GNSS satellite signals are being received. It will be determined that at least one of the plurality of GNSS satellite signals are false GNSS satellite signals in response to the residual error value being larger than a threshold residual error value.

Thus receiver 321 of system 390 executes a computation resulting in a comparison of the first measured and second estimated carrier phase differences $\Delta_1$ and $\Delta_2$, and makes a determination of whether system 390 is receiving false GNSS satellite signals based on the result of the computation. In some embodiments a residual error is computed based on the differences between the first and second carrier phase differences $\Delta_1$ and $\Delta_2$. System 390 determines that false GNSS satellite signals are being received by system 390 when the residual error between the first and second carrier phase differences $\Delta_1$ and $\Delta_2$ is larger than a predetermined threshold residual error value.

A way to check this determination that the attitude system is receiving false GNSS satellite signals is to solve for the attitude of the baseline vector using a predetermined length L (380 in FIG. 14) of zero for the baseline vector. The solution of this attitude computation is called a zero-length baseline solution. As mentioned earlier, when a system is spoofed, the receiver will compute approximately the same GNSS location for each of the receiving antennas. Setting the length of the baseline vector between two antennas to zero is equivalent to the antennas being in the same location. Therefore, computing the attitude of the baseline vector between two antennas using a length of zero will result in a set of third estimated carrier phase differences $\Delta_3$ that better match the first carrier phase differences $\Delta_1$ that are measured using the false GNSS satellite signals. Here, $\Delta_3$ will be zero, or exhibit a term that is common to all satellite phase differences. The zero baseline solution means that the ranges at both antennas are assumed to be the same (or contain a common clock/delay term), and thus the ranges differences, $\Delta_3$, are zero or share a common value for all spoofed satellite signals.

This technique is embodied in element 554 as shown in FIG. 10. Elements 556, 558, 560 and 562 are as described earlier. Element 564 involves computing the zero-length baseline solution between the first antenna and the second antenna using the plurality of first carrier phase differences and a predetermined value of zero for the length L of the baseline vector. For attitude determining system 390 of FIG. 5 and FIG. 7 zero-length attitude vector $\vec{R}_{AB\ zero}$ will be solved for using Equation 4, 5, and 6 and a value of zero for the length L 380 of attitude vector $\vec{R}_{AB}$. Once the zero-length baseline solution $\vec{R}_{AB\,zero}$ is determined, this solution is used in Equation 7, 8, and 9 to compute a plurality of third estimated carrier phase differences $\Delta_3$.

Element 566 includes computing a plurality of third carrier phase differences $\Delta_3$ using the zero-length baseline solution between the first and the second antenna. For this element the zero-length baseline solution $\vec{R}_{AB\,zero}$ will be used in Equations 7, 8 and 9 above to compute a plurality of third estimated carrier phase differences $\Delta_3$.

Element 568 includes comparing the plurality of first carrier phase differences $\Delta_1$ to the plurality of third carrier phase differences $\Delta_3$. For computations with an attitude system such as attitude determining system 390 that is receiving false GNSS satellite signals, the third carrier phase difference $\Delta_3$ values will match well, with little residual error, to the first carrier phase differences $\Delta_1$. The first and third carrier phase differences $\Delta_1$ and $\Delta_3$ can be compared using any number of computations. In some embodiments, element 568 includes computing a zero-length residual error between the plurality of first carrier phase differences $\Delta_1$ and the plurality of third carrier phase differences $\Delta_3$. System 390 will determine whether false GNSS satellite signals are present based on the results of these computations. Receiver 321 of system 390 determines that false GNSS satellite signals are being received by system 390 when the residual error between the first and second carrier phase differences $\Delta_1$ and $\Delta_2$ is greater than a predetermined threshold residual error value, and the zero-length baseline residual error between the first and third carrier phase differences $\Delta_1$ and $\Delta_3$ is less than the predetermined threshold residual error value. The computation of the zero-length baseline solution, the resulting third carrier phase differences $\Delta_3$, and the zero-length residual error is used in this embodiment to confirm the determination that false GNSS satellite signals are present.

Thus, when an attitude determining system such as system 390 is being spoofed with false GNSS satellite signals, the residual error between the first measured and second estimated carrier phase differences $\Delta_1$ and $\Delta_2$ will be large. When the residual error is greater than a threshold residual error value it will be used as an indication of false GNSS satellite signals. When an attitude determining system such as system 390 is being spoofed with false GNSS satellite signals, the zero-length residual error between the first measured and third estimated carrier phase differences $\Delta_1$ and $\Delta_3$ will be small. When both the residual error is greater than a threshold residual error value AND the zero-length residual error is less than the threshold residual error value, it will be used as an indication of false GNSS satellite signals.

Described above is a number of systems and methods for determining the presence of false GNSS satellite systems. The system according to some embodiments of the invention uses at least two antennas to receive a plurality of GNSS satellite signals from a plurality of GNSS satellites. Measurements of GNSS satellite code or carrier phase φ of the GNSS satellite signals are made. The GNSS satellite code or carrier phase φ measurements are used in a number of computations to detect the presence of false GNSS satellite signals. Various embodiments of the method of detecting GNSS satellite systems include computations of the range to the GNSS satellites, the GNSS locations of the antennas, the attitude of baseline vectors between pairs of antennas, and first measured and second estimated carrier phase differences for the GNSS satellite signals at pairs of antennas. These measurements and computations are used to detect the presence of false GNSS satellite signals so that the vehicle or device that is using the system is not mis-directed by the false GNSS satellite signals, or does not provide incorrect time data. It is to be understood that the systems, methods, computations, and elements described herein can be used in many different forms according to embodiments of the invention, and is not limited to the examples described in this document. Many variations will be apparent to those skilled in the art based upon the examples and descriptions in this document.

FIG. 17 through FIG. 31 show and describe embodiments of systems and methods for determining the direction of a false GNSS satellite signal transmitter. Once it is determined that a navigational device is receiving false GNSS satellite signals, it may be useful to determine which direction the false GNSS satellite signals are coming from. This direction information can be used to block the false signals, for example, or to help in finding and disabling the false GNSS satellite signal transmitter. In the example embodiment described below, devices 690, 790 and 890 both detect the presence of the false GNSS satellite signals, and determine the direction of the false GNSS satellite signal transmitter that is transmitting the false GNSS satellite signals. It is to be understood that these actions could be performed by two (or more) different GNSS devices in some embodiments.

Figure 17:
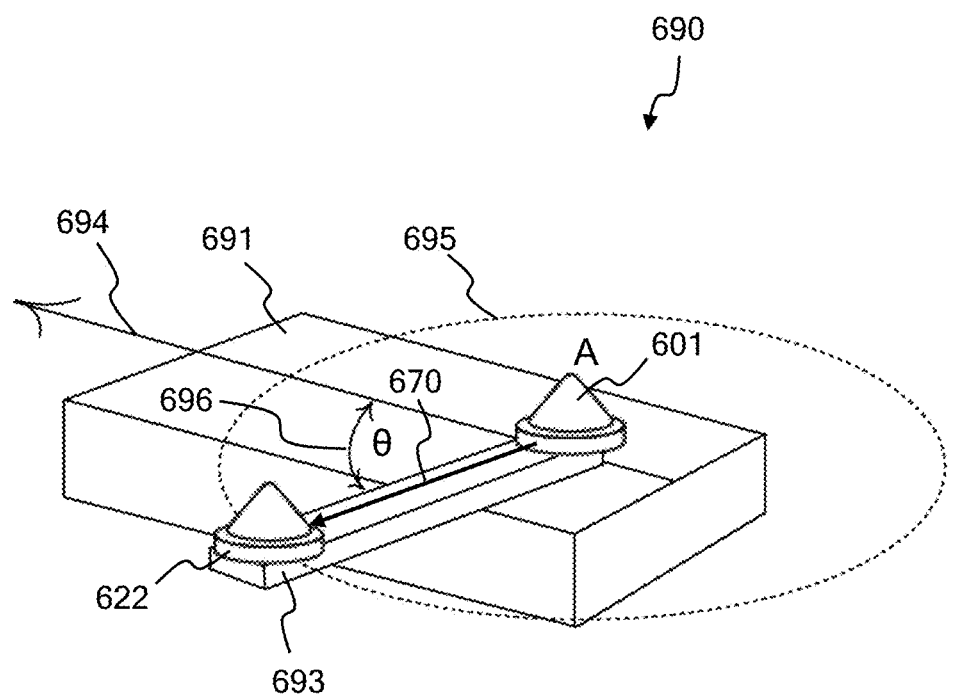
FIG. 17 is a perspective view of an embodiment of a device for determining the direction of a false GNSS satellite signal transmitter.

FIG. 17 shows a perspective view of an embodiment of a GNSS device 690 for determining the direction of a false GNSS satellite signal transmitter. GNSS device 690 includes a device body 691, a first antenna 601, a second antenna 622, and a rotation apparatus 693. GNSS device 690 also includes a receiver 621 as shown in block diagram form in FIG. 18. Receiver 621 is inside device body 691 in this embodiment. In some embodiments, receiver 621 is external to device body 691. Device body 691 has a direction axis 694. Direction axis 694 is used as the reference direction when determining the direction of the false GNSS satellite signal transmitter. Direction axis 694 can be aligned with, or correlated to, a direction on a rigid body that GNSS device 690 is mounted to.

First antenna 601 and second antenna 622 are GNSS satellite signal receiver antennas similar to antennas 101 and 122 and 301 and 322 discussed earlier. GNSS device 690 is similar to GNSS devices 190 and 390 discussed earlier, except that GNSS device 690 includes rotation apparatus 693 as shown in the figures and described herein. Rotation apparatus 693 moves, or rotates, second antenna 622 around first antenna 601. Rotation apparatus 693 rotates second antenna 622 around first antenna 601 so that GNSS device 690 can determine the direction of a false GNSS satellite signal transmitter, as will be explained shortly. Rotation apparatus 693 moves second antenna 622 such that baseline vector 670 extending from first antenna 601 to second antenna 622 has a constant length, and rotates through a plurality of rotation angles θ 696. Rotation angle θ 696 is measured with respect to direction axis 694, as shown in FIG. 17 and FIG. 19.

Figure 19:
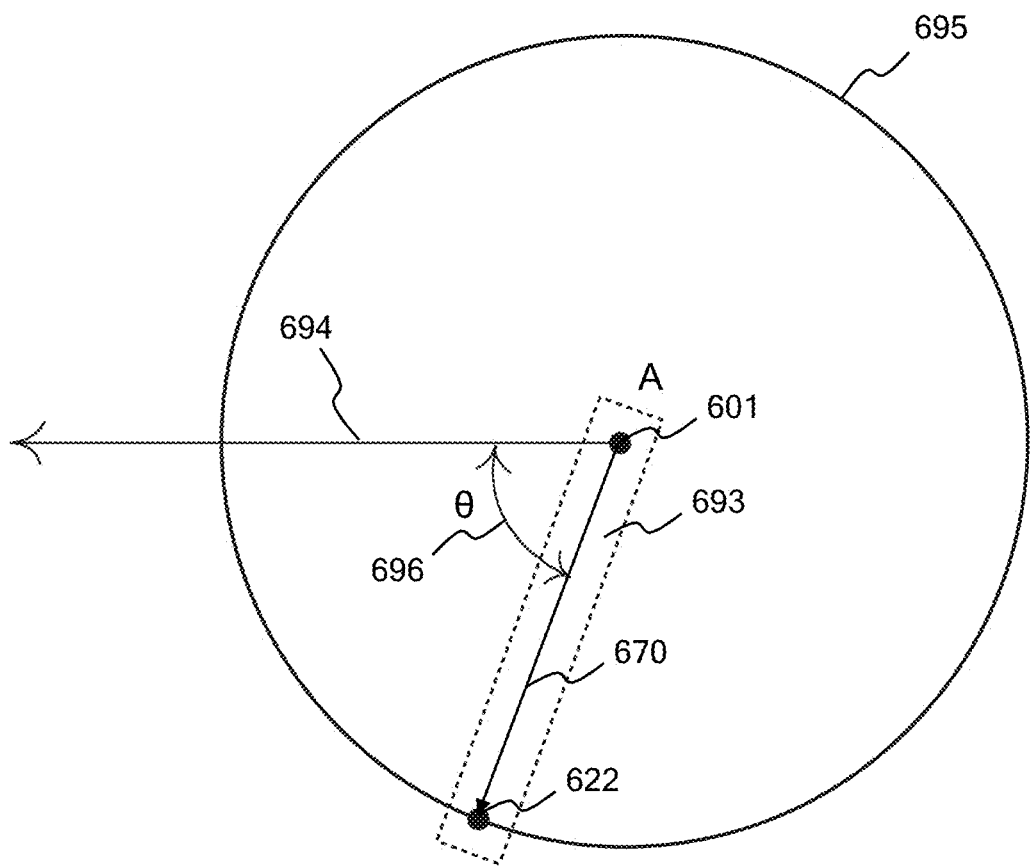
FIG. 19 is a simplified top view of a first and a second antenna of the device of FIG. 17.

FIG. 19 shows a simplified top view of first antenna 601 and second antenna 622 (drawn in simplified form), baseline vector 670 extending from first antenna 601 to second antenna 622, and direction axis 694. Second antenna 622 follows rotation path 695 around first antenna 601 as shown in FIG. 17 and FIG. 19. First antenna 601 is fixed at location A in this embodiment. Rotation angle θ 696 is the angle between baseline vector 670 and direction axis 694. Rotation angle θ 696 varies from 0 to 360 degrees as antenna 622 rotates in a 360 degree circle about first antenna 601 on rotation path 695. It is to be understood that in some embodiments rotation device 693 is designed such that second antenna 622 rotates in a sphere or other rotation surface around first antenna 601. Embodiments of rotation device 693 can be designed to rotate second antenna 622 in any desired rotation surface around first antenna 601, according to the rotation angle set within which it is desired to look for a direction of a false GNSS satellite transmitter.

Figure 18:
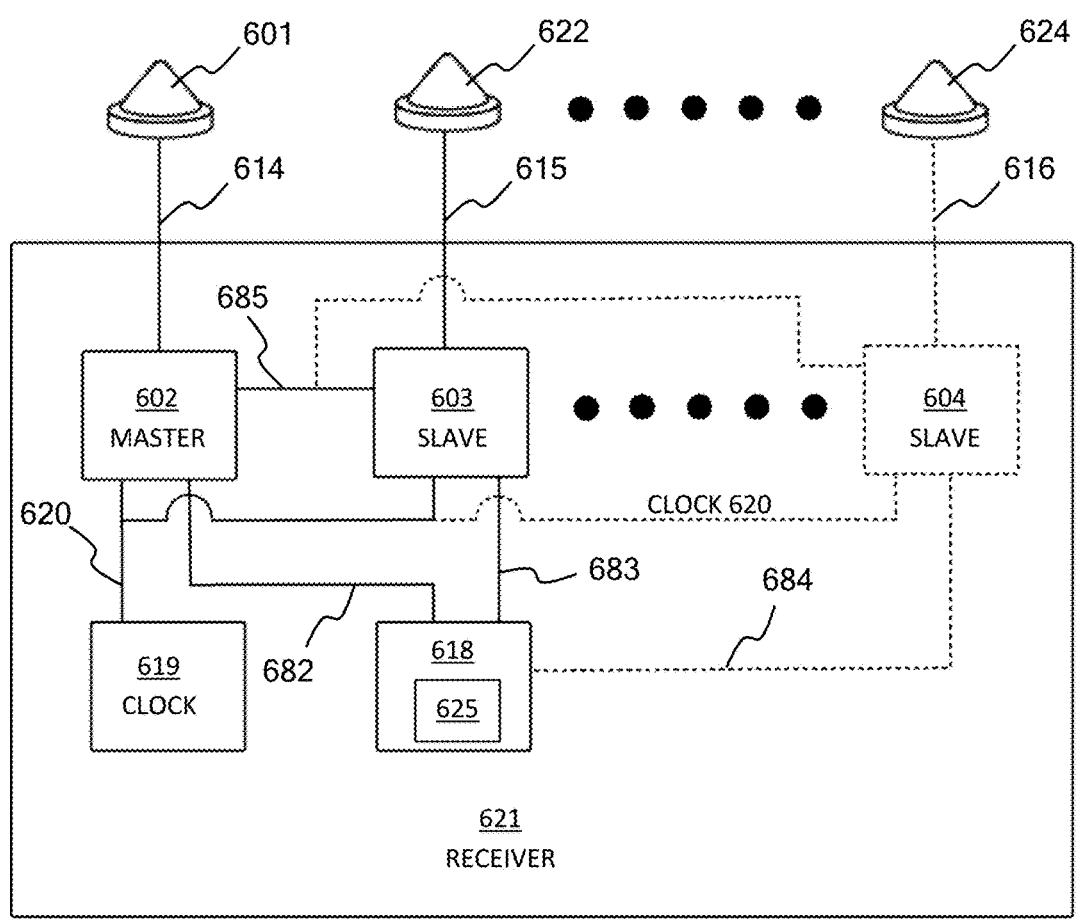
FIG. 18 is a simplified block diagram of an embodiment of a receiver of a device device for determining the direction of a false GNSS satellite signal transmitter.

GNSS device 690 also includes a processor 618, which in this embodiment is a part of receiver 621 (See FIG. 18). Processor 618 computes range differences ΔR for different rotation angles θ 696 of baseline vector 670, and uses the computed range differences ΔR to determine the direction of the false GNSS satellite signal transmitter, as explained below.

FIG. 18 shows an example embodiment of receiver 621 of GNSS device 690 of FIG. 17 that can be used for determining the direction of a false GNSS satellite signal transmitter. GNSS device 690 of FIG. 18 uses single receiver unit 621 of FIG. 18, containing multiple synchronized tracking devices 602 and 603. In some embodiments receiver unit 621 uses more than two tracking units, such as tracking unit 604 or additional tracking units coupled to additional antennas such as antenna 624. These optional devices are shown in dotted lines in FIG. 18 to show that embodiments of receiver 621 can be coupled to, and track, more than first antenna 601 and second antenna 622.

Each tracking device 602 and 603 is associated with exactly one antenna 601 and 622 respectively. Each tracking device 602 and 603 is capable of tracking a plurality of GNSS satellites. Tracking devices 602 and 603 serve the function of down converting the received Radio Frequency (RF) GNSS satellite signals arriving from a plurality of GNSS satellites, sampling the composite signal, and performing high-speed digital processing on the composite signal (such as correlations with a PRN reference signal) that allow the code and carrier phase φ of each satellite to be tracked, and range calculation to be made between each antenna 601 and 622 and each of the GNSS satellites being tracked. Examples and further description of synchronized tracking devices such as tracking devices 602 and 603 are described in commonly assigned U.S. Pat. No. 7,292,186 entitled Method and System for Synchronizing Multiple Tracking Devices For A Geo-location System, filed Jan. 5, 2005, the contents of which are incorporated by reference herein in their entirety.

Each tracking device 602 and 603 is connected to a single shared processor 618 in this embodiment. Processor 618 sends control commands 682 and 683 (and optionally 684 and/or additional control signals) to the plurality of tracking devices 602 and 603, respectively. Control commands 682 and 683 enable tracking devices 602 and 603 to track a plurality of GNSS satellites. Processor 618 receives back from each tracking device 602 and 603 code and carrier phase φ measurements of the plurality of GNSS satellite signals received from the plurality of GNSS satellites being tracked.

Synchronization signal 685 is sent from master tracking device 602 to slave tracking device 603. Sync signal 685 allows master tracking device 602 and slave tracking devices 603 (and other slave tracking devices such as slave 604 in some embodiments) to measure the code and carrier phase φ of each of a plurality of GNSS satellite signals simultaneously. Furthermore, the RF down conversion within each tracking device 602 and 603 and the sampling of data by each tracking device 602 and 603 is done using common clock signal 620. When a single-difference phase observation is formed by subtracting the carrier (or code) phase φ measured by one tracking device with that measured by another tracking device for the same GNSS satellite, the portion of the phase due to receiver 621's clock error is essentially eliminated in the difference. Thereafter, all that remains of the single-difference clock error is a small, nearly constant bias that is due to different effective RF path lengths (possibly resulting from different cable lengths, slightly different filter group-delays, and the like). Consequently, the clock error may be estimated infrequently compared to other more important quantities such as heading, pitch, or roll.

Figure 20:
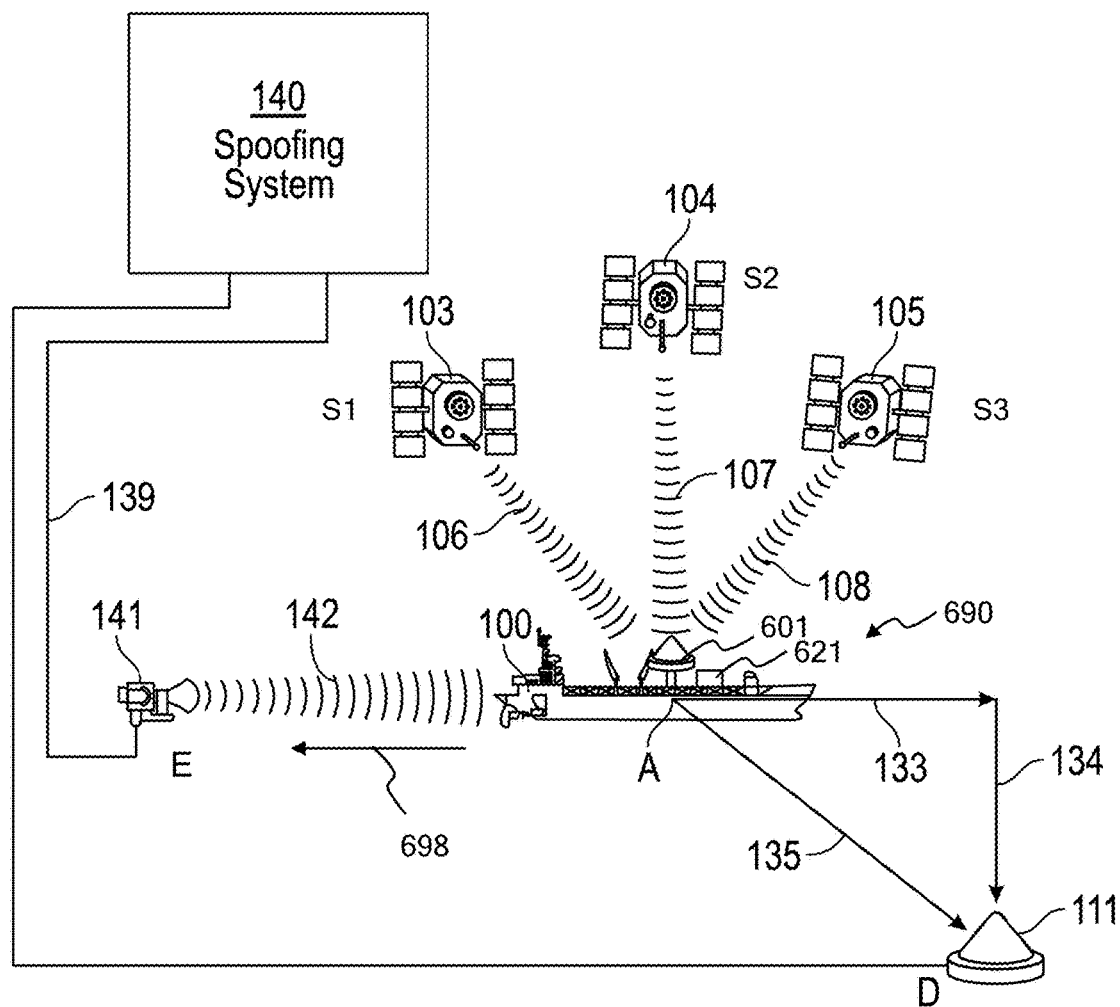
FIG. 20 is a simplified depiction of a vessel with device 690 for determining the direction of a false GNSS satellite signal transmitter of FIG. 17, receiving false GNSS satellite signals from a transmitter.
Figure 21:
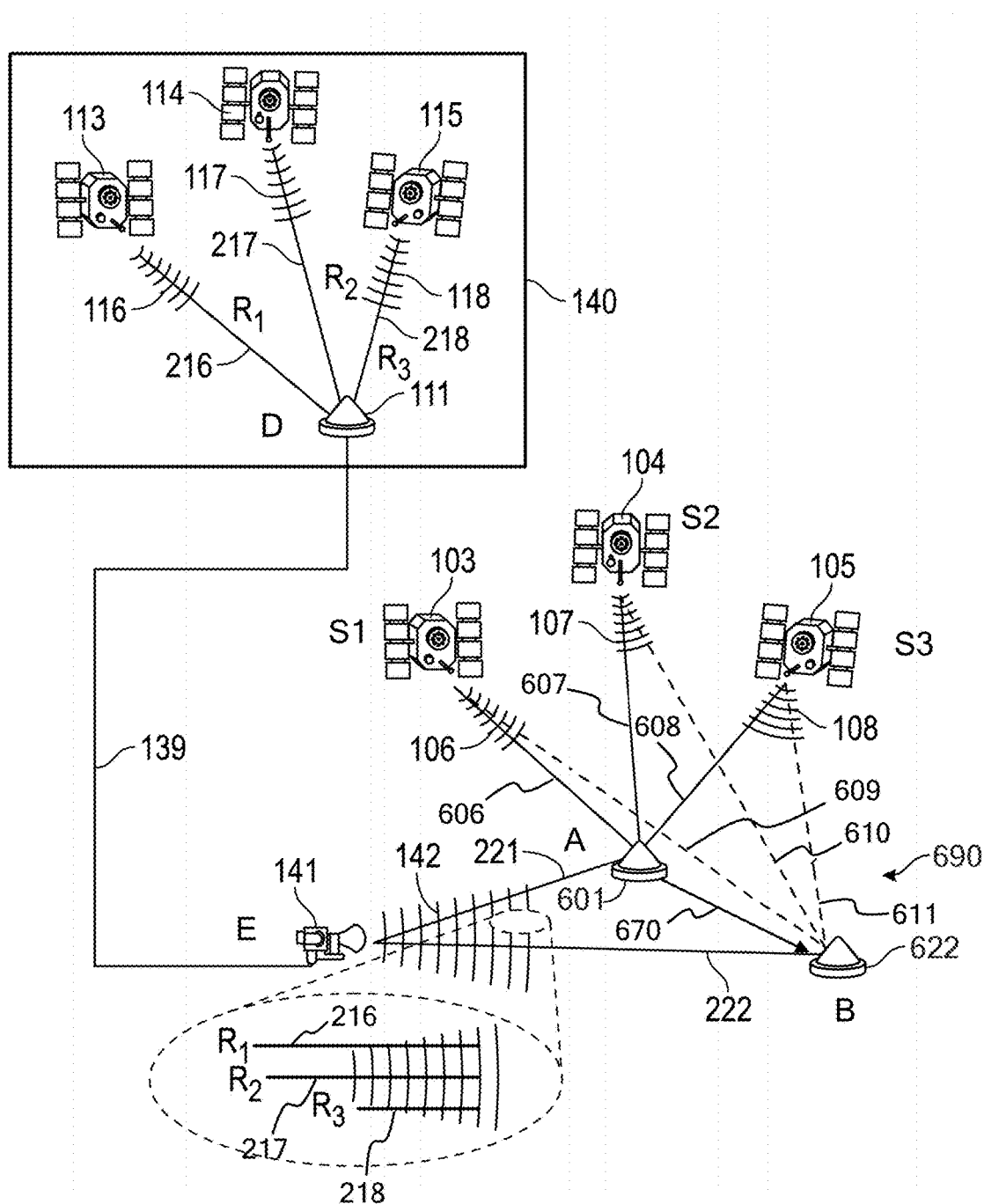
FIG. 21 shows antenna 601 and antenna 622 of device 690 of FIG. 20 receiving real GNSS satellite signal and false GNSS satellite signals.

FIG. 20 and FIG. 21 shows device 690 for determining the direction of a false GNSS satellite signal transmitter of FIG. 17 through FIG. 19 mounted to vessel 100 of FIG. 1 and FIG. 3. FIG. 1 and FIG. 3 show an embodiment of system 190 for detecting false GNSS satellite signals mounted to vessel 100. In the embodiment shown in FIG. 20 and FIG. 21, vessel 100 of FIG. 1 includes device 690 for determining a direction 698 of false GNSS satellite signal transmitter 141. GNSS device 690 has replaced GNSS system 190 on vessel 100. GNSS device 690 has the features and capabilities of system 190 as shown and described in FIG. 1 through FIG. 10 and the associated text, with similar numbers used to denote similar features. Device 690 in this embodiment detects the presence of false GNSS satellite signals, the same or similar to system 190 and/or system 390 described earlier. GNSS device 690 also determines the direction 698 of the false GNSS satellite signal transmitter, such as false GNSS satellite signal transmitter 141 shown in the figures.

In the embodiment of device 690 shown in FIG. 17 through FIG. 23, device 690 has two GNSS antennas, first antenna 601 and second antenna 622. Both first antenna 601 and second antenna 622 are receiving a plurality of GNSS satellite signals, which in this embodiment includes GNSS satellite signals 106, 107, and 108. Device 690 for detecting false GNSS satellite signals and determining the direction of a false GNSS satellite signal transmitter also includes receiver 621 connected to both first antenna 601 and second antenna 622 (see FIG. 18 for a block diagram of receiver 621). In this embodiment each tracking device 602 and 603 is tracking each satellite S1 103, S2 104 and S3 105. Receiver 621 receives GNSS satellite signals 106, 107, and 108 from first antenna 601 and second antenna 622, measures GNSS satellite signal phase φ values (either code or carrier phase) of the GNSS satellite signals, and performs the range, location and attitude computations as required.

In FIG. 20 and FIG. 21, GNSS device 690 is being spoofed with spoofing system 140, as described earlier with GNSS system 190 and GNSS system 390. False GNSS satellite signal 142 (spoofing signal 142) is being received by first antenna 601 of GNSS device 690 for detecting false GNSS satellite systems and determining the direction of false GNSS transmitter 141. GNSS device 690 is fixed to vessel 100 of FIG. 1. Antenna 601 is fixed to vessel 100 at location A as shown in the figures, because GNSS device 690 is fixed to vessel 100. Antenna 622 rotates around antenna 601 in rotation path 695 as shown in FIG. 17 and FIG. 19.

Antennas 601 and 622 receive both the intended GNSS satellite signals 106, 107, and 108, and false GNSS satellite signal 142. Spoofing system 140 sends false GNSS satellite signal 142 along cable 139 and broadcasts false GNSS satellite signal 142 over false GNSS satellite signal transmitter 141 at location E. Spoofing system 140 may generate false GNSS satellite signal 142 by rebroadcasting GNSS satellite signals 116, 117, and 118 from GNSS satellites 113, 114, and 115 as received by antenna 111 at GNSS location D, as shown in FIG. 20 and FIG. 21, and as described earlier for system 190 shown in FIG. 1 through FIG. 3. GNSS satellite signals 116, 117, and 118 contain timing information that enable the computation of ranges $R_1$, $R_2$, and $R_3$ representing the distance between satellites 113, 114 and 115, respectively, and antenna 111. Ranges $R_1$, $R_2$, and $R_3$ are denoted 216, 217 and 218 in FIG. 21. Range computations of $R_1$, $R_2$ and $R_3$ are made by receiver 621 of device 690 from measurements of GNSS satellite signal phase φ of GNSS satellite signals 116, 117 and 118 as received by antenna 111 of FIG. 20. Note that range measurements $R_1$, $R_2$ and $R_3$ will be mistakenly computed by any GNSS receiver that is receiving and processing false GNSS satellite signal 142.

The intended, real GNSS satellite signals 106, 107, and 108, are broadcast by satellites S1 103, S2 104 and S3 105 as shown in FIG. 20 and FIG. 21, the same as shown in FIG. 1 and FIG. 3. GNSS satellite signals 106, 107, and 108 travel from satellites S1 103, S2 104 and S3 105, respectively, to antenna 601 that is located at A. Under normal (non-spoofed) operation, GNSS receiver 621 connected to antenna 601 would measure GNSS satellite signal code or carrier phase φ values for GNSS satellite signals 106, 107 and 108 as received by antenna 101, and compute ranges $\vec{R}_A^{S1}$ 606, $\vec{R}_A^{S2}$ 607 and $R_A^{S3}$ 608 representing the distance between satellites 103, 104, and 105 and antenna 601.

Additionally, GNSS satellite signals 106, 107, and 108 from GNSS satellites S1 103, S2 104, and S3 105, travel to antenna 622 located at B in FIG. 21. Location B is one available location of second antenna 622 along rotation path 695. Under normal operation, GNSS receiver 621 connected to antenna 622 would measure GNSS satellite signal code or carrier phase φ values for GNSS satellite signals 106, 107 and 108 as received by antenna 622, and compute ranges $\vec{R}_B^{S1}$ 609, $\vec{R}_B^{S2}$ 610 and $\vec{R}_B^{S3}$ 611 as the distance between GNSS satellites 103, 104, and 105 and antenna 622.

Again under normal operation, GNSS receiver 621 uses the range $\vec{R}_A^{S1}$ 606, $\vec{R}_A^{S2}$ 607 and $\vec{R}_A^{S3}$ 608 computations to compute GNSS location A for the location of antenna 601, where GNSS location A approximately coincides with the location of antenna 601 to the accuracy of the receiver. As well, under normal operation, GNSS receiver 621 connected to antenna 622 uses the $\vec{R}_B^{S1}$ 609, $\vec{R}_B^{S2}$ 610 and $\vec{R}_B^{S3}$ 611 range values and computes a GNSS location B that approximately coincides with the location B of antenna 622. Computed ranges $\vec{R}_B^{S1}$ 609, $\vec{R}_B^{S2}$ 610 and $\vec{R}_B^{S3}$ 611 are different from $\vec{R}_A^{S1}$ 606, $\vec{R}_A^{S1}$ 607 and $\vec{R}_A^{S1}$ 608. And the two GNSS locations A and B computed by receiver 621 connected to antennas 601 and 622 are different GNSS locations under normal operation, because locations A and B are not physically co-located. These ranges can be based on measurements of code phase or carrier phase, with carrier phase measurements providing more accurate results. Range differences ΔR are then computed by differencing the ranges measured at antenna 622 from those measured at antenna 601.

During spoofing, signal 142 overpowers real GNSS satellite signals 106, 107, and 108. Signal 142 is received by both antenna 601 and antenna 622. GNSS receiver 621 connected to first antenna 601 and second antenna 622 measures GNSS satellite signal carrier phase φ values and computes ranges of $R_1$ 216, $R_2$ 217 and $R_3$ 218 as if received by antenna 111 instead of the intended ranges ($\vec{R}_A^{S1}$ 606, $\vec{R}_A^{S2}$ 607 and $\vec{R}_A^{S3}$ 608, and $\vec{R}_B^{S1}$ 609, $\vec{R}_B^{S2}$ 610 and $\vec{R}_B^{S3}$ 611). GNSS receiver 621 measures identical ranges of $R_1$ 216, $R_2$ 217 and $R_3$ 218 for what receiver 621 believes to be the path length to satellites 103 S1, 104 S2 and 105 S3 from both antenna 601 and antenna 622. Navigation and timing calculation performed by device 690 are now based on false ranges $R_1$ 216, $R_2$ 217 and $R_3$ 218, which purposely are designed to cause GNSS receive 621 to produce an incorrect location and/or time.

Baseline vector $\vec{R}_{AB}$ 670 extends from antenna 601 to antenna 622. GNSS device 690 determines the length and attitude of baseline vector $\vec{R}_{AB}$ 670 and uses this information to determine the presence of false GNSS satellite signal 142 as described earlier using GNSS system 190 and/or GNSS system 390.

GNSS device 690 for determining the direction of false GNSS satellite signal transmitter 141 uses rotation mechanism 693 to rotate baseline vector $\vec{R}_{AB}$ 670 with respect to direction axis 694 and determine which rotation angle θ 696 corresponds to the direction 698 of false GNSS satellite signal transmitter 141, as explained below and shown in FIG. 22 through 26.

Figure 22:
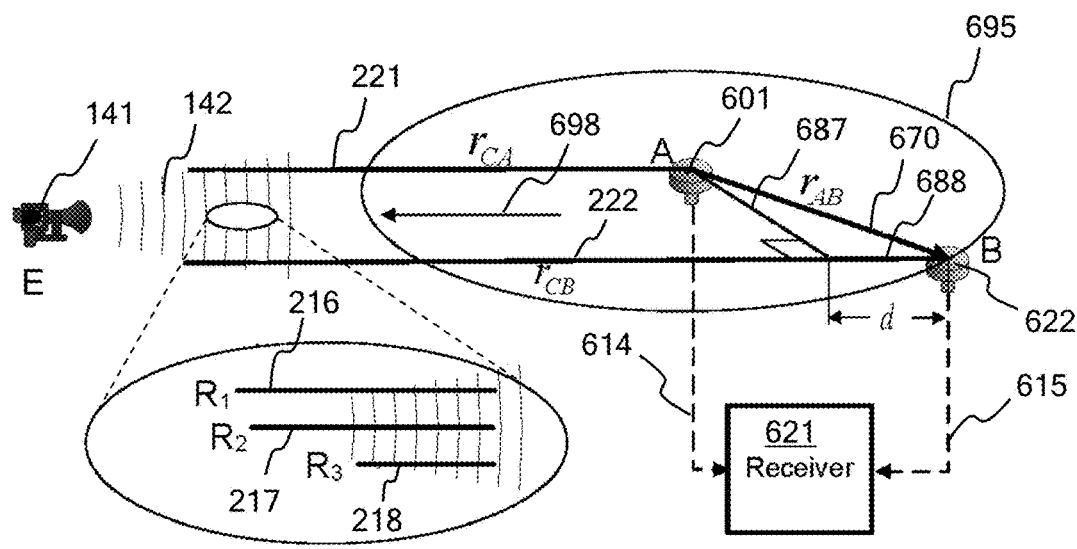
FIG. 22 shows a perspective view of GNSS antenna 601 and GNSS antenna 622 of device 690 of FIG. 20 receiving false GNSS satellite signals from transmitter 141.
Figure 23:
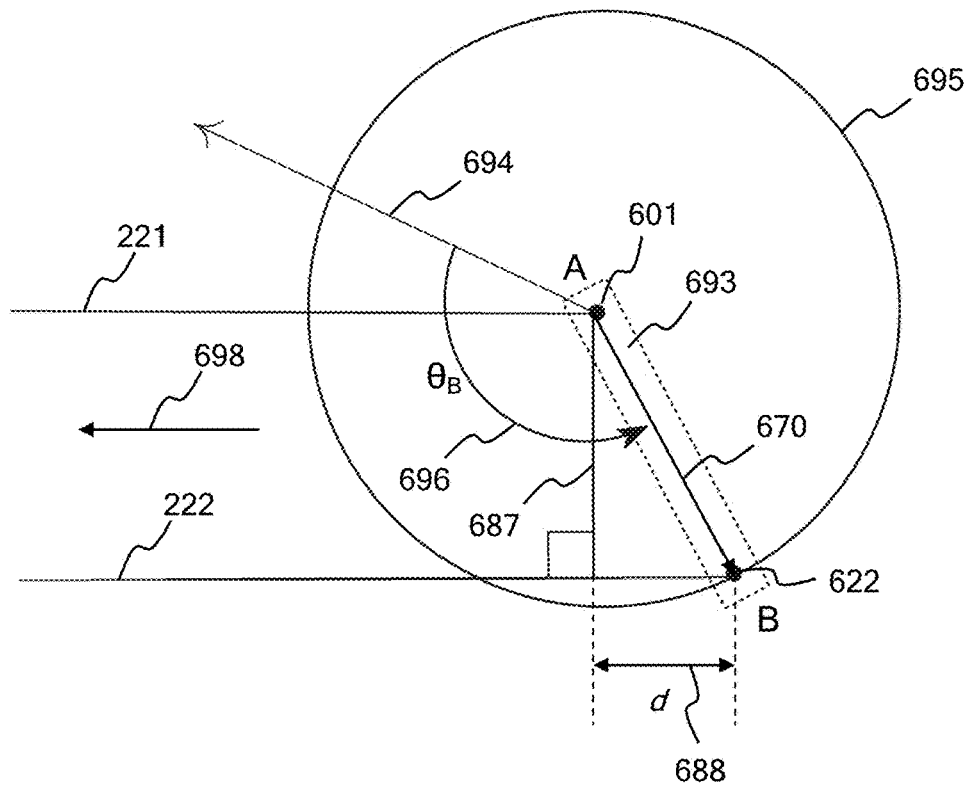
FIG. 23 shows a top view of GNSS antenna 601 and GNSS antenna 622 of device 690 of FIG. 20 receiving false GNSS satellite signals from transmitter 141.

FIG. 22 and FIG. 23 show antenna 601 and antenna 622 of GNSS device 690 being spoofed as shown in FIG. 20 and FIG. 21. In FIG. 22 and FIG. 23, some elements of device 690 are not shown for simplicity. FIG. 22 shows a perspective view of antenna 601 and 622 receiving false GNSS satellite signal 142 from false GNSS transmitter 141 at a location E. FIG. 23 shows a top view of antenna 601 and 622 of FIG. 22 (in simplified form) receiving spoofing signal 142, with false GNSS satellite signal transmitter 141 left off for simplicity, but adding in direction axis 694, rotation angle θ 696 and a direction 698 of false GNSS satellite signal transmitter 141. Direction 698 is referenced to direction axis 694. Direction 698 is often a direction angle given by the angle between direction axis 694 and direction 698 of false GNSS satellite signal transmitter 141. But this is not meant to be limiting. In some embodiments both direction axis 694 and direction 698 are heading coordinates or other means of measuring direction.

Antenna 601 and antenna 622 are under the influence of false GNSS satellite signal 142, which is broadcast by false GNSS satellite signal transmitter 141, as shown in FIGS. 20 and 21. Real GNSS satellites 103, 104 and 105, and their associated GNSS satellite signals, are not shown because false GNSS satellite signal 142 is overpowering the real signals, thus GNSS device 690 is responding to false GNSS satellite signal 142. False GNSS satellite signal transmitter 141 located at location E is located sufficiently far from antenna 601 and 622, as compared to baseline vector $\vec{R}_{AB}$ 670, that spoofing signal 142 transmission paths 221 and 222 are nearly parallel.

Receiver 621 measures a range—a false range—for each false GNSS satellite signal 116, 117 and 118 (FIG. 21). The false ranges measured include ranges $R_1$ 216, $R_2$ 217 and $R_3$ 218, but also include additional distances for travel time through cables and components. Receiver 621 measures each range by measuring a time difference between clock 620 of receiver 621 at the time a particular antenna receives a GNSS satellite signal, and the satellite clock at the time of transmission of the received GNSS satellite signal, which in this case is false GNSS satellite signals 116, 117, and 118 of spoofing system 140. The time difference between clock 620 of receiver 621 and the satellite clock at the time of transmission of the received satellite signal has a number of constituents. Travel-time from false GNSS satellite signal transmitter 141 to receiving antennas 601 and 622 is only one component. There is also the travel-time along the RF cables 614 and 615, and delays that arise due to RF component delays within receiver 621. The time difference is converted to distance (range) by multiplying the time difference by the speed of light. The spoofing system 140 of FIG. 21 includes three false ranges: $R_1$ 216, $R_2$ 217 and $R_3$ 218. Added on to these ranges are the travel time of spoofing signal 142 to GNSS receiver 621, and through the RF components within receiver 621, multiplied by the speed of light. For a given antenna and RF path to the receiver, travel-time and the time through RF components will be the same for all GNSS signals, and will add a common offset to the measured ranges on that antenna, as detailed below.

The data arriving at antenna 601 yields the following measured ranges:

$$R_{1A} = R_1 + C*TT_A; \quad (10)$$

$$R_{2A} = R_2 + C*TT_A; \quad (11)$$

$$R_{3A} = R_3 + C*TT_A; \quad (12)$$

Where $R_{1A}$, $R_{2A}$, and $R_{3A}$ are the total ranges measured by receiver 621 for signals received at antenna 601 at location A; $R_1$, $R_2$, and $R_3$ are the ranges represented by false GNSS satellite signal 142, which are the ranges from antenna 111 to GNSS satellites 113, 114, and 115, as shown in FIG. 20 and FIG. 21; C is the speed of light; and $TT_A$ is the total signal travel time of false GNSS satellite signal 142 through antenna 601 along cable 614 and into and through receiver 621.

Similarly, the data arriving at antenna 622 yields ranges given by:

$$R_{1B} = R_1 + C*TT_B; \quad (13)$$

$$R_{2B} = R_2 + C*TT_B; \quad (14)$$

$$R_{3B} = R_3 + C*TT_B; \quad (15)$$

Where $R_{1B}$, $R_{2B}$, and $R_{3B}$ are the total ranges measured by receiver 621 for signals received at antenna 622 at location B; $R_1$, $R_2$, and $R_3$ are the ranges represented by false GNSS satellite signal 142; C is the speed of light; and $TT_B$ is the total signal travel time of false GNSS satellite signal 142 through antenna 622 along cable 615 and into and through receiver 621. It is to be understood that any number of range measurements may be made by GNSS device 690, but we are showing three for the sake of example.

Receiver 621 computes range differences ΔR by subtracting the ranges measured at antenna 622 from the ranges measured at antenna 601, given by:

$$\Delta R_1 = R_{1B} - R_{1A} = C(TT_B - TT_A) = B_{AB}; \quad (16)$$

$$\Delta R_2 = R_{2B} - R_{2A} = C(TT_B - TT_A) = B_{AB}; \quad (17)$$

$$\Delta R_3 = R_{3B} \times R_{3A} = C(TT_B - TT_A) = B_{AB}; \quad (18)$$

where the travel-time differential bias, $B_{AB}$ is defined as $$B_{AB} = C(TT_B - TT_A) \quad (19).$$

The travel-time differential bias $B_{AB}$ is the difference between the time it takes a GNSS satellite signal takes to travel from the GNSS satellite to receiver 621 through first GNSS antenna 601, and the time it takes the GNSS satellite signal to travel from the GNSS satellite to receiver 621 through second GNSS antenna 622. Multiplying by the speed of light, C, converts the travel-time differential bias to units of distance rather than units of time.

It can be seen that when computing range differences ΔR on false GNSS satellite signals, the false ranges $R_1$, $R_2$, and $R_3$ cancel, leaving only the signal travel-time differential bias $B_{AB}$. More precisely, range differences ΔR of false GNSS satellite signals will take on the same value, $B_{AB}$, to within the uncertainty of noise variances that may be present in the range measurements. FIG. 22 through FIG. 26 show how the range difference ΔR of false GNSS satellite signals can be used to determine direction 698 of false GNSS satellite signal transmitter 141.

Travel time differential bias $B_{AB}$ can be divided up into its constituent components, given by:

$$B_{AB} = d + \text{other\_delays}; \quad (20)$$

where path difference distance d, labeled as element 688 in FIG. 22 and FIG. 23, is the difference in distance traveled by false GNSS satellite signal 142 travelling from transmitter 141 to antenna 601 and the distance traveled by false GNSS satellite signal 142 travelling from transmitter 141 to antenna 622, as shown in FIG. 23. Other_delays is RF cable, component delays, and possibly clock differences if multiple clocks are employed. Path difference distance d 688 is equal to the travel time from spoofing transmitter 141 to antenna 622, minus the travel time from spoofing transmitter 141 to antenna 601, multiplied by the speed of light. The travel-time from spoofing transmitter 141 to receiving antennas 601 and 602 will vary as a function of how the antenna's baseline vector $\vec{R}_{AB}$ 670, is oriented with respect to false GNSS satellite signal 142. On the other hand, other_delays, including RF cable delays along 614 and 615 and RF component delays, will be nearly constant, and if changing, will be slowly changing. In other words, other_delays is a constant for a particular system, whereas path difference distance d 688 will vary as a function of how the antenna's baseline vector $\vec{R}_{AB}$ 670, is oriented with respect to false GNSS satellite signal 142. Therefore, path difference distance d 688 can be used to determine direction 698 of false GNSS satellite signal transmitter 141 as described below.

A perpendicular line 687 is shown in FIG. 22 and FIG. 23 originating at location A of antenna 101, extending between and perpendicular to spoofing signal path 221 and 222. The path difference distance d 688 is the distance between the union of perpendicular line 687 and signal path 222, and antenna 622, as shown in FIG. 22 and FIG. 23. The path difference distance d 688 is the difference in false GNSS satellite signal travel-time between antennas 601 and 622.

Rotation path 695 is a circle centered about location A (the location of antenna 601), as shown in FIG. 22 and FIG. 23, and with a radius equal to the length of baseline vector $\vec{R}_{AB}$ 670. Rotation path 695 represents all possible locations of antenna 622 with respect to antenna 601 when moving in one plane and keeping the length of baseline vector $\vec{R}_{AB}$ 670 constant. FIG. 22 shows a perspective view, so rotation path 695 appears as an ellipse in FIG. 22, but is shown as a circle in FIG. 23, which is a top view of location A and rotation path 695. It is to be understood that rotation path 695 does not have to be circular and can form a three-dimensional rotation path such as a sphere, for example. Path difference distance d 688 varies depending on the orientation of the baseline vector $\vec{R}_{AB}$ 670 with respect to the arriving false GNSS satellite signal travel paths 221 and 222. When the baseline vector $\vec{R}_{AB}$ 670 is orthogonal to the false GNSS satellite signal propagating paths 221 and 222, path difference distance d 688 will be zero.

Figure 24:
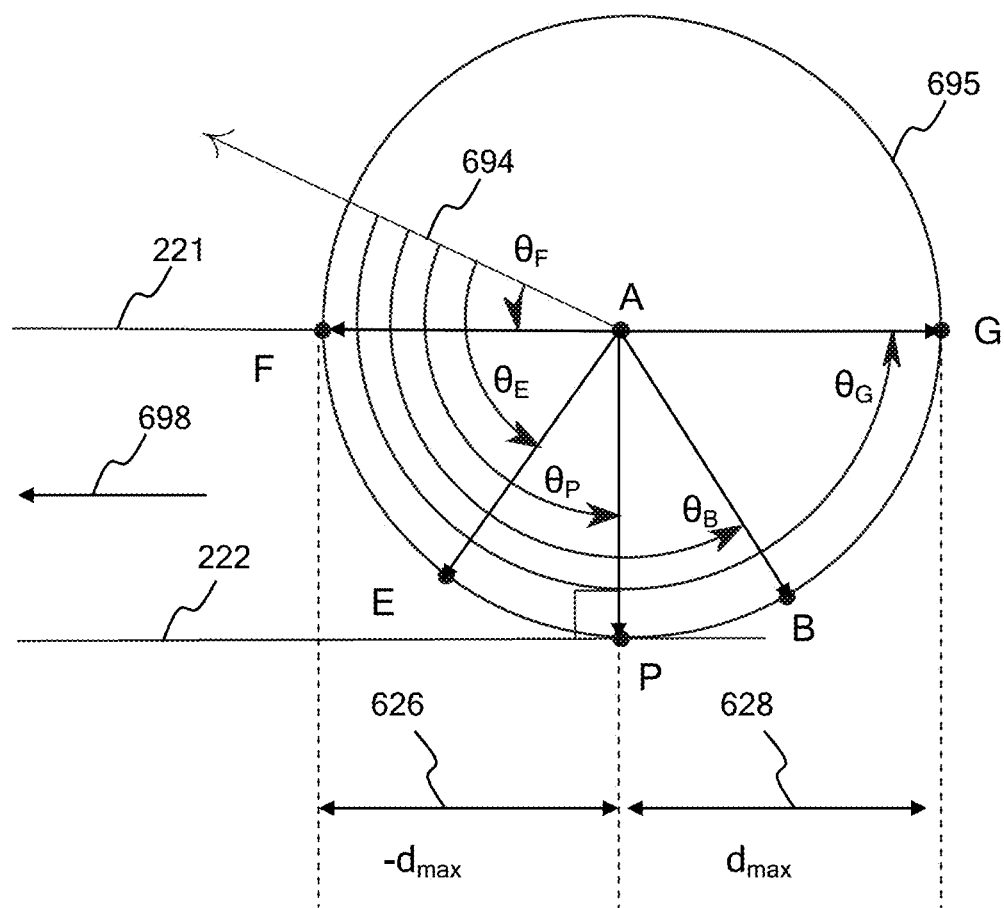
FIG. 24 shows a top view of GNSS antenna 601 and GNSS antenna 622 of device 690 of FIG. 20 receiving false GNSS satellite signals from transmitter 141, with several of the positions of antenna 622 along rotation path 695 shown.
Figure 25:
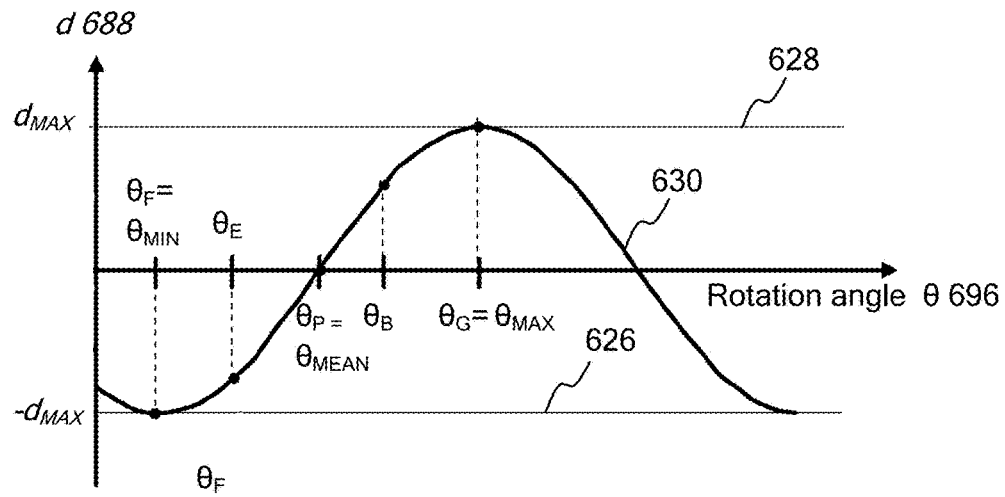
FIG. 25 shows a plot 630, of a path difference distance d 688 versus rotation angle θ 696.

FIG. 24 depicts the same scenario as FIG. 23 but shows some of the various locations of second antenna 622 along rotation path 695. Second antenna 622 rotates around first antenna 601 location A. Location A is at the center of rotation path 695. The radius of rotation path 695 is the length of baseline vector $\vec{R}_{AB}$ 670, which remains constant. Angle θ 696 is the angle between baseline vector $\vec{R}_{AB}$ 670 and direction axis 694, as shown in FIG. 17, FIG. 19, FIG. 23 and FIG. 24. As antenna 622 moves along rotation path 695, rotating around antenna 601, angle A 696 varies accordingly. When antenna 622 is located at location B, angle θ 696 is $\theta_B$, as shown in FIG. 25. When antenna 622 is located at location F, angle θ 696 is $\theta_F$. When antenna 622 is located at location E, angle θ 696 is $\theta_E$. When antenna 622 is located at location P, angle θ 696 is $\theta_P$. When antenna 622 is located at location G, angle θ 696 is $\theta_G$. Direction axis 694 can be referenced to a known direction on the rigid body that device 690 is mounted to, in this embodiment vessel 100.

When GNSS antenna 622 is at location F along rotation path 695, baseline vector $\vec{R}_{AB}$ 670 is aligned with the spoofing signal path 221 and pointed towards the false GNSS satellite signal source, false GNSS satellite signal transmitter 141. Here, path difference distance d 688 will take on its most negative value, denoted $-d_{max}$ 626, and rotation angle θ 696 is $\theta_F$. When GNSS antenna 622 is at location G along rotation path 695, baseline vector $\vec{R}_{AB}$ 670 is aligned with the spoofing signal path 221 and pointed away from the spoofing signal source, false GNSS satellite signal transmitter 141. Here, path difference distance d 688 will take on its most positive value, denoted $d_{max}$ 628, and rotation angle θ 696 is $\theta_G$. Note that the length of baseline vector $\vec{R}_{AB}$ 670 has a constant magnitude equal to $d_{max}$.

When GNSS antenna 622 is at location P along rotation path 695, baseline vector $\vec{R}_{AB}$ 670 is perpendicular to signal paths 221 and 222, and path difference distance d 688 has a value of zero. Rotation angle θ 696 is $\theta_P$. When GNSS antenna 622 is at location E along rotation path 695, path difference distance d 688 has a negative value, but not its most negative value. Rotation angle θ 696 is $\theta_E$. When GNSS antenna 622 is at location B along rotation path 695, distance d 688 has a positive value, but not its most positive value. Rotation angle θ 696 is $\theta_B$.

FIG. 25 shows plot 630, of path difference distance d 688 on the vertical axis, versus rotation angle θ 696 on the horizontal axis. Plot 630 shows how path difference distance d 688 varies sinusoidally as antenna 622 rotates on rotation path 695 around antenna 601 at location A. Plot 630 has a sinusoidal shape and ranges from $-dmax$ 626 to $+dmax$ 628. FIG. 25 shows the same rotation angles θ 696 as shown in FIG. 24. Rotation angle $\theta_F$, for example, corresponds to a path difference distance d 688 of $-d_{MAX}$ and is the path difference distance d 688 when antenna 622 is positioned at location F along rotation path 695, as shown in FIG. 24. Rotation angle $\theta_E$ corresponds to a path difference distance d 688 between zero and $-d_{MAX}$, and is the path difference distance d 688 when antenna 622 is positioned at location E along rotation path 695, as shown in FIG. 24. Rotation angle $\theta_P$ corresponds to a path difference distance d 688 of zero, and is the path difference distance d 688 when antenna 622 is positioned at location P along rotation path 695, as shown in FIG. 24. Rotation angle $\theta_B$ corresponds to a path difference distance d 688 between zero and $d_{MAX}$, and is the path difference distance d 688 when antenna 622 is positioned at location B along rotation path 695, as shown in FIG. 24. Rotation angle $\theta_G$ corresponds to a path difference distance d 688 of $+d_{MAX}$, and is the path difference distance d 688 when antenna 622 is positioned at location G along rotation path 695, as shown in FIG. 24.

As GNSS antenna 622 rotates around antenna 601 on rotation path 695, the values of path difference distance d 688 can be used to indicate the rotation angle that corresponds to the direction of false GNSS satellite signal transmitter 141. Path different distance d 688 is a maximum when baseline vector $\vec{R}_{AB}$ 670 is pointed away from false GNSS satellite signal transmitter 141. And the value of path difference distance d 688 is a minimum when baseline vector $\vec{R}_{AB}$ 670 is pointed towards false GNSS satellite signal transmitter 141. Path difference distance d 688 is zero when baseline vector $\vec{R}_{AB}$ 670 is perpendicular to direction 698 of false GNSS satellite signal transmitter 141. By monitoring the value of path difference distance d 688 and rotation angle 696, direction 698 of false GNSS satellite signal transmitter 141 can be determined. When baseline vector rotation angle θ 696 corresponds to a maximum path difference distance d 688, this specific baseline vector rotation angle θ 696 is called the maximum baseline vector rotation angle $\theta_{MAX}$, and direction 698 of false GNSS satellite signal transmitter is equal to the maximum baseline vector rotation angle $\theta_{MAX}$ plus 180 degrees. In the example shown in FIG. 24, baseline vector rotation angle $\theta_G$ is the maximum baseline vector rotation angle $\theta_{MAX}$, and direction 698 of false GNSS satellite signal transmitter 141 is baseline vector rotation angle $\theta_{MAX}$ ($\theta_G$)+180 degrees.

When baseline vector rotation angle θ 696 corresponds to a minimum path difference distance d 688, this specific baseline vector rotation angle θ 696 is called the minimum baseline vector rotation angle $\theta_{MIN}$, and direction 698 of false GNSS satellite signal transmitter 141 is equal to the minimum baseline vector rotation angle $\theta_{MIN}$. In the example shown in FIG. 24, baseline vector rotation angle $\theta_F$ is the minimum baseline vector rotation angle $\theta_{MIN}$, and direction 698 of false GNSS satellite signal transmitter 141 is equal to baseline vector rotation angle $\theta_F = \theta_{MIN}$.

When baseline vector rotation angle θ 696 corresponds to the mean path difference distance d 688, which in this embodiment is zero, this specific baseline vector rotation angle θ 696 is called the mean baseline vector rotation angle $\theta_{MEAN}$, and direction 698 of false GNSS satellite signal transmitter 141 is equal to the mean baseline vector rotation angle $\theta_{MEAN}$ plus or minus (+/−) 90 degrees. In the example shown in FIG. 24, baseline vector rotation angle $\theta_P$ is the mean baseline vector rotation angle $\theta_{MEAN}$, and direction 698 of false GNSS satellite signal transmitter 141 is equal to baseline vector rotation angle $\theta_P$ ($\theta_{MEAN}$)+/−90 degrees.

In practice, travel-time differential bias $B_{AB}$ rather than path difference distance d 688 is more readily available as a calculated value. A range measured at antenna 622 and then differenced with the corresponding range measured at antenna 601 gives $B_{AB}$ as shown in Equation 16 through Equation 19. Determining path difference distance d 688 would require calculating other_delays as given in Equation 19. Calculating a value for other_delays is possible, but is not necessary. In practice other_delays is nearly constant over periods of minutes or more, so that during rotation of antenna 622, other_delays will act as a constant offset to the sinusoidal characteristic found in path difference distance d 688. Given that other_delays is constant, it is clear that while rotating antenna 622 and baseline vector $\vec{R}_{AB}$ 670 through a complete circle, the values of each of range difference ΔR and travel-time differential bias $B_{AB}$ will take on a maximum value when path difference distance d 688 is at its maximum value. Similarly, the values of each of range difference ΔR and travel-time differential bias $B_{AB}$ will take on a minimum value when path difference distance d 688 is at its minimum value, and the values of each of range difference ΔR and travel-time differential bias $B_{AB}$ will take on their mean value when path difference distance d 688 is at its mean value. Thus measurements of range difference ΔR, which are equal to travel-time differential bias $B_{AB}$ when false GNSS satellite signals are being received, are used to identify the maximum, minimum, and mean baseline vector rotation angles and determine the direction of false GNSS satellite signal transmitter 141.

There are many ways to measure the travel time differential bias $B_{AB}$. In this particular application we are measuring two transit times of a GNSS satellite signal, a first transit time, which is the time the GNSS satellite signal takes to travel from the GNSS satellite to first GNSS antenna 601, and a second transit time, which is the time the GNSS satellite signal takes to travel from the GNSS satellite to second GNSS antenna 622. We are then differencing these two travel times to compute $B_{AB}$. When computing this time difference, the time that the signal originated at the GNSS antenna drops out of the equation, because it is the same origination time for each. Travel-time differential bias $B_{AB}$ then become the difference between the time at which the GNSS satellite signal reached second GNSS antenna 622 and the time at which the GNSS satellite signal reached the first antenna. This time difference, equal to travel-time differential bias $B_{AB}$, can be computed by cross-correlation between the GNSS satellite signal received at first GNSS antenna 601 and the GNSS satellite signal received at second GNSS antenna 622. This is done by inserting a time offset into one of the two received GNSS satellite signals, then computing a correlation between the two signals with the time offset inserted in one of them. Travel-time differential bias $B_{AB}$ can be set to be the inserted time offset which results in the maximum correlation between the two received GNSS satellite signals.

Figure 26:
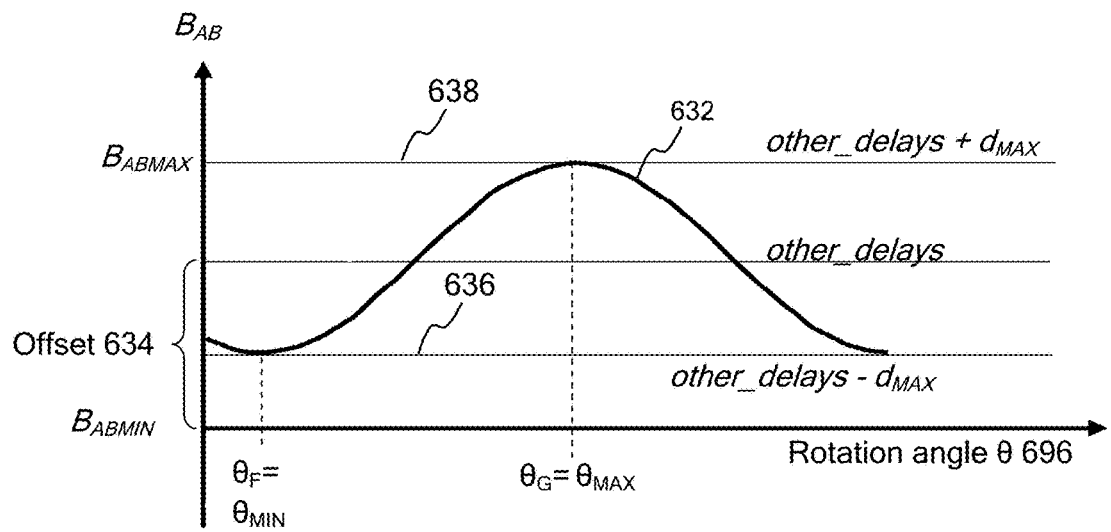
FIG. 26 shows a plot 632, of travel-time differential bias $B_{AB}$ versus rotation angle θ 696.

FIG. 26 shows a plot 632 of travel-time differential bias $B_{AB}$ versus rotation angle θ 696 of baseline vector $\vec{R}_{AB}$ 670, for slightly more than one full circle of rotation. Travel-time differential bias $B_{AB}$ is given on the vertical axis, and rotation angle θ 696 on the horizontal axis. Plot 632 has a constant offset 634 as compared to plot 632, where the offset 634 is equal to the value of other_delays. Generally, offset 634 can take on a positive or a negative value, depending on RF cables, RF components and clock delays, but this is of little consequence. Maximum and minimum values of travel-time differential bias $B_{AB}$ occur at values of rotation angle θ 696 in which baseline vector $\vec{R}_{AB}$ 670 is aligned to direction 698 of the spoofing signal source, false GNSS satellite signal transmitter 141. Travel-time differential bias $B_{AB}$ takes on a value equal to offset 634 when baseline vector $\vec{R}_{AB}$ 670 is perpendicular to direction 698 of false GNSS satellite signal transmitter 141. These characteristics allow determination of direction 698 of false GNSS satellite signal transmitter 141.

The value of travel-time differential bias $B_{AB}$ is readily obtained from any of the range difference ΔR equations such as equation 16, 17, and 18. All range difference ΔR equations should produce the same value (to within measurement noise uncertainty) of travel-time differential bias $B_{AB}$ when spoofing is occurring, meaning, in the example shown in the figures, when device 690 including first GNSS antenna 601 and second GNSS antenna 622 are receiving false GNSS satellite signals. If carrier phase measurements are used to compute ranges, which are preferred due to their accuracy as compared to code phase measurements, integer ambiguities may be determined and accounted for in the range difference ΔR equations. Determining the integer ambiguities is only necessary to get agreement in values of travel-time differential bias $B_{AB}$ for each range difference equation. Agreement is not necessary for determining direction 698 of false GNSS satellite signal transmitter 141, since only one equation is needed, but agreement of calculated values of travel-time differential bias $B_{AB}$ is desirable in detection of spoofing. A nearly common value of travel-time differential bias $B_{AB}$ computed for all range differences ΔR calculations for a particular GNSS system is indicative of spoofing taking place to the GNSS system.

A modification to the range difference ΔR equations 16-18 to account for the integer ambiguities is given by $$\Delta R_1 = R_{1B} - R_{1A} = B_{AB} + \lambda^* \Delta N_1 = d + \text{other\_delays} + \lambda^* \Delta N_1; \quad (21)$$

$$\Delta R_2 = R_{2B} - R_{2A} = B_{AB} + \lambda^* \Delta N_2 = d + \text{other\_delays} + \lambda^* \Delta N_2; \quad (22)$$

$$\Delta R_3 = R_{3B} - R_{3A} = B_{AB} + \lambda^* \Delta N_3 = d + \text{other\_delays} + \lambda^* \Delta N_3; \quad (23)$$

Here, λ is the carrier phase wavelength and the integer ambiguity differences are denoted by $\Delta N_1$, $\Delta N_2$, and $\Delta N_3$. Integer ambiguities $\Delta N_1$, $\Delta N_2$, and $\Delta N_3$ can be determined by well-known integer ambiguity search techniques. These integer unknowns arise because the exact number of integer wavelengths λ in the carrier phase derived range cannot be readily measured.

As mentioned, integer ambiguities $\Delta N_1$, $\Delta N_2$, and $\Delta N_3$ need not be solved when locating the direction of a false GNSS satellite signal transmitter such as direction 698 of false GNSS satellite signal transmitter 141. The ambiguity will act, mathematically, as a delay and can be taken as part of the term other_delays. This will simply cause a different offset 634 to the sinusoidal plot 632 as shown in FIG. 26.

There are many ways in which device 690 can use a calculation of range differences ΔR and/or travel-time differential bias $B_{AB}$ to determine the direction 698 of false GNSS satellite signal transmitter 141 according to the invention. Some examples will be provided here, but it is to be understood that many other methods are possible. In some embodiments processor 618 in receiver 621 includes software 625 (see FIG. 18) loaded onto a memory that computes the range differences ΔR. Software 625 determines travel-time differential bias $B_{AB}$ by computing range differences ΔR as described earlier and as given by Equation 16 through Equation 18 or Equation 21 through Equation 23. In some embodiments software 625 computes travel-time differential bias $B_{AB}$ by cross-correlating the GNSS satellite signal received at second antenna 622 with the same signal received at first antenna 601, finding the time offset that gives the maximum correlation. Receiver 621 can output values of travel-time differential bias $B_{AB}$, for example, or internally set an indicator when maximum or minimum values of travel-time differential bias $B_{AB}$ are reached. In some embodiments software 625 computes path difference distance d 688. In some embodiments software 625 computes direction 698 of false GNSS satellite signal transmitter 141. In some embodiments device 690 outputs direction 698 of false GNSS satellite signal transmitter 141.

It is also to be understood that the rotation of one or more than one baseline vector through a range of baseline vector rotation angles can be accomplished in many different ways according to the invention. In some embodiments rotation apparatus 693 of device 690 is rotated manually, with an operator noting the rotation angle θ 696 when the maximum, minimum, or mean travel-time differential bias $B_{AB}$ occurs. In some embodiments rotation apparatus 693 of device 690 is rotated by machine. In some embodiments device 690 includes an angular resolver to measure rotation angle θ 696, and software 625 reads rotation angle θ 696 and correlates rotation angle θ 696 with computed values of travel-time differential bias $B_{AB}$. Software 625 in this embodiment automatically reports direction 698 of false GNSS satellite signal transmitter 141.

It is to be noted that there are many different ways of rotating baseline vector $\vec{R}_{AB}$ 670, or, in other words, there are many different methods of rotating second antenna 622 with respect to first antenna 601 according to the invention. Several examples are described in this document, but these are not meant to be limiting.

Figure 27:
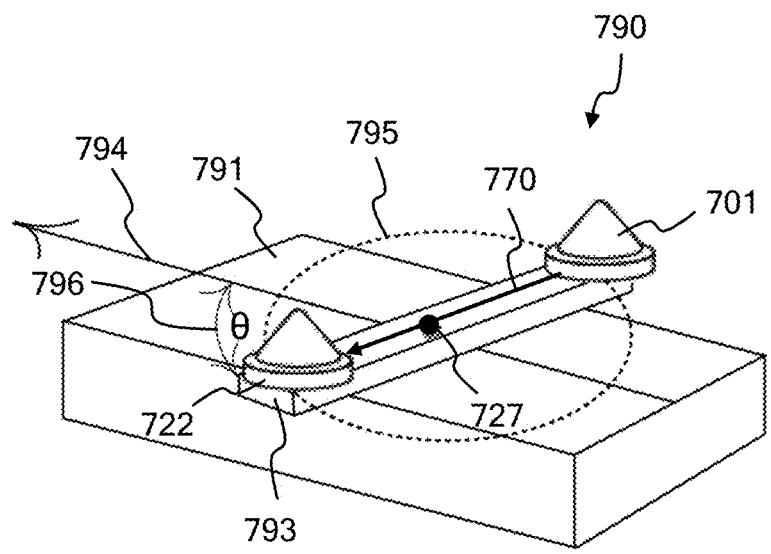
FIG. 27 shows a perspective view of a GNSS device 790 for determining the direction of a false GNSS satellite signal transmitter.
Figure 28:
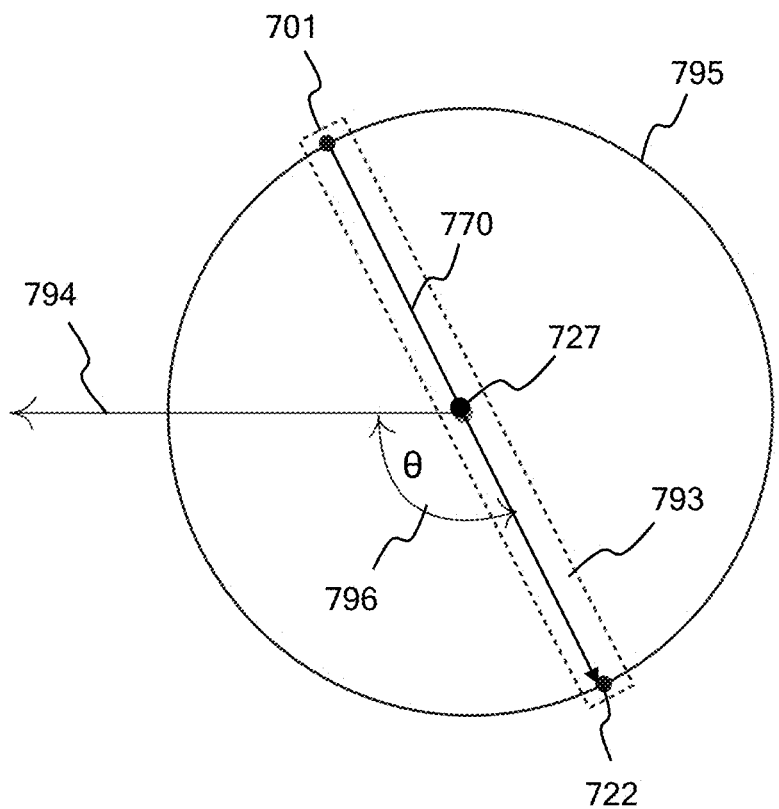
FIG. 28 shows a simplified top view of device 790 of FIG. 27.

FIG. 27 and FIG. 28 show an embodiment of a GNSS device 790 for determining the direction of a false GNSS satellite signal transmitter. GNSS device 790 is similar to GNSS device 690 and similar numbers are meant to represent similar elements. The difference is that a rotation device 793 in this embodiment is a bar that rotates about a center point 727 with a first GNSS antenna 701 and a second GNSS antenna 722 at either end. Thus in this embodiment, both first GNSS antenna 701 and second GNSS antenna 722 rotate about center point 727. This is different from GNSS device 690 because with GNSS device 690, second GNSS device 622 rotated about first GNSS antenna 601. In GNSS device 690, first antenna 701 and second antenna 722 are coupled to opposing ends of a rotating bar rotation device 793. Rotation device 793 rotates about center point 727 of rotation device 793, such that both first antenna 701, second antenna 722, and a baseline vector 770 that extends between first antenna 701 and second antenna 722 rotate about center point 727. Rotation device 793 and baseline vector 770 have a constant length. As first antenna 701 and second antenna 722 rotate about center point 727, baseline vector 770 that extends between first antenna 701 and second antenna 722 rotates through a 360 degree range of baseline vector rotation angles θ 796, as shown in FIG. 27. First antenna 701 and second antenna 722 travel along rotation path 795 in a circle with a constant radius around center point 727. Rotation device 793 is coupled to device body 791. Device body 791 include direction axis 794, which is correlated to a direction on the vehicle or rigid body that GNSS device 790 is mounted to.

GNSS device 790, which includes device body 791 with direction axis 794, first antenna 701, second antenna 722, and rotation apparatus 793 as shown in FIG. 27 and FIG. 28, is used to determine a direction of a false GNSS satellite signal transmitter such as false GNSS satellite signal transmitter 141. GNSS device 790 determines the direction of the false GNSS satellite signal transmitter by rotating baseline vector 770 through a range of baseline vector rotation angles θ 796, and computing a range difference ΔR for a plurality of baseline vector rotation angles θ 796. The plurality of range differences ΔR can be used to determine the direction of a false GNSS satellite signal transmitter as explained above for GNSS device 690.

It is to be understood that first and second GNSS antennas, and their corresponding baseline vectors, can be made to rotate through a plurality of rotation angles in many different geometric shapes and configurations. In some embodiments second antenna 622 or 722 rotates in a three-dimensional spherical shape about first antenna 601 or 701, or about a center point or other point. Any method which results in a plurality of range difference ΔR measurements, where each one of the plurality of range difference ΔR measurement corresponds to one of a plurality of rotation angles of a baseline vector, can be used to determine the direction of a false GNSS satellite signal transmitter according to the invention.

Figure 29:
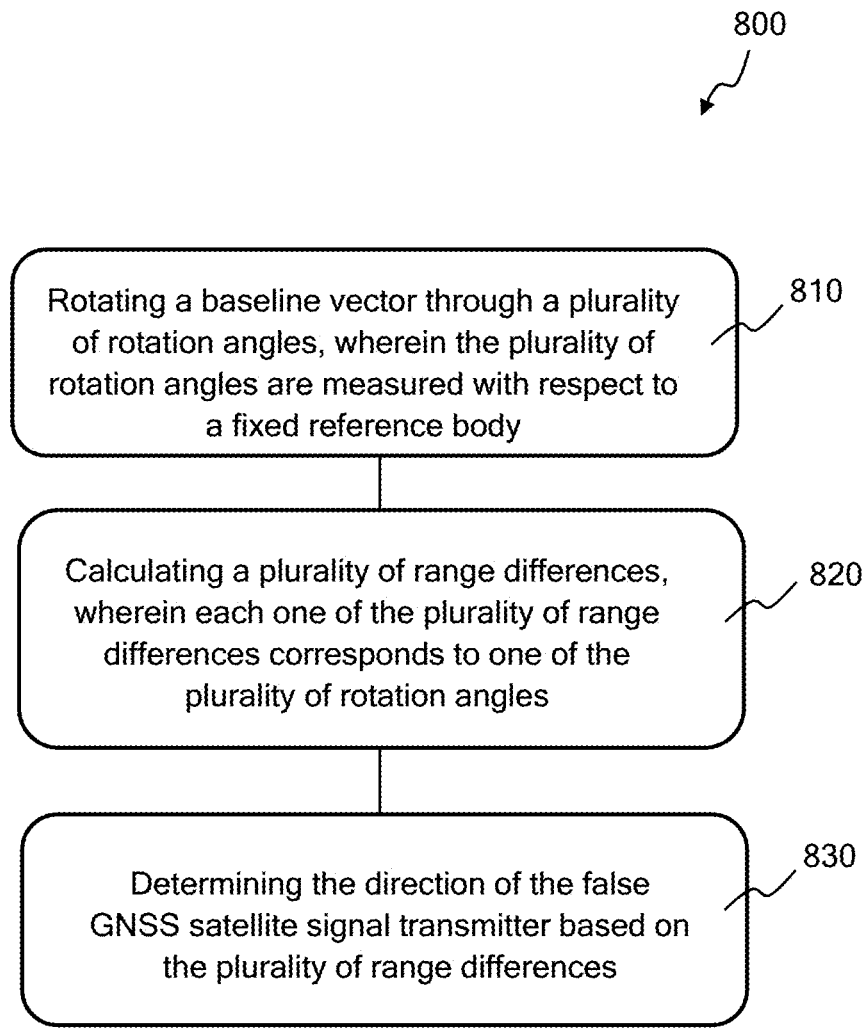
FIG. 29 illustrates a method 800 of determining the direction of a false GNSS satellite signal transmitter.

FIG. 29 shows method 800 of determining the direction of a false GNSS satellite signal transmitter. Method 800 of determining a direction of a false Global Navigation Satellite System (GNSS) satellite signal transmitter comprises a step 810 of rotating a baseline vector through a plurality of rotation angles, wherein the plurality of rotation angles are measured with respect to a fixed reference body. Method 800 also includes a step 820 of calculating a plurality of range differences, wherein each one of the plurality of range differences corresponds to one of the plurality of rotation angles. Method 800 also includes a step 830 of determining the direction of the false GNSS satellite signal transmitter based on the plurality of range differences. In some embodiments the baseline vector extends from a first GNSS antenna to a second GNSS antenna. In some embodiments method 800 includes detecting that a false GNSS satellite signal is being received. In some embodiments method 800 includes indicating the direction of the false GNSS satellite signal transmitter. Method 800 can include many other steps.

Step 810 of rotating a baseline vector through a plurality of rotation angles can comprise many other steps. In some embodiments rotating the baseline vector through the plurality of rotation angles comprises rotationally moving the second GNSS antenna around the first GNSS antenna. In some embodiments the first GNSS antenna is in a location that is fixed with respect to the fixed reference body. In some embodiments the second GNSS antenna is in a location that is fixed with respect to the fixed reference body. In some embodiments step 810 of rotating the baseline vector through the plurality of rotation angles comprises rotationally moving the first and the second GNSS antenna around a center point, wherein the baseline vector extends through the center point. In some embodiments the center point is fixed in location with respect to the fixed reference body.

Step 820 of calculating a plurality of range differences can include many other steps. In some embodiments step 820 of calculating the plurality of range differences includes calculating a first range from a first GNSS satellite signal received by a first GNSS antenna. In some embodiments step 820 of calculating the plurality of range differences includes calculating a second range from the first GNSS satellite signal received by a second GNSS antenna, wherein a baseline vector extends from the first GNSS antenna to the second GNSS antenna. In some embodiments step 820 of calculating the plurality of range differences includes calculating a first range difference by subtracting the first range from the second range.

Step 830 of determining the direction of the false GNSS satellite signal transmitter based on the plurality of range differences can include many other steps. In some embodiments step 830 of determining the direction of the false GNSS satellite signal transmitter based on the plurality of range differences includes identifying a maximum baseline vector rotation angle, wherein the maximum baseline vector rotation angle comprises a baseline vector rotation angle that corresponds to a maximum value of range difference. In some embodiments step 830 of determining the direction of the false GNSS satellite signal transmitter based on the plurality of range differences includes setting the direction of the false GNSS satellite signal transmitter to be equal to the maximum baseline vector rotation angle plus 180 degrees.

In some embodiments step 830 of determining the direction of the false GNSS satellite signal transmitter based on the plurality of range differences includes identifying a minimum baseline vector rotation angle, wherein the minimum baseline vector rotation angle comprises a baseline vector rotation angle that corresponds to a minimum value of range difference. In some embodiments step 830 of determining the direction of the false GNSS satellite signal transmitter based on the plurality of range differences includes setting the direction of the false GNSS satellite signal transmitter to be equal to the minimum baseline vector rotation angle.

In some embodiments step 830 of determining the direction of the false GNSS satellite signal transmitter based on the plurality of range differences includes identifying a mean baseline vector rotation angle, wherein the mean baseline vector rotation angle comprises a baseline vector rotation angle that corresponds to a mean value of range difference. In some embodiments step 830 of determining the direction of the false GNSS satellite signal transmitter based on the plurality of range differences includes setting the direction of the false GNSS satellite signal transmitter to be equal to the mean baseline vector rotation angle plus 90 degrees.

In some embodiments step 830 of determining the direction of the false GNSS satellite signal transmitter based on the plurality of range differences includes calculating a path difference distance for each one of the plurality of range differences. In some embodiments the maximum baseline vector rotation angle comprises a baseline vector rotation angle that corresponds to a maximum value of path difference distance. In some embodiments the minimum baseline vector rotation angle comprises a baseline vector rotation angle that corresponds to a minimum value of path difference distance. In some embodiments the mean baseline vector rotation angle comprises a baseline vector rotation angle that corresponds to a mean value of path difference distance.

In some embodiments step 830 of determining the direction of the false GNSS satellite signal transmitter based on the plurality of range differences includes computing the travel time differential bias for each one of the plurality of range differences. In some embodiments the maximum baseline vector rotation angle comprises a baseline vector rotation angle that corresponds to a maximum value of travel time differential bias. In some embodiments the minimum baseline vector rotation angle comprises a baseline vector rotation angle that corresponds to a minimum value of travel time differential bias. In some embodiments the mean baseline vector rotation angle comprises a baseline vector rotation angle that corresponds to a mean value of travel time differential bias.

In some embodiments a microprocessor or processor computes the plurality of range differences. In some embodiments software computes the plurality of range differences. In some embodiments software coupled to a processor or microprocessor computes the plurality of range differences. In some embodiments the microprocessor or processor includes the software. The term "processor" as used here can include any microprocessor, microcontroller, microprocessor or microcontroller coupled to or including software, or any other combination of computing hardware or computing software. In some embodiments the processor determines which one of the plurality of baseline vector rotation angles corresponds to a maximum, minimum, or mean range difference. In some embodiments the processor determines which one of the plurality of baseline vector rotation angles corresponds to a maximum, minimum, or mean path difference distance. In some embodiments the processor determines which one of the plurality of baseline vector rotation angles corresponds to a maximum, minimum, or mean travel-time differential bias. In some embodiments the processor outputs a false GNSS satellite signal transmitter direction. In some embodiments the processor determines the direction of the false GNSS satellite signal transmitter based on the plurality of range differences. In some embodiments the processor determines the direction of the false GNSS satellite signal transmitter based on computing a plurality of path difference differences. In some embodiments the processor determines the direction of the false GNSS satellite signal transmitter based on computing a plurality of travel-time differential biases.

Figure 30:
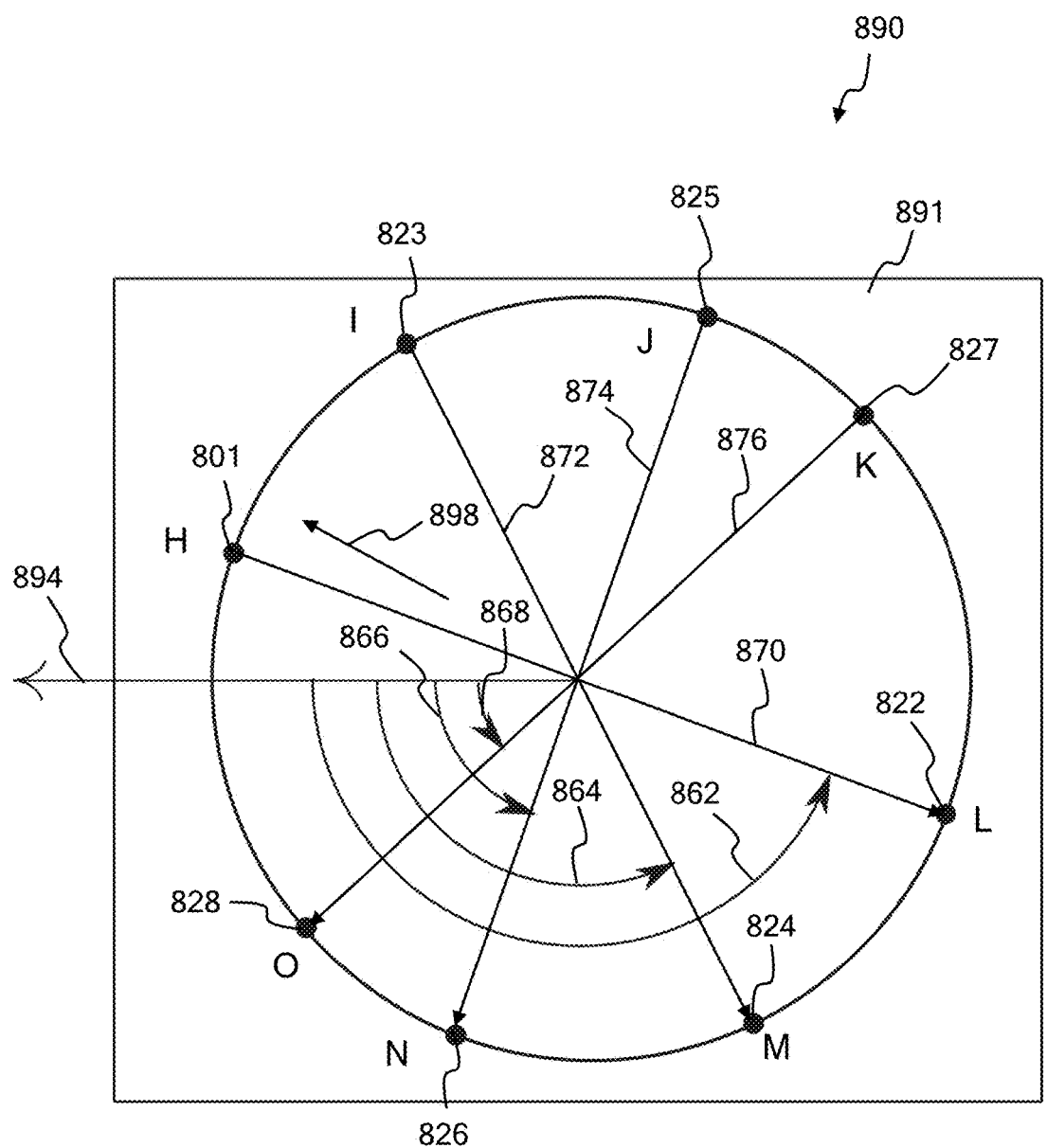
FIG. 30 shows a top view of GNSS device 890 for determining the direction of a false GNSS satellite signal transmitter.

FIG. 30 shows a simplified pictorial illustration of an embodiment of a GNSS device 890 for determining the direction of a false GNSS satellite signal transmitter. GNSS device 890 is similar to GNSS device 690 and 790, and similar numbers are meant to represent similar elements. The difference is that there are no moving antennas with GNSS device 890. GNSS device 890 includes a device body 891 with a direction axis 894. Direction axis 894 is correlated to a direction on the vehicle or body that device 890 is mounted to. In the embodiment shown in FIG. 30, a false GNSS satellite signal transmitter such as false GNSS satellite signal transmitter 141 is located a direction 898 from GNSS device 890.

GNSS device 890 has a plurality of antenna pairs fixedly coupled to device body 891 instead of a first fixed antenna and a second moving antenna, as in device 690, or two moving antennas, as in device 790. In this embodiment the plurality of antenna pairs include a GNSS antenna 801 and a GNSS antenna 822, which have a baseline vector 870 extending between them. GNSS antenna 801 is fixed at location H, and GNSS antenna 822 is fixed at location L. The plurality of antenna pairs also includes a GNSS antenna 823 and a GNSS antenna 824, which have a baseline vector 872 extending between them. GNSS antenna 823 is fixed at location I, and GNSS antenna 824 is fixed at location M. The plurality of antenna pairs also includes a GNSS antenna 825 and a GNSS antenna 826, which have a baseline vector 874 extending between them. GNSS antenna 825 is fixed at location J, and GNSS antenna 826 is fixed at location N. The plurality of antenna pairs also includes a GNSS antenna 827 and a GNSS antenna 828, which have a baseline vector 876 extending between them. GNSS antenna 827 is fixed at location K, and GNSS antenna 828 is fixed at location O.

Each of the plurality of baseline vectors 870, 872, 874, and 876 form a different baseline vector rotation angle θ with respect to direction axis 894. Baseline vector 870 forms baseline vector rotation angle 862 with respect to direction axis 894. Baseline vector 872 forms baseline vector rotation angle 864 with respect to direction axis 894. Baseline vector 874 forms baseline vector rotation angle 866 with respect to direction axis 894. Baseline vector 876 forms baseline vector rotation angle 868 with respect to direction axis 894.

GNSS device 890 computes a range difference ΔR for each of the antenna pairs and its corresponding baseline vector rotation angle θ, creating a plurality of range differences ΔR, where each range difference corresponds to one of a plurality of baseline vector rotation angles θ, as described above for GNSS device 690 and 790. The plurality of range differences ΔR is used to determine the direction of the false GNSS satellite signal transmitter as described above for GNSS device 690 and 790. In the embodiment shown in FIG. 30, baseline vector 870 corresponding to baseline vector rotation angle 862 would be determined to have the maximum range difference ΔR, and or the maximum travel-time differential boas $B_{AB}$, and/or the maximum path difference distance d. Thus baseline vector rotation angle 862 would be determined to be the maximum baseline vector rotation angle. Direction 898 would therefore be determined to be the maximum baseline vector rotation angle 862 plus 180 degrees. Thus direction 898 would be determined to be pointing in a direction opposite from baseline vector 870 in this example.

Figure 31:
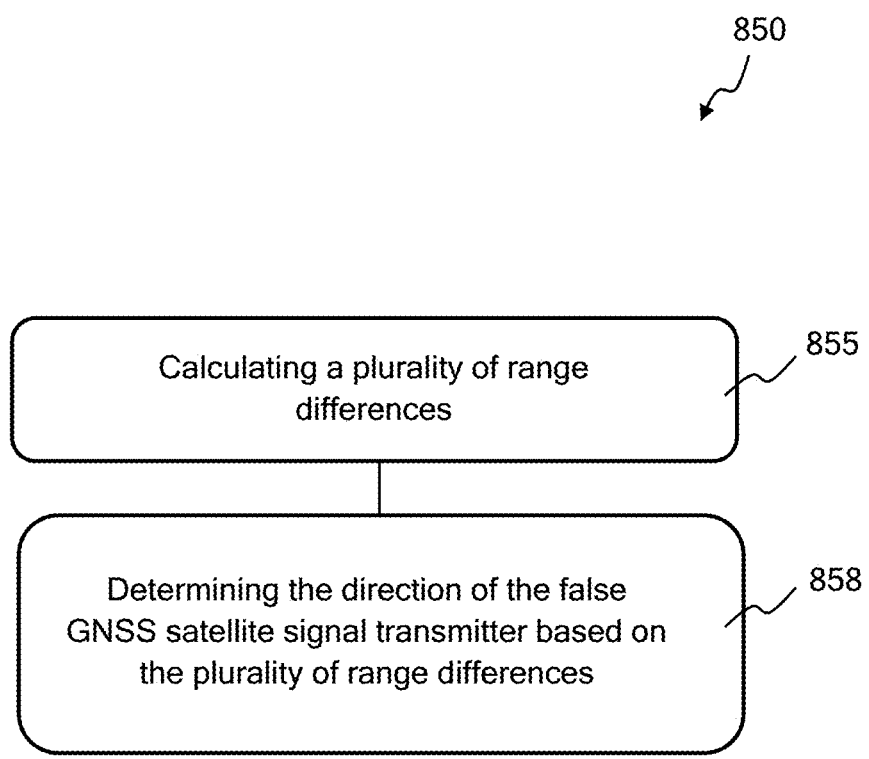
FIG. 31 illustrates a method 850 of determining the direction of a false GNSS satellite signal transmitter.

FIG. 31 shows a method 850 of determining the direction of a false GNSS satellite signal transmitter. Method 850 of determining a direction of a false Global Navigation Satellite System (GNSS) satellite signal transmitter comprises step 855 of calculating a plurality of range differences. In some embodiments each one of the plurality of range differences corresponds to one of a plurality of baseline vector rotation angles. In some embodiments the baseline vector rotation angle is measured with respect to a fixed reference body. Method 850 also includes step 858 of determining the direction of the false GNSS satellite signal transmitter based on the plurality of range differences. In some embodiments each of the plurality of baseline vectors extends between a pair of GNSS antennas. In some embodiments method 850 includes detecting that a false GNSS satellite signal is being received. In some embodiments method 850 includes indicating the direction of the false GNSS satellite signal transmitter. Method 850 can include many other steps.

Step 855 of calculating a plurality of range differences can include many other steps. In some embodiments step 855 of calculating the plurality of range differences includes calculating a first range from a first GNSS satellite signal received by a first GNSS antenna. In some embodiments step 855 of calculating the plurality of range differences includes calculating a second range from the first GNSS satellite signal received by a second GNSS antenna, wherein a baseline vector extends from the first GNSS antenna to the second GNSS antenna. In some embodiments step 855 of calculating the plurality of range differences includes calculating a first range difference by subtracting the first range from the second range.

Step 858 of determining the direction of the false GNSS satellite signal transmitter based on the plurality of range differences can include many other steps. In some embodiments step 858 of determining the direction of the false GNSS satellite signal transmitter based on the plurality of range differences includes identifying a maximum baseline vector rotation angle, wherein the maximum baseline vector rotation angle comprises a baseline vector rotation angle that corresponds to a maximum value of range difference. In some embodiments step 858 of determining the direction of the false GNSS satellite signal transmitter based on the plurality of range differences includes setting the direction of the false GNSS satellite signal transmitter to be equal to the maximum baseline vector rotation angle plus 180 degrees.

In some embodiments step 858 of determining the direction of the false GNSS satellite signal transmitter based on the plurality of range differences includes identifying a minimum baseline vector rotation angle, wherein the minimum baseline vector rotation angle comprises a baseline vector rotation angle that corresponds to a minimum value of range difference. In some embodiments step 858 of determining the direction of the false GNSS satellite signal transmitter based on the plurality of range differences includes setting the direction of the false GNSS satellite signal transmitter to be equal to the minimum baseline vector rotation angle.

In some embodiments step 858 of determining the direction of the false GNSS satellite signal transmitter based on the plurality of range differences includes identifying a mean baseline vector rotation angle, wherein the mean baseline vector rotation angle comprises a baseline vector rotation angle that corresponds to a mean value of range difference. In some embodiments step 858 of determining the direction of the false GNSS satellite signal transmitter based on the plurality of range differences includes setting the direction of the false GNSS satellite signal transmitter to be equal to the mean baseline vector rotation angle plus 90 degrees.

In some embodiments step 858 of determining the direction of the false GNSS satellite signal transmitter based on the plurality of range differences includes calculating a path difference distance for each one of the plurality of range differences. In some embodiments the maximum baseline vector rotation angle comprises a baseline vector rotation angle that corresponds to a maximum value of path difference distance. In some embodiments the minimum baseline vector rotation angle comprises a baseline vector rotation angle that corresponds to a minimum value of path difference distance. In some embodiments the mean baseline vector rotation angle comprises a baseline vector rotation angle that corresponds to a mean value of path difference distance.

In some embodiments step 858 of determining the direction of the false GNSS satellite signal transmitter based on the plurality of range differences includes computing the travel time differential bias for each one of the plurality of range differences. In some embodiments the maximum baseline vector rotation angle comprises a baseline vector rotation angle that corresponds to a maximum value of travel time differential bias. In some embodiments the minimum baseline vector rotation angle comprises a baseline vector rotation angle that corresponds to a minimum value of travel time differential bias. In some embodiments the mean baseline vector rotation angle comprises a baseline vector rotation angle that corresponds to a mean value of travel time differential bias.

In some embodiments a microprocessor or processor computes the plurality of range differences. In some embodiments software computes the plurality of range differences. In some embodiments software coupled to a processor or microprocessor computes the plurality of range differences. In some embodiments the microprocessor or processor includes the software. The term "processor" as used here can include any microprocessor, microcontroller, microprocessor or microcontroller coupled to or including software, or any other combination of computing hardware or computing software. In some embodiments the processor determines which one of the plurality of baseline vector rotation angles corresponds to a maximum, minimum, or mean range difference. In some embodiments the processor determines which one of the plurality of baseline vector rotation angles corresponds to a maximum, minimum, or mean path difference distance. In some embodiments the processor determines which one of the plurality of baseline vector rotation angles corresponds to a maximum, minimum, or mean travel-time differential bias. In some embodiments the processor outputs a false GNSS satellite signal transmitter direction. In some embodiments the processor determines the direction of the false GNSS satellite signal transmitter based on the plurality of range differences. In some embodiments the processor determines the direction of the false GNSS satellite signal transmitter based on computing a plurality of path difference differences. In some embodiments the processor determines the direction of the false GNSS satellite signal transmitter based on computing a plurality of travel-time differential biases.

Described herein are several methods for implementing a device for determining the direction of a false GNSS satellite signal transmitter. The key to any implementation, as disclosed herein, is the concept of determining a maximum or a minimum range difference ΔR or its constituent components such as travel-time differential bias $B_{AB}$, or path difference distance d, and correlating baseline vector rotation angle to the maximum or minimum range difference ΔR, or in some way monitoring these term and how they vary for different alignments of antenna baseline vectors.

A point worth mentioning is that in multi-GNSS attitude systems, one GNSS system may be spoofed—receiving a false GNSS satellite signal, while the other may not be spoofed. For example, a GPS-GLONASS attitude system may experience only GPS spoofing. So it is important to detect false GNSS satellite signals independently for each GNSS system, and then use only the signals that are determined to have been false when locating the false GNSS satellite signal transmitter.

The embodiments and examples set forth herein were presented in order to best explain embodiments of the invention and its practical application and to thereby enable those of ordinary skill in the art to make and use embodiments of the invention. However, those of ordinary skill in the art will recognize that the foregoing description and examples have been presented for the purposes of illustration and example only. The description as set forth is not intended to be exhaustive or to limit embodiment of the invention to the precise form disclosed. Many modifications and variations are possible in light of the teachings above without departing from the spirit and scope of the forthcoming claims.

The invention claimed is:

1. A method of using a global navigation satellite system (GNSS) attitude system having a first GNSS antenna and a second GNSS antenna located at opposing ends of a bar located on a fixed reference body to determine a direction of a false GNSS satellite signal transmitter comprising:
   rotating the bar and first GNSS antenna and second GNSS antenna about a center point of the bar located midway between the first GNSS antenna and second GNSS antenna;
   determining, using a plurality of GNSS signals received from a false GNSS transmitter, at a first point in time during the rotation of the bar, a first set of ranges between the first GNSS antenna and the false GNSS transmitter;
   determining, using a plurality of GNSS signals received from the false GNSS transmitter, at the first point in time during the rotation of the bar, a second set of ranges between the second GNSS antenna and the false GNSS transmitter;
   calculating a plurality of range differences, wherein each of the plurality of range differences corresponds to one of the plurality of GNSS signals received by the GNSS antennas, wherein each one of the plurality of range differences further corresponds to at least one baseline vector rotation angle of a baseline vector, wherein the baseline vector is a straight line that extends between the first GNSS antenna and second GNSS antenna;
   determining the direction of the false GNSS satellite signal transmitter based on the plurality of range differences, wherein the direction of the false GNSS satellite is determined by identifying a first baseline vector rotation angle wherein two or more of the plurality of range differences are at a minimum value or are at a maximum value, and wherein the direction of the false GNSS satellite signal transmitter is determined with respect to the first angle; and,
   wherein the baseline vector rotation angle is measured with respect to the fixed reference body.

2. The method of claim 1, wherein the two or more of the plurality of range differences are at a maximum value, and wherein the first baseline vector rotation angle is a maximum baseline vector rotation angle, wherein determining the direction of the false GNSS satellite signal transmitter based on the plurality of range differences further comprises:
   setting the direction of the false GNSS satellite signal transmitter to be equal to the maximum baseline vector rotation angle plus 180 degrees.

3. The method of claim 1, wherein the two or more of the plurality of range differences are at a minimum value, and wherein the first baseline vector rotation angle is a minimum baseline vector rotation angle, wherein determining the direction of the false GNSS satellite signal transmitter based on the plurality of range differences comprises:
   setting the direction of the false GNSS satellite signal transmitter to be equal to the minimum baseline vector rotation angle.

4. The method of claim 1, wherein determining the direction of the false GNSS satellite signal transmitter based on the plurality of range differences comprises calculating a path difference distance for each one of the plurality of range differences.

5. The method of claim 1, wherein determining the direction of the false GNSS satellite signal transmitter based on the plurality of range differences comprises computing the travel time differential bias for each one of the plurality of range differences.

6. The method of claim 1, further comprising detecting that a false GNSS satellite signal is being received.

7. The method of claim 1, further comprising indicating the direction of the false GNSS satellite signal transmitter.

8. A method of determining a direction of a false Global Navigation Satellite System (GNSS) satellite signal transmitter comprising:
   rotating a baseline vector that extends between a first and second antenna located at opposite ends of a rotatable bar through a plurality of rotation angles, wherein the baseline vector is rotated by rotating the first and second antennas about a midpoint of the bar that is fixed in location relative to a fixed platform to which the bar is secured, and wherein the plurality of rotation angles are measured with respect to a fixed reference body;
   calculating a plurality of range differences at a common point in time, wherein each of the plurality of range differences corresponds to one of the plurality of GNSS signals received by both GNSS antennas, and wherein each one of the plurality of range differences corresponds to one of the plurality of rotation angles; and
   determining the direction of the false GNSS satellite signal transmitter based on at least two of the plurality of range differences having a minimum value or having a or maximum value out of the calculated range difference values at the same rotation angle.

9. The method of claim 8, wherein the baseline vector extends from a first GNSS antenna to a second GNSS antenna.

10. A global navigation satellite system (GNSS) device for determining the direction of a false GNSS satellite signal transmitter comprising:
- a device body, wherein the device body has a direction axis;
- a bar having a length and first and second ends opposite to each other, the bar secured to the device body and configured to rotate about a midpoint of the bar;
- a first antenna secured to the first end of the bar;
- a second antenna secured to the second end of the bar;
- a rotation apparatus, wherein the rotation apparatus rotates the bar such that a baseline vector extending from the first antenna to the second antenna rotates through a plurality of baseline vector rotation angles about the midpoint of the bar, wherein the baseline vector rotation angles are measured with respect to the direction axis;
- a processor, wherein the processor calculates a plurality of range differences at a common point in time, wherein each of the plurality of range differences corresponds to one of a plurality of GNSS signals received by both antennas, and wherein each one of the plurality of range differences corresponds to one of the plurality of baseline vector rotation angles, and wherein the processor determines the direction of the false GNSS satellite signal transmitter based on at least two of the plurality of range differences having a minimum value or having a maximum value out of the calculated range differences at the same baseline vector rotation angle.

11. The GNSS device of claim 10, wherein the processor determines which one of the plurality of baseline vector rotation angles corresponds to a maximum baseline vector rotation angle where at least two of the plurality of range differences have a maximum value, and wherein the processor sets the direction of the false GNSS satellite signal transmitter to be equal to the maximum baseline vector rotation angle plus 180 degrees.

12. The GNSS device of claim 11, wherein the processor outputs a false GNSS satellite signal transmitter direction.

13. The GNSS device of claim 10, wherein the processor determines which one of the plurality of baseline vector rotation angles corresponds to a minimum baseline vector rotation angle where at least two of the plurality of range differences have a minimum difference value, and wherein the processor sets the direction of the false GNSS satellite signal transmitter to be equal to the minimum baseline vector rotation angle.

14. A global navigation satellite system (GNSS) device for determining the direction of a false GNSS satellite signal transmitter comprising:
- a device body, wherein the device body has a direction axis;
- a plurality of GNSS antenna pairs fixed to the device body, each antenna pair comprising two antennas located opposite each other across a circle and having a straight line baseline vector extending between the antennas of each antenna pair, wherein each one of the baseline vectors has a midpoint, the midpoint of each of the baseline vectors intersecting at the same point, and wherein each one of the plurality of baseline vectors comprises a baseline vector rotation angle with respect to the direction axis;

and

- a processor coupled to the antennas, wherein the processor:
  - calculates a plurality of range differences at a common point in time, wherein each one of the plurality of range differences corresponds to one of a plurality of GNSS signals received at the antennas, and wherein each one of the plurality of range differences corresponds to one of the plurality of baseline vector rotation angles; and, wherein the processor determines the direction of the false GNSS satellite signal transmitter based on determining a baseline vector rotation angle where at least two of the plurality of range differences are at a minimum value or are at a maximum value out of the calculated plurality of range differences.

* * * * *